(12) United States Patent
Kurokawa et al.

(10) Patent No.: US 8,605,059 B2
(45) Date of Patent: Dec. 10, 2013

(54) INPUT/OUTPUT DEVICE AND DRIVING METHOD THEREOF

(75) Inventors: Yoshiyuki Kurokawa, Sagamihara (JP); Takayuki Ikeda, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 177 days.

(21) Appl. No.: 13/166,041

(22) Filed: Jun. 22, 2011

(65) Prior Publication Data
US 2012/0001874 A1    Jan. 5, 2012

(30) Foreign Application Priority Data
Jul. 2, 2010    (JP) .................................. 2010-151941

(51) Int. Cl.
*G06F 3/042*    (2006.01)
(52) U.S. Cl.
USPC .................... 345/175; 345/173; 178/18.09
(58) Field of Classification Search
USPC ............. 345/179, 173–175; 178/18.09, 18.11
See application file for complete search history.

(56) References Cited

U.S. PATENT DOCUMENTS

| | | | |
|---|---|---|---|
| 4,529,886 A * | 7/1985 | Yokoyama et al. | 348/298 |
| 4,542,289 A * | 9/1985 | Yokoyama et al. | 250/201.7 |
| 5,731,856 A | 3/1998 | Kim et al. | |
| 5,744,864 A | 4/1998 | Cillessen et al. | |
| 5,977,940 A | 11/1999 | Akiyama et al. | |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 6,781,635 B1 * | 8/2004 | Takeda | 348/552 |
| 7,049,190 B2 | 5/2006 | Takeda et al. | |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.

(Continued)

*Primary Examiner* — Joe H Cheng
(74) *Attorney, Agent, or Firm* — Eric J. Robinson; Robinson Intellectual Property Law Office, P.C.

(57) ABSTRACT

An object is to reduce power consumption. An input/output device including: a display selection signal output circuit outputting a display selection signal during a first display mode and stopping outputting the display selection signal during a second display mode; a photodetection reset signal output circuit outputting N (N is a natural number) photodetection reset signals during a first photodetection mode and outputting M (M is a natural number smaller than N) photodetection reset signals during a second photodetection mode; an output selection signal output circuit outputting N output selection signals during the first photodetection mode and outputting M output selection signals during the second photodetection mode; and a photodetector circuit being reset in accordance with a photodetection reset signal, generating data according to an intensity of light entering the photodetector circuit subsequently, and outputting the data as a data signal in accordance with the output selection signal.

20 Claims, 23 Drawing Sheets

(56) References Cited

U.S. PATENT DOCUMENTS

| | | | |
|---|---|---|---|
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,282,782 B2 | 10/2007 | Hoffman et al. | |
| 7,286,108 B2 | 10/2007 | Tsuda et al. | |
| 7,297,977 B2 | 11/2007 | Hoffman et al. | |
| 7,321,353 B2 | 1/2008 | Tsuda et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,477,216 B2 | 1/2009 | Koyama et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 7,791,072 B2 | 9/2010 | Kumomi et al. | |
| 7,791,074 B2 | 9/2010 | Iwasaki | |
| 7,882,379 B2 | 2/2011 | Kanakogi | |
| 8,319,307 B1* | 11/2012 | Williams | 257/461 |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2005/0212737 A1 | 9/2005 | Yoshihara et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0040792 A1 | 2/2007 | Kwag et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0072439 A1 | 3/2007 | Akimoto et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0048100 A1* | 2/2008 | Bamji et al. | 250/214 A |
| 2008/0050595 A1 | 2/2008 | Nakagawara et al. | |
| 2008/0055218 A1 | 3/2008 | Tsuda et al. | |
| 2008/0055225 A1 | 3/2008 | Pak et al. | |
| 2008/0073653 A1 | 3/2008 | Iwasaki | |
| 2008/0083950 A1 | 4/2008 | Pan et al. | |
| 2008/0100566 A1* | 5/2008 | Miyasaka et al. | 345/107 |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0158137 A1 | 7/2008 | Yoshida | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0033850 A1* | 2/2009 | Ishiguro et al. | 349/116 |
| 2009/0051801 A1* | 2/2009 | Mishina et al. | 348/311 |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0207154 A1* | 8/2009 | Chino | 345/175 |
| 2009/0261325 A1 | 10/2009 | Kawamura et al. | |
| 2009/0267064 A1 | 10/2009 | Yano et al. | |
| 2009/0278122 A1 | 11/2009 | Hosono et al. | |
| 2009/0280600 A1 | 11/2009 | Hosono et al. | |
| 2010/0045811 A1* | 2/2010 | Harada et al. | 348/222.1 |
| 2010/0065844 A1 | 3/2010 | Tokunaga | |
| 2010/0092800 A1 | 4/2010 | Itagaki et al. | |
| 2010/0097352 A1* | 4/2010 | Ahn et al. | 345/175 |
| 2010/0109002 A1 | 5/2010 | Itagaki et al. | |
| 2010/0128004 A1* | 5/2010 | Harada et al. | 345/175 |
| 2010/0134735 A1* | 6/2010 | Nakamura et al. | 349/116 |
| 2010/0156850 A1* | 6/2010 | Kurokawa | 345/175 |
| 2011/0164012 A1* | 7/2011 | Maeda et al. | 345/207 |
| 2011/0216043 A1* | 9/2011 | Tamura et al. | 345/175 |
| 2012/0001880 A1* | 1/2012 | Brown et al. | 345/207 |
| 2012/0154354 A1* | 6/2012 | Tsujino et al. | 345/207 |
| 2012/0187455 A1* | 7/2012 | Brown et al. | 257/229 |
| 2012/0188207 A1* | 7/2012 | Usukura et al. | 345/175 |
| 2012/0242636 A1* | 9/2012 | Yuki et al. | 345/207 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2010-109467 A | 5/2010 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

(56) References Cited

OTHER PUBLICATIONS

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In-Ga-Zn-O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the In2O3-Ga2ZnO4-ZnO system at 1350° C.,", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7,8,9, and 16) in the In2O3-ZnGa2O4-ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N. et al., "Crystallization and Reduction of Sol-Gel-Derived Zinc Oxide Films by Irradiation with Ultraviolet Lamp,", Journal of Sol-Gel Science and Technology, 2003, vol. 26, pp. 181-184.

Osada.T et al., "15.2: Development of Driver-Integrated Panel using Amorphous In-Ga-Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, 347-355.

Son.K et al., "42.4L: Late-News Paper: 4 Inch QVGA AMOLED Driven by the Threshold Voltage Controlled Amorphous GIZO (Ga2O3-In2O3-ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector with Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophophorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In-Ga-Zn-O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In-Ga-Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In-Ga-Zn-Oxide TFTs,", IDW '09 : Proceedings of the 16th International Display Workshops, 2009, pp. 689-692.

Park.J et al., "Amorphous Indium-Gallium-Zinc Oxide TFTs and Their Application for Large Size AMOLED,",AM-FPD '08 Digest of Technical Papers, Jul. 2, 2008, pp. 275-278.

Park.S et al., "Challenge to Future Displays: Transparent AM-OLED Driven by PEALD Grown ZnO TFT,", IMID '07 Digest, 2007, pp. 1249-1252.

Godo.H et al., "Temperature Dependence of Characteristics and Electronic Structure for Amorphous In-Ga-Zn-Oxide TFT,", AM-FPD '09 Digest of Technical Papers, Jul. 1, 2009, pp. 41-44.

Osada.T et al., "Development of Driver-Integrated Panel Using Amorphous In-Ga-Zn-Oxide.TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDs,", Journal of the SID, 2007, vol. 15, No. 1, pp. 17-22.

Hosono.H, "68,3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In-Ga-Zn-Oxide TFT,", SID Digest '09 : SID International Symposium Digest of Technical Papers, May 31, 2009, pp. 1110-1112.

Ohara.H et al., "21.3:4.0 In. QVA AMOLED Display Using In-GA-Zn-Oxide TFTs with a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

(56) References Cited

OTHER PUBLICATIONS

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined with Ultra Low-Power Driving Technology,", SID Digest '09 : SID International Symposium Digest of Technical Papers, May 31, 2009, pp. 395-398.

Lee.H et al., "Currnet Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", Nirim Newsletter, Mar. 1, 1995, vol. 150, pp. 1-4.

Kikuchi.H et al., "Polymer-Stabilized Liquid Crystal Blue Phases,", Nature Materials, Sep. 1, 2002, vol. 1, pp. 64-68.

Kimizuka.N et al., "Spinel,YBFE2O4, and YB2FE3O7 Types of Structures for Compounds in the IN2O3 and SC2O3-A2O3-BO System [A; Fe, Ga, or Al; B: Mg, Mn, Fe, Ni, Cu,or Zn] at Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J, Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16. pp. 165202-1-165202-22.

Park.J et al., "Electronic Transport Properties of Amorphous Indium-Gallium-Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors with Aluminum Oxide Dielectric Layes,", J. Electrochem. Soc. (Journal of the Electrochemical Society), 2008, vol. 155, No. 12, pp. H1009-H1014.

Ueno.K et al., "Field-Effect Transistor on SrTiO3 with Sputtered Al2O3 Gate Insulator,", Appl. Phys. Lett. (Applied Physics Letters) , Sep. 1, 2003, vol. 83, No. 9, pp. 1755-1757.

* cited by examiner

INPUT/OUTPUT DEVICE AND DRIVING METHOD THEREOF

BACKGROUND OF THE INVENTION

1. Field of the Invention

An embodiment of the present invention relates to an input/output device and a driving method thereof.

2. Description of the Related Art

In recent years, technological development of a device having a function of outputting data and inputting data by using incident light (such a device is also referred to as an input/output device) has been promoted.

An example of the input/output device is an input/output device that includes a plurality of display circuits and a plurality of photodetector circuits (photosensors) arranged in a matrix and provided in a pixel area and has a function of sensing the position of an object to be detected (position-sensing function) by sensing the intensity of light entering the photosensors and a function of generating image data of the object (detecting function) (see Patent Document 1, for example). With the position-sensing function, the input/output device can also serve as a touch panel, for example. Further, with the detecting function, the input/output device can also serve as a scanner and display an image based on image data generated in the pixel area with the detecting function.

REFERENCE

Patent Document

[Patent Document 1] Japanese Published Patent Application No. 2010-109467

SUMMARY OF THE INVENTION

A problem in conventional input/output devices is high power consumption.

For example, in a conventional input/output device, rewriting of image data is conducted even when a still image is displayed by a display circuit. This unnecessary rewriting of image data causes unnecessary power consumption.

For example, a conventional input/output device has high power consumption because data of the intensity of light is read repeatedly by photodetector circuits every several milliseconds to several tens of milliseconds. Moreover, in a conventional input/output device, reading operations are performed in all the photodetector circuits even in when no change occurs in the illuminance of light entering on parts of the photodetector circuits in a photodetection area, leading to unnecessary power consumption.

An object of one embodiment of the present invention is to reduce power consumption.

According to one embodiment of the present invention, an input/output device has a first photodetection mode in which photodetection operation is performed, a second photodetection mode in which photodetection is performed with less photodetector circuits driven than in the first photodetection mode, and a display mode in which a circuit for driving a display circuit is stopped while the display state is maintained. Moreover, the input/output device is switched as needed to the display mode when performing photodetection operation and display operation. This reduces power consumption.

According to one embodiment of the present invention, the display mode of an input/output device is switched by using data generated by photodetection operation. This reduces power consumption without adversely affecting actual operation.

One embodiment of the present invention is an input/output device including: a display selection signal output circuit outputting a display selection signal during a first display mode and stopping outputting the display selection signal during a second display mode; a display data signal output circuit being supplied with an image signal and generating a display data signal on a basis of the image signal; a photodetection reset signal output circuit outputting N (N is a natural number of 2 or more) photodetection reset signals during a first photodetection mode and outputting M (M is a natural number smaller than N) photodetection reset signals during a second photodetection mode; an output selection signal output circuit outputting N output selection signals during the first photodetection mode and outputting M output selection signals during the second photodetection mode; and a photodetector circuit being supplied with a photodetection reset signal and an output selection signal, being reset in accordance with the photodetection reset signal, generating data according to an intensity of light entering the photodetector circuit subsequently, and outputting the data as a data signal in accordance with the output selection signal.

In the input/output device, the output selection signal output circuit includes: a shift register outputting L (L is a natural number of 2 or more) first pulse signals; and L logic circuits being supplied with different first pulse signals selected from the L first pulse signals, each being supplied with any one of Z (Z is a natural number of 2 or more and L or less) pulse control signals, and each outputting a second pulse signal to be the output selection signal in accordance with the first pulse signal and the pulse control signal.

One embodiment of the present invention is a method for driving an input/output device including: a display selection signal output circuit; a pixel data signal output circuit; a photodetection selection signal output circuit; a photodetector circuit being supplied with a photodetection reset signal and an output selection signal, being reset in accordance with the photodetection reset signal every unit period, generating data according to an intensity of light entering the photodetector circuit subsequently, and outputting the data as a data signal in accordance with the output selection signal; and a reading circuit sequentially reading the data signal from the photodetector circuit. The method includes the steps of: outputting N (N is a natural number of 2 or more) photodetection selection signals from the photodetection selection signal output circuit during a first photodetection mode; outputting M (M is a natural number smaller than N) photodetection selection signals from the output selection signal output circuit during a second photodetection mode; outputting a display selection signal from the display selection signal output circuit during a combination of either the first photodetection mode or the second photodetection mode and a first display mode; stopping output of the display selection signal from the display selection signal output circuit during a combination of either the first photodetection mode or the second photodetection mode and a second display mode; switching the input/output device from the second photodetection mode to the first photodetection mode in accordance with a value of data generated by the photodetector circuit in successive periods of the second photodetection mode; and switching the input/output device from the second display mode to the first display mode in accordance with the value of the data generated by the photodetector circuit in successive periods of the first photodetection mode.

According to one embodiment of the present invention, an input/output device can be selectively switched between a plurality of photodetection modes providing different driving states of a photodetector circuit and can be selectively switched between a plurality of display modes providing different driving states of a display circuit, thereby reducing power consumed in the input/output device in use without the loss of convenience in input operation.

DETAILED DESCRIPTION OF THE INVENTION

Examples of embodiments of the present invention will be described below with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments.

Note that the contents of the embodiments can be combined with each other as appropriate. In addition, the contents of the embodiments can be replaced with each other.

Note that ordinal numbers such as "first" and "second" are used to prevent confusion between components and do not limit number.

Embodiment 1

In this embodiment, an example of an input/output device that can output data and can input data by using incident light (also referred to as an input/output system) is described.

Figure 1A:
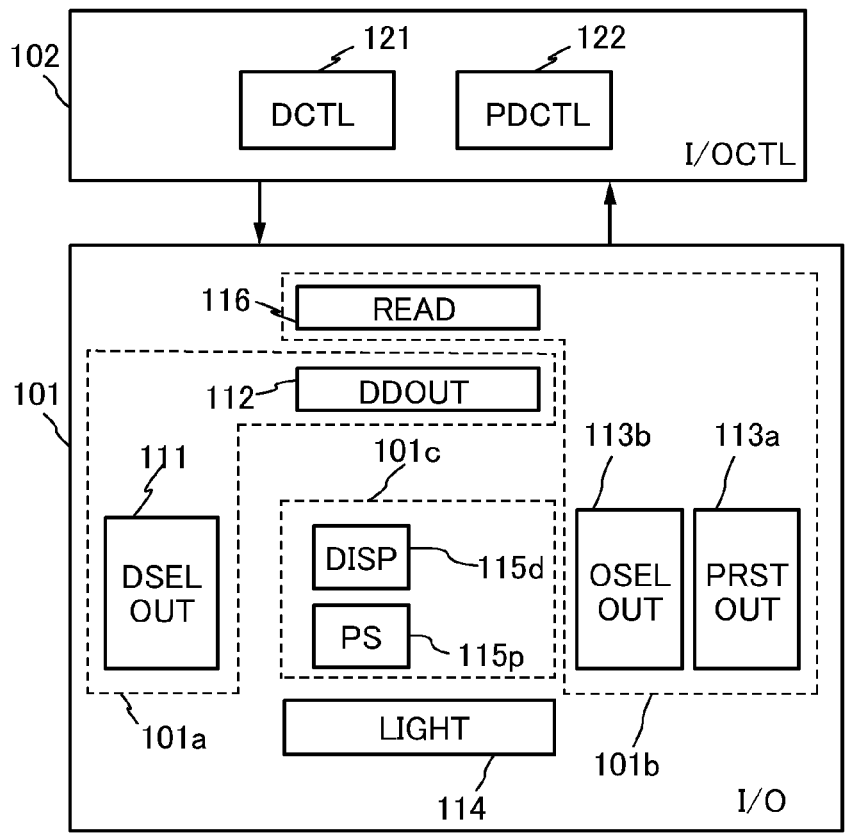
FIGS. 1A and 1B are diagrams illustrating an example of an input/output device of Embodiment 1.
Figure 1B:
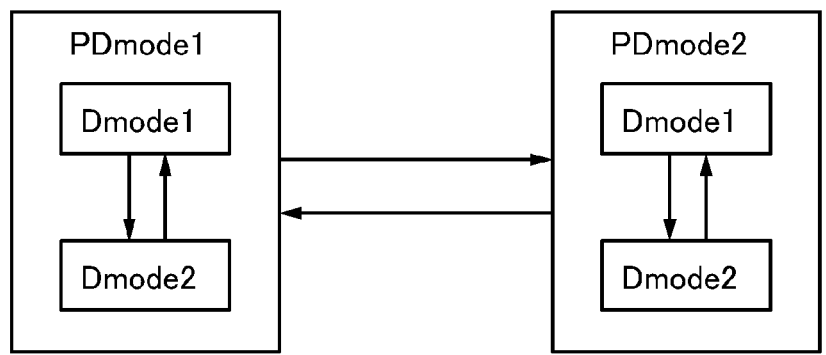

An example of the input/output device of this embodiment will be described with reference to FIGS. 1A and 1B. FIGS. 1A and 1B are diagrams for describing an example of the input/output device of this embodiment.

First, a structural example of the input/output device of this embodiment will be described with reference to FIG. 1A. FIG. 1A is a schematic diagram illustrating a structural example of the input/output device of Embodiment 1.

An input/output device illustrated in FIG. 1A includes an input/output (I/O) unit 101 and an input/output controller (I/OCTL) 102.

In the input/output unit 101, data input/output is performed.

The input/output controller 102 has a function of controlling a display operation and an optical data generating operation, which are performed by the input/output unit, in accordance with a signal input to the input/output controller 102.

The input/output unit 101 and the input/output controller 102 will be further described below.

The input/output unit 101 includes a display selection signal output circuit (DSELOUT) 111, a display data signal output circuit (DDOUT) 112, a photodetection reset signal output circuit (PRSTOUT) 113a, an output selection signal output circuit (OSELOUT) 113b, a light unit (LIGHT) 114, X (X is a natural number) display circuits (DISP) 115d, Y (Y is a natural number) photodetector circuits (PS) 115p, and a reading circuit (READ) 116.

The display selection signal output circuit 111 and the display data signal output circuit 112 are provided in a display circuit driver 101a. The display circuit driver 101a generates control signals to drive the display circuits 115d.

The photodetection reset signal output circuit 113a, the output selection signal output circuit 113b, and the reading circuit 116 are provided in a photodetector circuit driver 101b. The photodetector circuit driver 101b generates control signals to drive the photodetector circuits 115p.

The display circuits 115d and the photodetector circuits 115p are provided in a pixel area 101c. The pixel area 101c displays an image. In addition, light to be data enters the pixel area 101c. Note that one or more display circuits 115d forms a pixel. Further, a pixel may include one or more photodetector circuits 115p. Moreover, when the number of display circuits 115d is more than one, the display circuits 115d may be arranged in a matrix in the pixel area 101c. Further, when the number of photodetector circuits 115p is more than one, the photodetector circuits 115p may be arranged in a matrix in the pixel area 101c.

The display selection signal output circuit 111 has a function of outputting a plurality of display selection signals that are pulse (pls) signals (signals DSEL).

The display selection signal output circuit 111 includes a shift register, for example. The display selection signal output circuit 111 can output display selection signals by outputting pulse signals from the shift register.

An image signal that is an electrical signal representing an image is input to the display data signal output circuit 112. The display data signal output circuit 112 has a function of generating a display data signal (a signal DD) that is a voltage signal on the basis of the input image signal and outputting the generated display data signal.

The display data signal output circuit 112 includes a transistor, for example.

Note that in the input/output device, the transistor includes two terminals and a current control terminal for controlling current caused to flow between the two terminals by applied voltage. Note that without limitation to the transistor, terminals between which current is controlled are also referred to as current terminals. Two current terminals are also referred to as a first current terminal and a second current terminal.

Further, in the input/output device, a field-effect transistor can be used as the transistor, for example. In a field-effect transistor, a first current terminal, a second current terminal, and a current control terminal are one of a source and a drain, the other of the source and the drain, and a gate, respectively.

The term "voltage" generally means a difference between potentials at two points (a potential difference). However, voltage and potential may be both represented by volts (V) in a circuit diagram or the like; thus, it is difficult to distinguish them. For this reason, in this specification, a potential difference between a potential at one point and a potential to be a reference (a reference potential) is used as voltage at the point in some cases unless otherwise specified.

The display data signal output circuit 112 can output data of an image signal as a display data signal when the transistor is on. The transistor can be controlled by inputting a control signal that is a pulse signal to the current control terminal. Note that in the case where the number of display circuits 105d is more than one, a plurality of transistors may be selectively turned on or off so that data of image signals is output as a plurality of display data signals.

The photodetection reset signal output circuit 113a has a function of outputting photodetection reset signals that are pulse signals (signals PRST).

The photodetection reset signal output circuit 113a includes a shift register and a plurality of logic circuits, for example. Any one of a plurality of pulse signals and any one of a plurality of pulse control signals output from the shift register are input to each of the plurality of logic circuits. The photodetection reset signal output circuit 113a outputs a pulse signal from the shift register and outputs a pulse signal from the logic circuits in accordance with a pulse signal and a pulse control signal output from the shift register, thereby outputting a photodetection reset signal. Note that the photodetection reset signal output circuit 113a can be a decoder.

The output selection signal output circuit 113b has a function of outputting output selection signals that are pulse signals (signals OSEL).

The output selection signal output circuit 113b includes a shift register and a plurality of logic circuits, for example. Any one of a plurality of pulse signals and any one of a plurality of pulse control signals output from the shift register are input to each of the plurality of logic circuits. The output selection signal output circuit 113b outputs a pulse signal from the shift register and outputs a pulse signal from the logic circuits in accordance with a pulse signal and a pulse control signal output from the shift register, thereby outputting an output selection signal. Note that the output selection signal output circuit 113b can be a decoder.

The light unit 114 is a light-emitting unit including a light source.

The light unit 114 includes a light-emitting diode as a light source.

One or more light-emitting diodes selected from a white light-emitting diode, a red light-emitting diode, a green light-emitting diode, and a blue light-emitting diode can be used as the light-emitting diode. A full-color image can be displayed and full-color detection of an object to be detected can be performed in each period by, for example, sequentially making the red light-emitting diode, the green light-emitting diode, and the blue light-emitting diode emit light in each period that is set in accordance with the display selection signal and thus lighting the light unit 114.

In addition to one or more light-emitting diodes selected from a white light-emitting diode, a red light-emitting diode, a green light-emitting diode, and a blue light-emitting diode, a light-emitting diode emitting light of wavelengths in the infrared region (e.g., a region in which the wavelengths of light are larger than those in the visible region and lower than or equal to 1000 nm) can be used. Such a light-emitting diode is also referred to as an infrared-light-emitting diode. Use of an infrared-light-emitting diode can reduce the adverse effect of light around the input/output device.

Alternatively, difference data of two pieces of optical data generated in different periods may be generated by selectively making a plurality of light-emitting diodes emit light and changing the state of the light unit every period. Difference data is data from which information on light around the input/output device is removed. It is preferable to perform, for example, detection of the coordinates of an object to be detected by using the difference data.

The display circuit 115d overlaps with the light unit 114. To the display circuit 115d, a display selection signal that is a pulse signal is input, and a display data signal is input in accordance with the input display selection signal. The display circuit 115d changes its display state in accordance with data of the input display data signal.

The display circuit 115d includes a display selection transistor and a display element, for example.

The display selection transistor has a function of selecting whether data of a display data signal is input to the display element.

The display element changes its display state when the data of the display data signal is input to the display element in response to the behavior of the display selection transistor.

As the display element, a liquid crystal element or the like can be used, for example.

As a display mode of the input/output device including a liquid crystal element, a TN (twisted nematic) mode, an IPS (in-plane-switching) mode, an STN (super twisted nematic) mode, a VA (vertical alignment) mode, an ASM (axially symmetric aligned micro-cell) mode, an OCB (optically compensated birefringence) mode, an FLC (ferroelectric liquid crystal) mode, an AFLC (antiferroelectric liquid crystal) mode, an MVA (multi-domain vertical alignment) mode, a PVA (patterned vertical alignment) mode, an ASV (advanced super view) mode, a FFS (fringe field switching) mode, or the like may be used.

The photodetector circuit 115p overlaps with the light unit 114. A photodetection reset signal and an output selection signal are input to the photodetector circuit 115p. Note that when a plurality of photodetector circuits 115p is used, the same photodetection control signal may be input to the plurality of photodetector circuits 115p. This shortens time required for all the photodetectors to generate optical data, thereby lengthening a period during which light is incident on each photodetector at the time of the generation of optical data. Note that a method in which the same photodetection control signal is input to a plurality of photodetector circuits is called a global shutter method. Further, photodetector circuits 115p for detecting red light, green light, and blue light can also be provided. For example, full-color image data can be generated by generating optical data with the photodetector circuits 115p for detecting light of these colors with the use of red, green, and blue color filters and by generating image data by combining a plurality of pieces of generated optical data.

The photodetector circuit 115p is reset in accordance with a photodetection reset signal.

In addition, the photodetector circuit 115p has a function of generating data that is a voltage based on the illuminance of incident light (such data is referred to as optical data or PDATA) in accordance with a photodetection control signal.

Further, the photodetector circuit 115p has a function of outputting the generated optical data as an optical data signal in accordance with an output selection signal.

The photodetector circuit 115p includes, for example, a photoelectric transducer (PCE), a photodetection reset selection transistor, a photodetection control transistor, an amplifier transistor, and an output selection transistor.

The photoelectric transducer is supplied with current (also referred to as photocurrent) by incidence of light on the photoelectric transducer in accordance with the illuminance of incident light.

A current control terminal of the photodetection reset selection transistor is supplied with a photodetection reset signal. The photodetection reset selection transistor has a function of selecting whether the voltage of a current control terminal of the amplification transistor is set to a reference value.

A current control terminal of the photodetection control transistor is supplied with a photodetection control signal. The photodetection control transistor has a function of controlling whether the voltage of the current control terminal of the amplification transistor is set to a value according to the photocurrent flowing through the photoelectric transducer.

An output selection signal is input to a current control terminal of the output selection transistor. The output selection transistor has a function of selecting whether optical data is output as an optical data signal from the photodetector circuit 115p.

Note that the photodetector circuit 115p outputs optical data as an optical data signal from a first current terminal or a second current terminal of the amplifier transistor.

The reading circuit 116 has a function of selecting the photodetector circuit 115p used to read optical data and reading the optical data from the selected photodetector circuit 115p.

The reading circuit 116 includes a selection circuit, for example. For example, the selection circuit includes a transistor. The selection circuit can read optical data by inputting an optical data signal from the photodetector circuit 115p in response to the behavior of the transistor.

The input/output controller 102 includes a display controller (DCTL) 121 and a photodetection controller 122.

The display controller 121 has a function of controlling the operation of the display selection signal output circuit 111 and the display data signal output circuit 112. The display controller 121 may be controlled by optical data.

The display controller 121 generates and outputs a display control signal which is a pulse signal by using a microprocessor in the input/output controller 102, for example. In a sequence of periods, the display control signal may be generated so that a pulse (also referred to as pls) may be generated when the absolute value of the amount of change in the value of the signal DD is larger than the reference value. Alternatively, in a sequence of periods, the display control signal may be generated so that a pulse may be generated when data of the position of an object to be detected, a direction in which the object moves, a speed at which the object moves, or the like obtained from the amount of change in the value of optical data matches a predetermined operation command.

The photodetection controller 122 has a function of controlling the operation of the photodetection reset signal output circuit 113a, the output selection signal output circuit 113b, and the reading circuit 116.

The photodetection controller 122 generates and outputs a photodetection control signal which is a pulse signal by using a microprocessor in the input/output controller 102, for example. Alternatively, in a sequence of periods, the photodetection control signal may be generated so that a pulse may be generated when data of the position of an object to be detected, a direction in which the object moves, a speed at which the object moves, or the like obtained from the amount of change in the value of optical data matches a predetermined operation command.

Note that the display controller 121 and the photodetection controller 122 may control the light unit 114.

Next, as an example of a method for driving the input/output device of this embodiment, an example of a method for driving the input/output device illustrated in FIG. 1A will be described with reference to FIG. 1B. FIG. 1B is a diagram for describing the example of a method for driving the input/output device illustrated in FIG. 2A. Note that data is expressed as an ellipse in FIG. 1B.

The operation of the input/output device in FIG. 1A is roughly divided into a first photodetection mode (also referred to as a PD mode 1 or a normal reading mode) and a second photodetection mode (also referred to as a PD mode 2 or a reading stop mode) as shown in FIG. 1B.

In the first photodetection mode, the output selection signal output circuit 113b outputs N (N is a natural number of 2 or more) signals OSEL, and the photodetection reset signal output circuit 113a outputs N signals PRST.

The photodetector circuit 115p is reset in accordance with the signal PRST when supplied with one of the N signals PRST and one of the N signals OSEL, and then generates optical data. Further, the photodetector circuit 115p outputs optical data as an optical data signal in accordance with the signal OSEL.

In addition, the reading circuit 116 sequentially reads optical data output from the photodetector circuits 115p. The read optical data is used for a predetermined processing e.g., detection of the coordinates of an object to be detected or generation of image data.

When the input/output device in FIG. 1A is repeatedly put in the first photodetection mode in a sequence of periods, the input/output device in FIG. 1A repeatedly performs an operation of the first photodetection mode.

In the second photodetection mode, the output selection signal output circuit 113b outputs M (M is a natural number smaller than N) signals OSEL, and the photodetection reset signal output circuit 113a outputs M signals PRST.

The photodetector circuit 115p is reset in accordance with the signal PRST when provided with one of the M signals PRST and one of the M signals OSEL, and then generates optical data. Further, the photodetector circuit 115p outputs optical data as an optical data signal in accordance with the signal OSEL.

In addition, the reading circuit 116 sequentially reads optical data output from the photodetector circuits 115p.

When the input/output device in FIG. 1A is repeatedly put in the second photodetection mode in a sequence of periods, the input/output device in FIG. 1A repeatedly performs an operation of the second photodetection mode.

Note that the input/output device in FIG. 1A is switched from the first photodetection mode to the second photodetection mode when an object to be detected is not detected by reference to the value of optical data generated, for example, in a sequence of periods during which the input/output device in FIG. 1A is in the first photodetection mode.

The input/output device in FIG. 1A is switched from the second photodetection mode to the first photodetection mode, when an object to be detected is detected by reference to the value of optical data generated in a sequence of periods during which the input/output device in FIG. 1A is in the second photodetection mode.

The operation of the input/output device in FIG. 1A in either the first photodetection mode or the second photodetection mode is divided into a first display mode (Dmode1) and a second display mode (Dmode2) as shown in FIG. 1B.

In the first display mode, the display selection signal output circuit 111 outputs a signal DSEL, and the display data signal output circuit 112 outputs the signal DD.

After being supplied with the signal DSEL, the display circuit 115d is supplied with the signal DD in accordance with the signal DSEL. After being supplied with the signal DD, the display circuit 115d is put in a display state according to the signal DD. In other words, the display circuit 115d is in a state where it is supplied with display data (also referred to as a written state).

The display circuit 115d supplied with display data goes into the holding state, and maintains a display state according to data of the signal DD input to the display circuit 115d. Note that to maintain a display state is to keep the amount of change in display state so that the amount of change may not exceed a given range. This given range is set as appropriate, and is preferably set so that a user watching display images recognizes the displayed images as one image.

When the input/output device in FIG. 1A is repeatedly put in the first display mode in a sequence of periods, the input/output device in FIG. 1A repeatedly performs an operation of the first display mode.

In the second display mode, output of the signal DSEL by the display selection signal output circuit 111 is stopped. At that time, output of the signal DD by the display data signal output circuit 112 may be stopped. Stopping output of the signal DD by the display data signal output circuit 112 can reduce the power consumption of the input/output device.

At that time, the display circuit 115d is not supplied with the signal DSEL, so that the display circuit 115d still maintains the holding state, and the display state according to the signal DD that has been input to the display circuit 115d.

When the input/output device in FIG. 1A is repeatedly put in the second display mode in a sequence of periods, the input/output device in FIG. 1A repeatedly performs an operation of the second display mode.

The input/output device in FIG. 1A is switched from the first display mode to the second display mode, for example when no change occurs in the data value of a display data signal input thereto or when the absolute value of the amount of change in the data value of the display data signal is smaller than the reference value in a sequence of periods during which the input/output device in FIG. 1A is in the first display mode. When no change occurs in the data value of a display data signal input thereto or when the absolute value of the amount of change in the data value of the display data signal is smaller than the reference value in a sequence of periods, the image displayed on the pixel area 101c is a still image.

The input/output device in FIG. 1A is switched from the second display mode to the first display mode, for example when change occurs in the data value of a display data signal input thereto or when the absolute value of the amount of change in the data value of the display data signal is larger than the reference value in a sequence of periods during which the input/output device in FIG. 1A is in the second display mode. When a change occurs in the data value of a display data signal input thereto or when the absolute value of the amount of change in the data value of the display data signal is larger than the reference value in a sequence of periods, the image displayed on the pixel area 101c is a movie image.

In addition, the input/output device in FIG. 1A may be switched from the second display mode to the first display mode to be refreshed so that the display state may be put in the same state as the previous written state, for example when the amount of change in display state is beyond a given range in a sequence of periods during which the input/output device in FIG. 1A is in the second display mode.

In addition, the input/output device in FIG. 1A is switched from the second display mode to the first display mode, for example when an object to be detected is detected by reference to the value of optical data generated in a sequence of periods during which the input/output device in FIG. 1A is in the first photodetection mode and in the second display mode. This is the method for driving the input/output device in FIG. 1A.

Figure 2A:
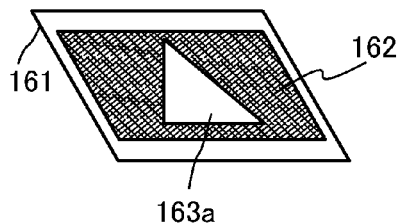
FIGS. 2A to 2C are schematic views for describing a functional example of the input/output device of Embodiment 1.
Figure 2B:
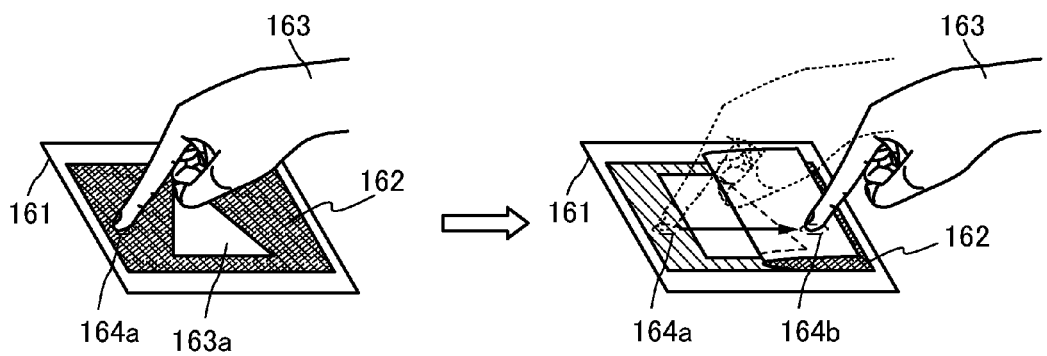
Figure 2C:
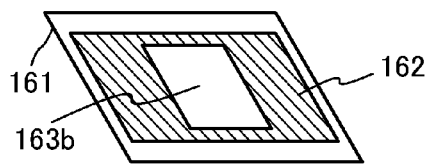

An example of a function of the input/output device of this embodiment will be described with reference to FIGS. 2A to 2C. FIGS. 2A to 2C are diagrams for describing an example of a function of the input/output device of this embodiment.

Suppose, for example, that an image 162 of a triangle 163a and the like is displayed on a pixel area 161 as shown in FIG. 2A. In this case, the input/output device is in the second photodetection mode and in the second display mode.

Then, an object 163 to be detected which is a finger, for example, is placed over a point 164a in the pixel area 161 as shown in FIG. 2B. At that time, when a change in the value of optical data obtained from the point 164a is judged to be one with which a command for switching the photodetection mode should be executed, the input/output device is switched to the first photodetection mode. At that time, the input/output device remains in the second display mode.

Then, the object 163 is moved from the point 164a to a point 164b as shown in FIG. 2B. When this movement of the object 163 is judged to be one with which a command for switching the display mode should be executed, the input/output device is switched to the first display mode. At that time, the input/output device remains in the first photodetection mode. Note that at that time, as shown in FIG. 2B, an image 162 may be a moving image that is changed from the image of the triangle 163a and the like to another image as if the page is turned in a paper book, for example.

The operation in FIG. 2B allows the image 162 to be changed from the image of the triangle 163a and the like to, for example, an image of a rectangle 163b and the like as shown in FIG. 2C. After a given period of time without the object 163 over the pixel area 161, the input/output device is switched to the second photodetection mode again. After another given period of time, the input/output device is switched to the second display mode.

As described in FIGS. 1A and 1B and FIGS. 2A to 2C, an example of the input/output device of this embodiment is switched between the first photodetection mode in which all the photodetector circuits are supplied with a signal for driving the photodetector circuits and the second photodetection mode in which one or some of the photodetector circuits are supplied with a signal for driving the photodetector circuits. Consequently, it is possible to reduce the number of driven photodetector circuits as needed, e.g., during a period when high accuracy detection is not needed.

In addition, an example of the input/output device of this embodiment is switched between the first photodetection mode and the second photodetection mode in a sequence of periods in accordance with the value of generated optical data. Consequently, a user can switch the photodetection mode of the input/output device as needed, for example.

In addition, an example of the input/output device of this embodiment is switched between the first display mode in which the display circuit is supplied with a signal for driving the display circuit and the second display mode in which output of a signal for driving the display circuit to the display circuit is stopped. Consequently, it is possible to stop, as needed, a driver circuit for outputting a signal to the display circuit e.g., during a period when writing of display data is not needed, while maintaining the display state of the image on the display circuit.

In addition, an example of the input/output device of this embodiment is switched between the first display mode and the second display mode in a sequence of periods in accordance with the value of generated optical data. Consequently, a user can switch the display mode of the input/output device as needed, for example.

As a result, the power consumption of the input/output device can be reduced without the loss of convenience in input operation.

Embodiment 2

In this embodiment, an example of a pulse signal output circuit applicable to the output selection signal output circuit or the photodetection reset signal output circuit provided in the input/output device of the above embodiment will be described.

Figure 3A:
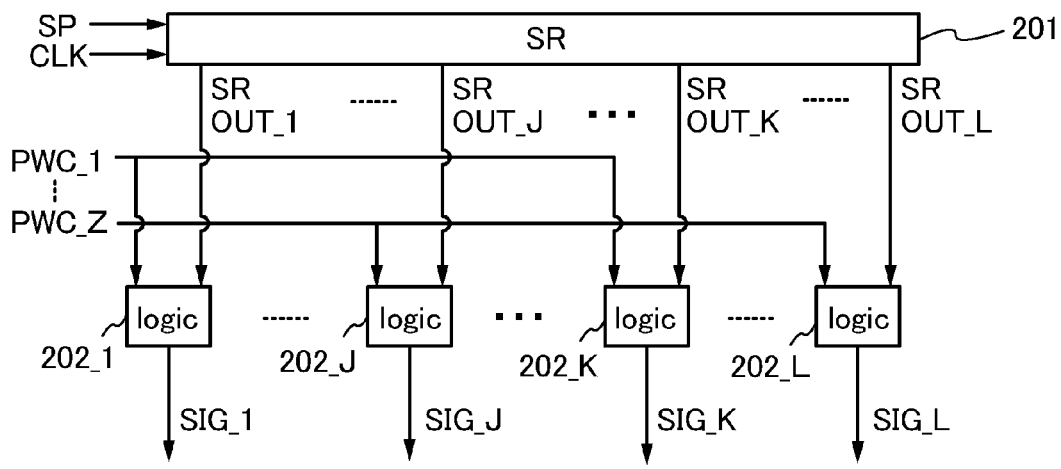
FIGS. 3A to 3C are diagrams for describing an example of a pulse signal output circuit of Embodiment 2.
Figure 3B:
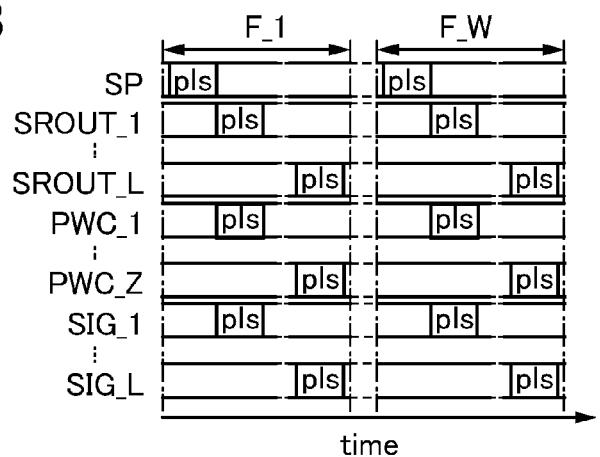

An example of a pulse signal output circuit of this embodiment will be described with reference to FIGS. 3A and 3B. FIGS. 3A and 3B are diagrams for describing an example of the pulse signal output circuit of this embodiment.

First, a structural example of the pulse signal output circuit of this embodiment will be described with reference to FIG. 3A. FIG. 3A is a block diagram illustrating a structural example of the pulse signal output circuit of this embodiment.

The pulse signal output circuit shown in FIG. 3A includes a shift register (SR) 201 and L (L is a natural number of 2 or more) logic circuits (logic circuits 202_1 to 202_L).

The shift register 201 is supplied with a start signal SP (also referred to as a signal SP) that is a pulse signal and a clock signal (a signal CLK). Note that more than one clock signal may be used. The shift register 201 has a function of outputting L pulse signals SROUT (signals SROUT_1 to SROUT_L).

The logic circuits 202_1 to 202_L are supplied with different signals selected from the signals SROUT_1 to SROUT_L.

Further, the logic circuits 202_1 to 202_L are each supplied with a signal selected from pulse control signals PWC_1 (a signal PWC_1) to PWC_Z (Z is a natural number of 2 or more and L or less) (a signal PWC_Z). Each of the signals PWC_1 to PWC_Z is a pulse signal. The pulses of the signals PWC_1 to PWC_Z are generated at different timings; the pulses of the signal PWC_1 to PWC_Z are sequentially generated in that order.

For example, as shown in FIG. 3A, the logic circuit 202_1 is supplied with the signal SROUT_1 and the signal PWC_1; the logic circuit 202_J (J is a natural number of 2 or more and less than (L−1)) is supplied with the signal SROUT_J and the signal PWC_Z; the logic circuit 202_K (K is a natural number more than J and less than L) is supplied with the signal SROUT_K and the signal PWC_1; and the logic circuit 202_L is supplied with the signal SROUT_L and the signal PWC_Z.

The logic circuits 202_1 to 202_L each have a function of outputting a pulse signal SIG (a signal SIG) in accordance with the pulse signal SROUT and the pulse control signal input thereto. For example, the logic circuit 202_1 outputs a signal SIG_1; the logic circuit 202_J outputs a signal SIG_J; the logic circuit 202_K outputs a signal SIG_K; and the logic circuit 202_L outputs a signal SIG_L.

As each of the logic circuits 202_1 to 202_L, a logic circuit such as an AND gate or an OR gate can be used, for example.

Figure 3C:
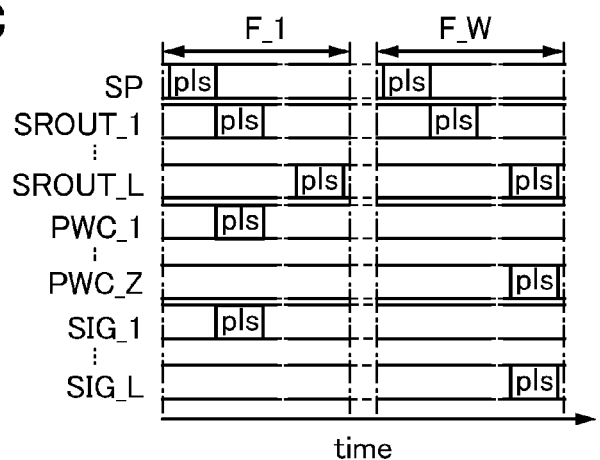

Next, an example of the driving method described with reference to FIG. 3A will be described with reference to FIGS. 3B and 3C. FIGS. 3B and 3C are diagrams for describing an example of the driving method of the pulse signal output circuit in FIG. 3A.

The operation of the pulse signal output circuit in FIG. 3A is divided into the first photodetection mode and the second photodetection mode.

In the first photodetection mode, as shown in FIG. 3B, the pulse of the signal SP is input to the shift register 201 every unit period (e.g., periods F_1 to F_W (W is a natural number of 2 or more)). When supplied with the pulse of the signal SP, the shift register 201 sequentially outputs the pulses of the signals SROUT_1 to SROUT_L. Note that the length of a unit period may be the same as that of a frame period in the display operation.

Further, the logic circuits 202_1 to 202_L are each supplied with a pulse selected from the pulse control signals PWC_1 to PWC_Z which are input to the logic circuits 202_1 to 202_L.

For example, the logic circuits 202_1 to 202_L sequentially output the pulses of the signals SIG_1 to SIG_L when supplied with the pulses of the pulse control signals and the pulses of the pulse signals SROUT.

For example, as shown in FIG. 3B, the pulse of the signal SROUT_1 and the pulse of the signal PWC_1 are input to the logic circuit 202_1 at one point in the period F_1. At this time, the pulse of the signal SIG_1 is output from the logic circuit 202_1. Further, the pulse of the signal SROUT_L and the pulse of the signal PWC_Z are input to the logic circuit 202_L at another point in the period F_1. At this time, the pulse of the signal SIG_L is output from the logic circuit 202_L.

In addition, in the second photodetection mode, output of one or more and less than Z pulse control signals selected from the signals PWC_1 to PWC_Z to any of the logic circuits is stopped.

For example, in FIG. 3C, every unit period, the type of pulse control signals to be not output is changed and the rest of pulse control signals is output to the logic circuits.

At this time, the logic circuits output the pulses of the signals SIG when supplied with the pulses of the pulse control signals and the pulses of the pulse signals SROUT every unit period.

For example, as shown in FIG. 3C, the pulse of the signal SROUT_1 and the pulse of the signal PWC_1 are input to the logic circuit 202_1 at one point in the period F_1. At this time, the pulse of the signal SIG_1 is output from the logic circuit 202_1. In the period F_1, the other pulse control signals are not input and the pulses of the other signals SIG are not output. Further, the pulse of the signal SROUT_L and the pulse of the signal PWC_Z are input to the logic circuit 202_L at one point in the period F_W. At this time, the pulse of the signal SIG_L is output from the logic circuit 202_L. In the period F_W, the other pulse control signals are not input and the pulses of the other signals SIG are not output.

As shown in FIGS. 3A to 3C, an example of the pulse signal output circuit of this embodiment includes a shift register and logic circuits which generate and output pulse signals in accordance with the output signals and the pulse control signals from the shift register. Consequently, it is possible to select the number of pulse signals to be output by only controlling input/output of the pulse control signals, thereby simplifying the configurations of the photodetection reset signal output circuit and the output selection signal output circuit.

Embodiment 3

In this embodiment, an example of a shift register which can be used in a output selection signal output circuit and a display data signal output circuit of the input/output device of the above embodiment will be described.

An example of a shift register of this embodiment includes a plurality of sequential logic circuits (FF) consisting of a plurality of stages.

Figure 4A:
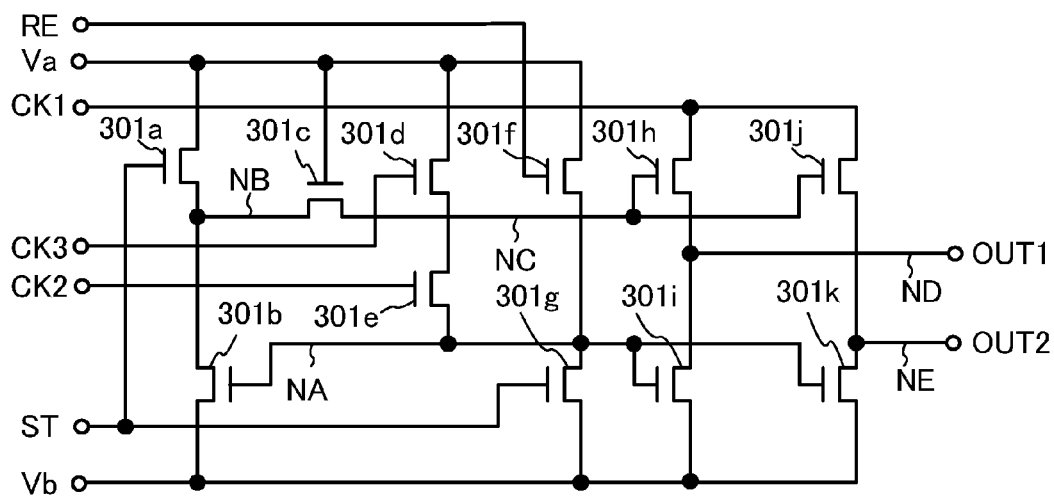
FIGS. 4A and 4B are diagrams for describing an example of a sequential logic circuit in a shift register of Embodiment 3.
Figure 4B:
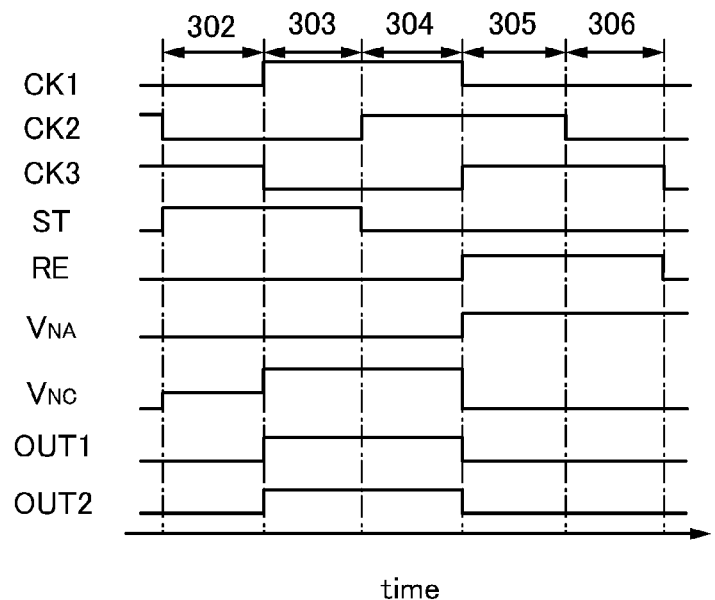

Each of the plurality of sequential logic circuits will be described with reference to FIGS. 4A and 4B. FIGS. 4A and 4B are diagrams for describing the sequential logic circuit in the shift register of this embodiment.

First, a configuration example of a sequential logic circuit of this embodiment will be described with reference to FIG. 4A. FIG. 4A is a circuit diagram illustrating the configuration example of the sequential logic circuit.

The sequential logic circuit in FIG. 4A is supplied with a set signal ST, a reset signal RE, a clock signal CK1, a clock signal CK2, and a clock signal CK3. The sequential logic circuit has a function of outputting a signal OUT1 and a signal OUT2.

A signal used in the shift register of this embodiment may be a signal based on voltage, for example. A signal based on voltage (a voltage signal) may be an analog signal or a digital signal that goes to at least a first voltage or a second voltage. For example, a binary digital signal such as a clock signal goes low or high, that is, goes to the first voltage (low-level voltage) or the second voltage (high-level voltage). Note that it is preferable that the high-level voltage and the low-level voltage each have a fixed value. However, the high-level voltage and the low-level voltage each do not necessarily have a fixed value and each may have values that can be regarded as substantially equivalent values, because an electronic circuit may be adversely affected by noise or the like.

The clock signal CK2 is delayed from the clock signal CK1 by a ¼ cycle, and the clock signal CK3 is delayed from the clock signal CK2 by a ¼ cycle.

The sequential logic circuit illustrated in FIG. 4A includes a transistor 301a, a transistor 301b, a transistor 301c, a transistor 301d, a transistor 301e, a transistor 301f, a transistor 301g, a transistor 301h, a transistor 301i, a transistor 301j, and a transistor 301k.

A voltage Va is input to one of a source and a drain of the transistor 301a, and the set signal ST is input to a gate of the transistor 301a.

One of a source and a drain of the transistor 301b is electrically connected to the other of the source and the drain of the transistor 301a, and a voltage Vb is input to the other of the source and the drain of the transistor 301b.

One of a source and a drain of the transistor 301c is electrically connected to the other of the source and the drain of the transistor 301a, and the voltage Va is input to a gate of the transistor 301c.

The voltage Va is input to one of a source and the drain of a transistor 301d, and the clock signal CK3 is input to a gate of the transistor 301d.

One of a source and a drain of the transistor 301e is electrically connected to the other of the source and the drain of the transistor 301d, the other of the source and the drain of the transistor 301e is electrically connected to a gate of the transistor 301b, and the clock signal CK2 is input to a gate of the transistor 301e.

The voltage Va is input to one of a source and a drain of the transistor 301f, and the reset signal RE is input to a gate of the transistor 301f.

One of a source and a drain of the transistor 301g is electrically connected to the gate of the transistor 301b and the other of the source and the drain of the transistor 301f, the voltage Vb is input to the other of the source and the drain of the transistor 301g, and the set signal ST is input to a gate of the transistor 301g.

The clock signal CK1 is input to one of a source and a drain of the transistor 301h, and a gate of the transistor 301h is electrically connected to the other of the source and the drain of the transistor 301c.

One of a source and a drain of the transistor 301i is electrically connected to the other of the source and the drain of the transistor 301h, the voltage Vb is input to the other of the source and the drain of the transistor 301i, and a gate of the transistor 301i is electrically connected to the gate of the transistor 301b.

The clock signal CK1 is input to one of a source and a drain of the transistor 301j, and a gate of the transistor 301j is electrically connected to the other of the source and the drain of the transistor 301c.

One of a source and a drain of the transistor 301k is electrically connected to the other of the source and the drain of the transistor 301j, the voltage Vb is input to the other of the source and the drain of the transistor 301k, and a gate of the transistor 301k is electrically connected to the gate of the transistor 301b.

Note that one of the voltage Va and the voltage Vb is a high supply voltage Vdd, and the other is a low supply voltage Vss. The high supply voltage Vdd is a voltage the value of which is relatively higher than that of the low supply voltage Vss. The low supply voltage Vss is a voltage the value of which is relatively lower than that of the high supply voltage Vdd. The value of the voltage Va and the value of the voltage Vb may interchange depending, for example, on the conductivity type of the transistor. A difference between the voltage Va and the voltage Vb is power supply voltage.

In FIG. 4B, a connection point of the gate of the transistor 301b, the other of the source and the drain of the transistor 301e, the other of the source and the drain of the transistor 301f, and the one of the source and the drain of the transistor 301g, the gate of the transistor 301i, and the gate of the transistor 301k is referred to a node NA. In addition, a connection point of the other of the source and the drain of the transistor 301a, the one of the source and the drain of the transistor 301b, and the one of the source and the drain of the transistor 301c is referred to as a node NB. A connection point of the other of the source and the drain of the transistor 301c, the gate of the transistor 301h, and the gate of the transistor 301j is referred to as a node NC. A connection point of the other of the source and the drain of the transistor 301h and the one of the source and the drain of the transistor 301i is referred to as a node ND. A connection point of the other of the source and the drain of the transistor 301j and the one of the source and the drain of the transistor 301k is referred to as a node NE.

The sequential logic circuit in FIG. 4B outputs the voltage of the node ND as the signal OUT1, and the voltage of the node NE as the signal OUT2.

The transistors 301a to 301k can be of the same conductivity type. Each of the transistors 301a to 301k can be, for example, a transistor including a semiconductor layer of a semiconductor belonging to Group 14 (such as silicon) in which a channel is formed or a transistor including an oxide semiconductor layer.

An example of operation of the sequential logic circuit illustrated in FIG. 4A will be described with reference to FIG. 4B. FIG. 4B is a timing chart for describing the example of the operation of the sequential logic circuit in FIG. 4A. Suppose that the transistors 301a to 301k in the sequential logic circuit in FIG. 4A are all n-channel transistors, the threshold voltages of the transistor 301h and the transistor 301j are the same voltage Vth, the high supply voltage Vdd is used as the voltage Va, and the low supply voltage Vss is used as the voltage Vb.

First, the sequential logic circuit in FIG. 4A is set when supplied with the pulse of the set signal ST during a period 302 and a period 303. Then, for example, the transistor 301g is turned on in the period 303, so that the value of the voltage of the node NA becomes equal to the value of the voltage Vb, thereby turning off the transistor 301i and the transistor 301k. In the period 303, the transistor 301a and the transistor 301c are turned on and the transistor 301b is turned off. In a period 304, the transistor 301a is turned off. Consequently, during the period 303 and the period 304, the voltage of the node NC is increased to a value larger than the sum of the voltage Va and the voltage Vth, that is, (Va+Vth+Vx) by capacitive coupling due to parasitic capacitance that occurs between the gate and the other of the source and the drain of the transistor 301h and between the gate and the other of the source and the drain of the transistor 301j. Thus, the transistor 301h and the transistor 301j are turned on. As a result, the sequential logic circuit in FIG. 4A outputs the pulses of the signal OUT1 and the signal OUT2 during the period 303 and the period 304. Then, the sequential logic circuit in FIG. 4A is reset when supplied with the pulse of the reset signal RE during a period 305 and a period 306. Then, the transistor 301f is turned on in the period 305, for example, so that the value of the voltage of the node NA becomes equal to the value of the voltage Va, thereby turning on the transistor 301i and the transistor 301k. In the period 305, the transistor 301d and the transistor 301e are turned on by the clock signal CK2 and the clock signal CK3, so that the value of the voltage of the node NC becomes equal to the value of the voltage Vb, thereby turning off the transistor 301h and the transistor 301j. Consequently, the signal OUT1 and the signal OUT2 are low during the period 305 and the period 306. This is the example of the operation of the sequential logic circuit in FIG. 4A.

As described with reference to FIG. 4B, the sequential logic circuit in FIG. 4A goes into the set state when supplied with the set signal and outputs the pulses of the signal OUT1 and the signal OUT2. Then, the sequential logic circuit in FIG. 4A is reset when supplied with the reset signal, and the signal OUT1 and the signal OUT2 go low.

Figure 5A:
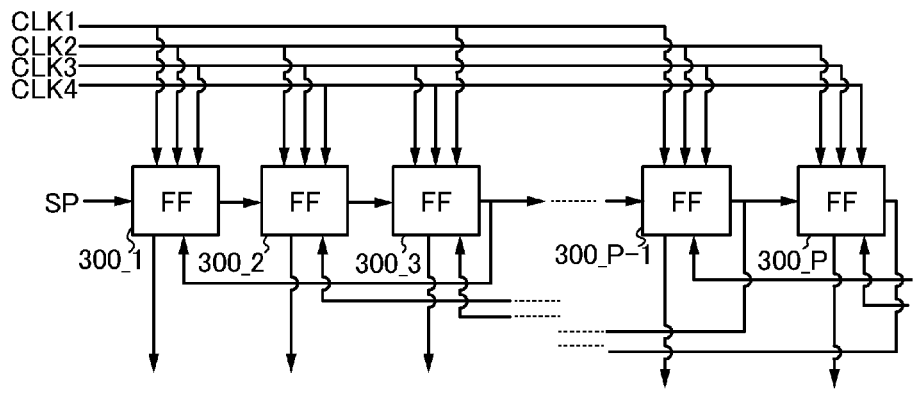
FIGS. 5A and 5B are diagrams for describing an example of a shift register of Embodiment 3.
Figure 5B:
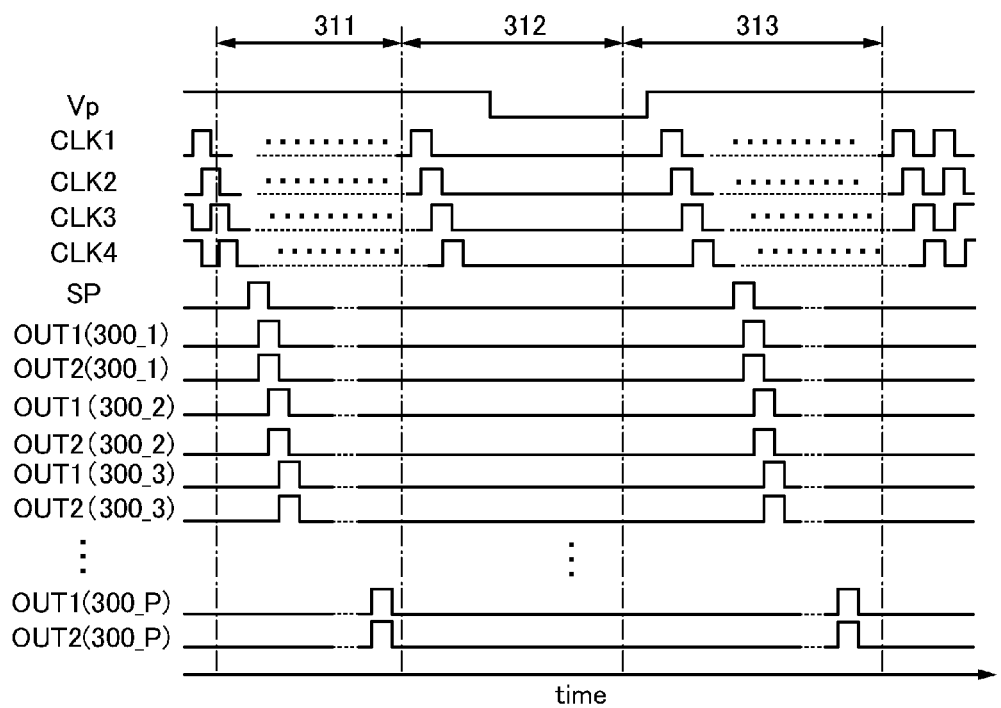

Next, an example of the shift register including the sequential logic circuit in FIG. 4A will be described with reference to FIGS. 5A and 5B. FIGS. 5A and 5B illustrate an example of the shift register of this embodiment.

First, a structural example of the shift register including the sequential logic circuit in FIG. 4A will be described with reference to FIG. 5A. FIG. 5A is a block diagram illustrating a structural example of the shift register of this embodiment.

The shift register in FIG. 4A includes P-stage (P is a natural number greater than or equal to 3) sequential logic circuits (FFs).

The shift register in FIG. 5A is supplied with a start signal (a start signal SP) and clock signals (clock signals CLK1, CLK2, CLK3, and CLK4). The clock signal CLK2 is delayed from the clock signal CLK1 by a ¼ cycle, the clock signal CLK3 is delayed from the clock signal CLK2 by a ¼ cycle, and the clock signal CLK4 is delayed from the clock signal CLK3 by a ¼ cycle. Note that any three of the clock signals CLK1 to CLK4 may be used as the clock signals CK1, CK2, and CK3 of each sequential logic circuit. The adjacent sequential logic circuits are not supplied with the same combination of clock signals. Use of a plurality of clock signals improves the speed of operation for outputting a signal from the shift register.

Further, the start signal SP is input as the set signal ST to the gate of the transistor 301a and the gate of the transistor 301g in the first sequential logic circuit 300_1.

The gate of the transistor 301a and the gate of the transistor 301g in the (H+2)-th (H is a natural number less than or equal to (P−2)) sequential logic circuit 300_H+2 are electrically connected to the other of the source and the drain of the transistor 301h in the (H+1)-th sequential logic circuit 300_H+1. At that time, the signal OUT1 in the sequential logic circuit 300_H+1 is the set signal ST in the sequential logic circuit 300_H+2.

The other of the source and the drain of the transistor 301h in the U-th (U is a natural number greater than or equal to 3 and less than or equal to P) sequential logic circuit 300_U is electrically connected to the gate of the transistor 301f in the (U−2)-th sequential logic circuit 300_U−2. In this case, the signal OUT1 in the sequential logic circuit 300_U is the reset signal RE in the sequential logic circuit 300_U−2.

Further, a signal RP1 is input as a reset signal to the gate of the transistor 301f in the (P−1)-th sequential logic circuit 300_P−1. The signal OUT2 outputted from the (P−1)-th sequential logic circuit 300_P−1 is not necessarily used to operate the other circuits.

A signal RP2 is input as a reset signal to the gate of the transistor 301f in the P-th sequential logic circuit 300_P. The signal OUT2 outputted from the P-th sequential logic circuit 300_P is not necessarily used to operate the other circuits.

Then, an example of the operation of a method for driving the shift register in FIG. 5A will be described with reference to FIG. 5B. FIG. 5B is a timing chart for describing an example of a driving method of the shift register in FIG. 5A.

The operation of the shift register in FIG. 5A is divided into a first display mode and a second display mode.

First, an example of operation performed in the first display mode will be described. In this mode, as shown in a period 311 in the FIG. 5B, a start signal SP, a power supply voltage Vp, and clock signals CLK1 to CLK4 are input to the shift register. A pulse of the start signal SP is input to the first sequential logic circuit 300_1, whereby pulses of the signals OUT1 and the signals OUT2 of the first sequential logic circuit 300_1 to P-th sequential logic circuit 300_P are output sequentially in accordance with the clock signals CLK1 to CLK4. That is, the signals OUT1 and the signals OUT2 of the first sequential logic circuit 300_1 to P-th sequential logic circuit 300_P are output.

Next, operation performed when the display mode is switched from the first operation mode to the second operation mode will be described. In this case, as shown in a period 312 in FIG. 5B, outputs of the power supply voltage Vp, the clock signals CLK1 to CLK4, and the start signal SP to the shift register are stopped.

At this time, the output of the start signal SP to the shift register is stopped first, the outputs of the clock signals CLK1, CLK2, CLK3, and CLK4 to the shift register are sequentially stopped, and then the output of the power supply voltage Vp to the shift register is stopped, so that malfunction of the shift register that occurs when the outputs of signals from the shift register are stopped can be reduced.

When outputs of the power supply voltage Vp, the clock signals CLK1 to CLK4, and start signal SP to the shift register are stopped, outputs of pulses of the signals OUT1 and the signals OUT2 from the first sequential logic circuit 300_1 to P-th sequential logic circuit 300_P are stopped. That is, outputs of the signals OUT1 and the signals OUT2 from the first sequential logic circuit 300_1 to P-th sequential logic circuit 300_P are stopped. The operation of the input/output device is accordingly switched to the second display mode.

In the case where outputs of the signals in the shift register are restarted after the outputs of the signals in the shift register are stopped, as shown in a period 313 in FIG. 5B, outputs of the start signal SP, the clock signals CLK1 to CLK4, and the power supply voltage Vp to the shift register are restarted.

At this time, the output of the power supply voltage Vp to the shift register is first restarted, the outputs of the clock signals CLK1, CLK2, CLK3, and CLK4 to the shift register are sequentially restarted, and then the output of the start signal SP to the shift register is restarted. Moreover, in this case, the clock signals CLK1 to CLK4 are preferably output after the high supply potential Vdd is applied to a wire to which the clock signals CLK1 to CLK4 are to be output.

The outputs of the start signal SP, the clock signals CLK1 to CLK4, and the power supply voltage Vp to the shift register are restarted, and a pulse of the start signal SP is input to the first sequential logic circuit 300_1, whereby pulses of the signals OUT1 and the signals OUT2 of the first sequential logic circuit 300_1 to the P-th sequential logic circuit 300_P are sequentially output in accordance with the clock signals CLK1 to CLK4. That is, the outputs of the signals OUT1 and the signals OUT2 of the first sequential logic circuit 300_1 to the P-th sequential logic circuit 300_P are restarted. The operation of the input/output device is accordingly switched to the first display mode.

As described with reference to FIGS. 4A and 4B and FIGS. 5A and 5B, the shift register of this embodiment includes the sequential logic circuits of the plurality of stages. Each of the plurality of sequential logic circuits includes a first transistor, a second transistor, and a third transistor. The first transistor has a gate to which a set signal is input and controls whether to turn on the second transistor in accordance with the set signal. The second transistor has a source and a drain one of which is supplied with a clock signal and controls whether to set the voltage of an output signal from the sequential logic circuit to a value corresponding to the voltage of the clock signal. The third transistor has a gate to which a reset signal is input and controls whether to turn off the second transistor in accordance with the reset signal. With such a structure, the output of signals of the shift register can be easily stopped.

Moreover, the shift register of this embodiment can be used for the display selection signal output circuit in the input/output device of the above embodiment. Thus, a period during which an output of the display selection signal is stopped can be provided. With such a structure, the outputs of the start signal, the clock signal, and the power supply voltage to the shift register are stopped, so that the output of the signals of the shift register are stopped, thereby stopping the output of the display selection signal.

Moreover, the shift register of this embodiment can be used for the display data signal output circuit in the input/output device of the above embodiment. Thus, a period during which the output of the display data signal is stopped can be provided. With such a structure, the outputs of the start signal, the clock signal, and the power supply voltage are stopped, so that the output of the signals of the shift register are stopped, thereby stopping the output of the display data signal.

Embodiment 4

In this embodiment, examples of the photodetector circuit in the input/output device of the above embodiment are described.

Examples of the photodetector circuit in this embodiment will be described with reference to FIGS. 6A to 6F. FIGS. 6A to 6F illustrate the examples of the photodetector circuit of this embodiment.

Figure 6A:
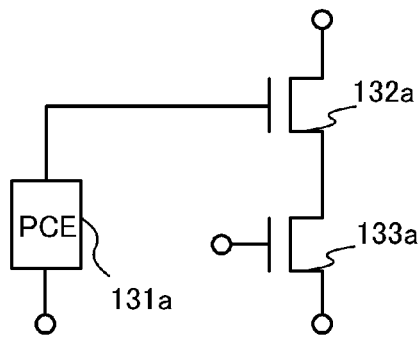
FIGS. 6A to 6F are diagrams for describing examples of a photodetector circuit of Embodiment 4.
Figure 6D:
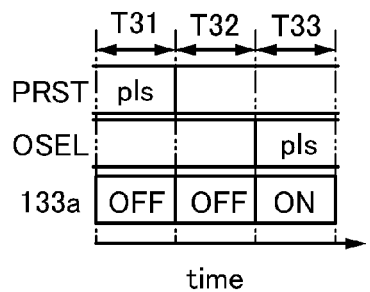
Figure 6B:
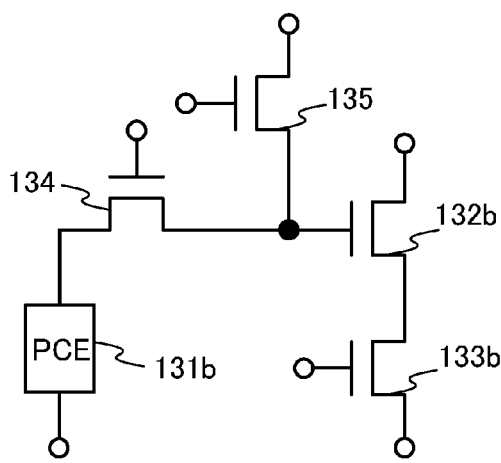
Figure 6E:
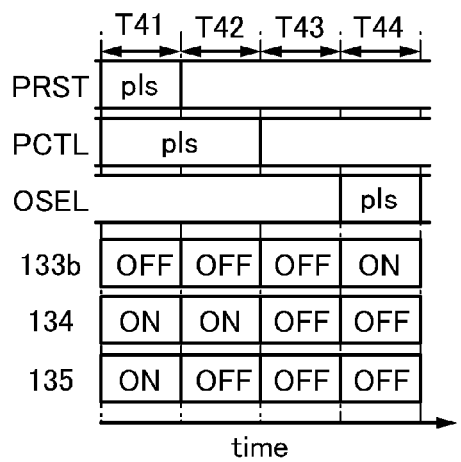
Figure 6C:
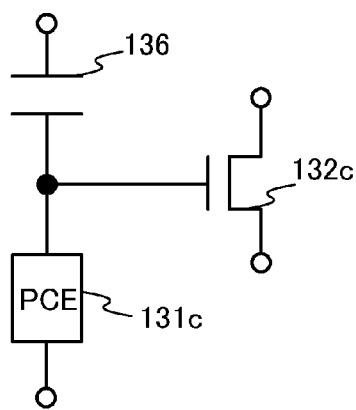

First, structural examples of the photodetector circuit of this embodiment will be described with reference to FIGS. 6A to 6C. FIGS. 6A to 6C illustrate the structural examples of the photodetector circuit of this embodiment.

The photodetector circuit illustrated in FIG. 6A includes a photoelectric transducer 131a, a transistor 132a, and a transistor 133a.

Note that in the photodetector circuit illustrated in FIG. 6A, the transistor 132a and the transistor 133a are field-effect transistors.

The photoelectric transducer 131a has a first current terminal and a second current terminal. A signal PRST is input to the first current terminal of the photoelectric transducer 131a.

A gate of the transistor 132a is electrically connected to the second current terminal of the photoelectric transducer 131a.

One of a source and a drain of the transistor 133a is electrically connected to one of a source and a drain of the transistor 132a. A signal OSEL is input to a gate of the transistor 133a.

Voltage Va is applied to either the other of the source and the drain of the transistor 132a or the other of the source and the drain of the transistor 133a.

In addition, the photodetector circuit illustrated in FIG. 6A outputs optical data from the rest of the other of the source and the drain of the transistor 132a or the other of the source and the drain of the transistor 133a as an optical data signal.

The photodetector circuit illustrated in FIG. 6B includes a photoelectric transducer 131b, a transistor 132b, a transistor 133b, a transistor 134, and a transistor 135.

Note that in the photodetector circuit illustrated in FIG. 6B, the transistor 132b, the transistor 133b, the transistor 134, and the transistor 135 are field-effect transistors.

The photoelectric transducer 131b has a first current terminal and a second current terminal. Voltage Vb is input to the first current terminal of the photoelectric transducer 131b.

One of a source and a drain of the transistor 134 is electrically connected to the second current terminal of the photoelectric transducer 131b. A photo detection control signal (a signal PCTL) is input to a gate of the transistor 134. The photo detection control signal is a pulse signal.

A gate of the transistor 132b is electrically connected to the other of the source and the drain of the transistor 134.

The voltage Va is applied to one of a source and a drain of the transistor 135. The other of the source and the drain of the transistor 135 is electrically connected to the other of the source and the drain of the transistor 134. A signal PRST is input to a gate of the transistor 135.

One of a source and a drain of the transistor 133b is electrically connected to one of a source and a drain of the transistor 132b. A signal OSEL is input to a gate of the transistor 133b.

The voltage Va is applied to either the other of the source and the drain of the transistor 132b or the other of the source and the drain of the transistor 133b.

In addition, the photodetector circuit illustrated in FIG. 6B outputs optical data from the rest of the other of the source and the drain of the transistor 132b or the other of the source and the drain of the transistor 133b as an optical data signal.

Note that when the input/output unit includes a plurality of the photodetector circuits shown in FIG. 6B, the same photodetection control signal can be input to all the photodetector circuits. A driving method in which the same photodetection control signal is input to all the photodetector circuits to generate optical data is also called a global shutter method.

The photodetector circuit in FIG. 6C includes a photoelectric transducer 131c, a transistor 132c, and a capacitor 136.

The photoelectric transducer 131c has a first current terminal and a second current terminal. A reset signal PRST is input to the first current terminal of the photoelectric transducer 131c.

The capacitor 136 includes a first capacity electrode and a second capacity electrode. The signal OSEL is input to the first capacity electrode of the capacitor 136. The second capacity electrode of the capacitor 136 is electrically connected to the second current terminal of the photoelectric transducer 131c.

The voltage Va is applied to one of a source and a drain of the transistor 132c. A gate of the transistor 132c is electrically connected to the second current terminal of the photoelectric converter 131c.

Note that the photodetector circuit in FIG. 6C outputs optical data as an optical data signal from the other of the source and the drain of the transistor 132c.

Further, the components of the photodetector circuits illustrated in FIGS. 6A to 6C will be described.

As the photoelectric transducers 131a to 131c, photodiodes, phototransistors, or the like can be used. In the case where the photoelectric transducers 131a to 131c are photodiodes, one of an anode and a cathode of the photodiode corresponds to the first current terminal of the photoelectric transducer, and the other of the anode and the cathode of the photodiode corresponds to the second current terminal of the photoelectric transducer. In the case where the photoelectric transducers 131a to 131c are phototransistors, one of a source and a drain of the phototransistor corresponds to the first current terminal of the photoelectric transducer, and the other of the source and the drain of the phototransistor corresponds to the second current terminal of the photoelectric transducer.

The transistors 132a to 132c function as amplifier transistors.

The transistor 134 functions as a photodetection control transistor. A photodetection control transistor has a function of controlling whether or not the voltage of the gate of an amplifier transistor is set to a value determined in accordance with photocurrent flowing through a photoelectric converter. Although the transistor 134 is not necessarily provided in the photodetector circuit of this embodiment, providing the transistor 134 allows the voltage of the gate of the transistor 132b to be held for a certain period of time when the gate of the transistor 132b is in a floating state.

The transistor 135 functions as a photodetection reset transistor. A photodetection reset selection transistor has a function of selecting whether or not the voltage of the gate of the amplifier transistor is set to a reference value.

The transistors 133a and 133b function as output selection transistors.

Note that each of the transistors 132a, 132b, 133a, 133b, 134, and 135 is, for example, a transistor including a semiconductor layer containing a semiconductor that belongs to Group 14 in the periodic table (e.g., silicon) or an oxide semiconductor layer. Channels are formed in the semiconductor layer and the oxide semiconductor layer of the transistors. For example, with the use of the transistor including the oxide semiconductor layer, fluctuation in gate voltage due to the leakage current of each of the transistors 132a, 132b, 133a, 133b, 134, and 135 can be reduced.

Next, examples of methods for driving the photodetector circuits illustrated in FIGS. 5A to 5C will be described.

First, the example of the method for driving the photodetector circuit illustrated in FIG. 6A will be described with reference to FIG. 6D. FIG. 6D is a timing chart for describing the example of the method for driving the photodetector circuit illustrated in FIG. 6A and illustrates the states of the signal PRST, the signal OSEL, and the transistor 133a. Note that the case where the photoelectric transducer 131a is a photodiode is described as an example here.

In the example of the method for driving the photodetector circuit illustrated in FIG. 6A, first, in a period T31, the pulse of the signal PRST is input. From the period T31 to a period 32, the pulse of the signal PCTL is input. Note that in the period T31, a timing of starting the input of the pulse of the signal PRST may be earlier than a timing of starting the input of the pulse of the signal PCTL.

In that case, the photoelectric transducer 131a is forward-biased, and the transistor 133a is turned off.

At that time, the voltage of the gate of the transistor 132a is reset to a certain value.

Then, in the period T32 coming after the pulse of the signal PRST is input, the photoelectric transducer 131a is reverse-biased, and the transistor 133a is kept off.

At this time, photocurrent flows between the first current terminal and the second current terminal of the photoelectric transducer 131a in accordance with the illuminance of light incident on the photoelectric transducer 131a. Further, the voltage value of the gate of the transistor 132a is changed in accordance with the photocurrent. In that case, channel resistance between the source and the drain of the transistor 132a is changed.

Then, in a period T34, the pulse of the signal OSEL is input.

At this time, the photoelectric transducer 131a is kept reverse-biased, the transistor 133a is turned on, and current flows through the source and the drain of the transistor 132a and the source and the drain of the transistor 133a. The amount of the current flowing through the source and the drain of the transistor 132a and the source and the drain of the transistor 133a depends on the voltage value of the gate of the transistor 132a. Thus, optical data has a value based on the illuminance of light incident on the photoelectric transducer 131a. In addition, the photodetector circuit illustrated in FIG. 6A outputs optical data from the rest of the other of the source and the drain of the transistor 132a or the other of the source and the drain of the transistor 133a as an optical data signal. This is the example of the method for driving the photodetector circuit illustrated in FIG. 6A.

Next, the example of the method for driving the photodetector circuit illustrated in FIG. 6B will be described with reference to FIG. 6E. FIG. 6E is a timing chart for describing the example of the method for driving the photodetector circuit illustrated in FIG. 6B.

In the example of the method for driving the photodetector circuit illustrated in FIG. 6B, first, in a period T41, the pulse of the signal PRST is input. In the period T41 and a period T42, the pulse of the signal PCTL is input. Note that in the period T41, a timing of starting the input of the pulse of the signal PRST may be earlier than timing of starting the input of the signal PCTL.

At this time, in the period T41, the photoelectric transducer 131b is forward-biased, and the transistor 134 is turned on, so that the voltage value of the gate of the transistor 132b is reset to a value equivalent to the value of the voltage Va.

Further, in the period T42 coming after the pulse of the signal PRST is input, the photoelectric transducer 131b is reverse-biased, the transistor 134 is kept on, and the transistor 135 is turned off.

At this time, photocurrent flows between the first current terminal and the second current terminal of the photoelectric transducer 131b in accordance with the illuminance of light incident on the photoelectric transducer 131b. Further, the voltage value of the gate of the transistor 132b is changed in accordance with the photocurrent. In this case, channel resistance between the source and the drain of the transistor 132b is changed.

Further, in a period T43 coming after the signal PCTL is input, the transistor 134 is turned off.

At this time, the voltage of the gate of the transistor 132b is kept being a value determined in accordance with the photocurrent of the photoelectric transducer 131b in the period T42. Although the period T43 is not necessarily provided, providing the period T43 allows a timing of outputting a data signal in the photodetector circuit to be set as appropriate. For example, a timing of outputting a data signal in each of the plurality of photodetector circuits can be set as appropriate.

In a period T44, the pulse of the signal OSEL is input.

At this time, the photoelectric transducer 131b is kept reverse-biased and the transistor 133b is turned on.

Further at this time, current flows through the source and the drain of the transistor 132b and the source and the drain of the transistor 133b, and the photodetector circuit illustrated in FIG. 6B outputs optical data as a data signal from the rest of the other of the source and the drain of the transistor 132b or the other of the source and the drain of the transistor 133b. This is the example of the method for driving the photodetector circuit illustrated in FIG. 6B.

Figure 6F:
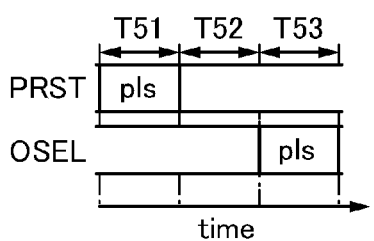

Next, the example of the driving method of the photodetector circuit in FIG. 6C will be described with reference to FIG. 6F. FIG. 6F is a timing chart for describing the example of the method for driving the photodetector circuit illustrated in FIG. 6C.

In the example of the method for driving the photodetector circuit illustrated in FIG. 6C, first, in a period T51, the pulse of the signal PRST is input.

At that time, the photoelectric transducer 131c is forward-biased and the voltage of the gate of the transistor 132c is reset to a certain value.

Then, in a period T52 coming after the pulse of the signal PRST is input, the photoelectric transducer 131c is reverse-biased.

At this time, photocurrent flows between the first current terminal and the second current terminal of the photoelectric transducer 131c in accordance with the illuminance of light incident on the photoelectric transducer 131c. Further, the voltage of the gate of the transistor 132c is changed in accordance with the photocurrent. In that case, the resistance value of a channel between the source and the drain of the transistor 132c is changed.

Then, in a period T53, the pulse of the signal OSEL is input.

At that time, the photoelectric transducer 131c is kept reverse-biased, a current flows between the source and the drain of the transistor 132c, and the photodetector circuit in FIG. 6C outputs optical data as a data signal from the other of the source and the drain of the transistor 132c. This is the example of the method for driving the photodetector circuit illustrated in FIG. 6C.

As described with reference to FIGS. 6A to 6F, the example of the photodetector circuit of this embodiment includes the photoelectric transducer and the amplifier transistor. In the example of the photodetector circuit of this embodiment, optical data is generated and is output as a data signal in accordance with an output selection signal. With such a structure, the photodetector circuit can generate and output optical data.

Embodiment 5

In this embodiment, examples of the display circuit in the input/output device of the above embodiment are described.

Examples of the display circuit of this embodiment are described with reference to FIGS. 7A to 7D. FIGS. 7A to 7D illustrate the examples of the display circuit of this embodiment.

Figure 7A:
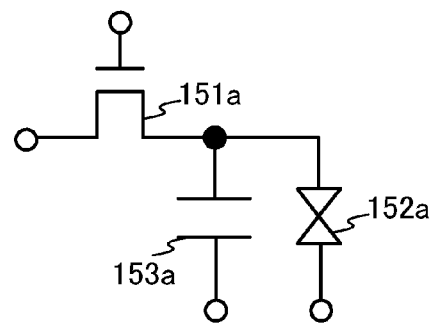
FIGS. 7A to 7D are diagrams for describing examples of a display circuit of Embodiment 5.
Figure 7C:
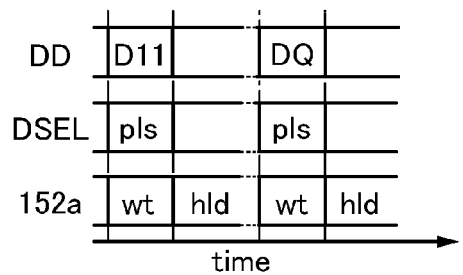
Figure 7B:
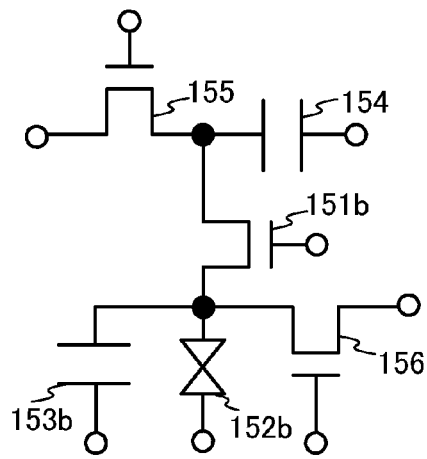

First, structural examples of the display circuit of this embodiment will be described with reference to FIGS. 7A and 7B. FIGS. 7A and 7B illustrate the structural examples of the display circuit of this embodiment.

The display circuit illustrated in FIG. 7A includes a transistor 151a, a liquid crystal element 152a, and a capacitor 153a.

Note that in the display circuit illustrated in FIG. 7A, the transistor 151a is a field-effect transistor.

In addition, in the input/output device, the liquid crystal element includes a first display electrode, a second display electrode, and a liquid crystal layer. The light transmittance of the liquid crystal layer changes depending on voltage applied between the first display electrode and the second display electrode.

Further, in the input/output device, the capacitor includes a first capacitor electrode, a second capacitor electrode, and a dielectric layer overlapping with the first capacitor electrode and the second capacitor electrode. Electrical charge is accumulated in the capacitor in accordance with voltage applied between the first capacitor electrode and the second capacitor electrode.

A signal DD is input to one of a source and a drain of the transistor 151a, and a signal DSEL is input to a gate of the transistor 151a.

The first display electrode of the liquid crystal element 152a is electrically connected to the other of the source and the drain of the transistor 151a. Voltage Vc is input to the second display electrode of the liquid crystal element 152a. The value of the voltage Vc can be set as appropriate.

The first capacitor electrode of the capacitor 153a is electrically connected to the other of the source and the drain of the transistor 151a. The voltage Vc is input to the second capacitor electrode of the capacitor 153a.

The display circuit illustrated in FIG. 7B includes a transistor 151b, a liquid crystal element 152b, a capacitor 153b, a capacitor 154, a transistor 155, and a transistor 156.

Note that in the display circuit illustrated in FIG. 7B, the transistor 151b, the transistor 155, and the transistor 156 are field-effect transistors.

A signal DD is input to one of a source and a drain of the transistor 155. A write selection signal (a signal WSEL) that is a pulse signal is input to a gate of the transistor 155.

A first capacitor electrode of the capacitor 154 is electrically connected to the other of the source and the drain of the transistor 155. The voltage Vc is input to a second capacitor electrode of the capacitor 154.

One of a source and a drain of the transistor 151b is electrically connected to the other of the source and the drain of the transistor 155. A signal DSEL is input to a gate of the transistor 151b.

A first display electrode of the liquid crystal element 152b is electrically connected to the other of the source and the drain of the transistor 151b. The voltage Vc is input to a second display electrode of the liquid crystal element 152b.

A first capacitor electrode of the capacitor 153b is electrically connected to the other of the source and the drain of the transistor 151b. The voltage Vc is input to a second capacitor electrode of the capacitor 153b. The value of the voltage Vc is set as appropriate in accordance with the specifications of the display circuit.

Reference voltage is input to one of a source and a drain of the transistor 156. The other of the source and the drain of the transistor 156 is electrically connected to the other of the source and the drain of the transistor 151b. A display reset signal (a signal DRST) that is a pulse signal is input to a gate of the transistor 156.

Further, the components of the display circuits illustrated in FIGS. 7A and 7B will be described.

The transistors 151a and 151b function as display selection transistors.

As each of the liquid crystal layers of the liquid crystal elements 152a and 152b, a liquid crystal layer for transmitting light when voltage applied to a first display electrode and a second display electrode is 0 V can be used. For example, a liquid crystal layer containing an electrically controlled birefringence liquid crystal (ECB liquid crystal), a liquid crystal to which a dichroic pigment is added (a GH liquid crystal), a polymer dispersed liquid crystal, or a discotic liquid crystal can be used. A liquid crystal layer exhibiting a blue phase may be used as the liquid crystal layer. The liquid crystal layer exhibiting a blue phase contains, for example, a liquid crystal composition including a liquid crystal exhibiting a blue phase and a chiral agent. The liquid crystal exhibiting a blue phase has a short response time of 1 ms or less and is optically isotropic, which makes the alignment process unneeded and the viewing angle dependence small. Thus, with the liquid crystal exhibiting a blue phase, operation speed can be improved.

The capacitor 153a functions as a storage capacitor in which voltage whose value is based on the signal DD is applied between the first capacitor electrode and the second capacitor electrode in response to the behavior of the transistor 151a. The capacitor 153b functions as a storage capacitor in which voltage whose value is based on the signal DD is applied between the first capacitor electrode and the second capacitor electrode in response to the behavior of the transistor 151b. The capacitors 153a and 153b are not necessarily provided; however, with the capacitors 153a and 153b, fluctuation in voltage applied to the liquid crystal elements due to the leakage current of the display selection transistors can be reduced.

The capacitor 154 functions as a storage capacitor in which voltage whose value is based on the signal DD is applied between the first capacitor electrode and the second capacitor electrode in response to the behavior of the transistor 155.

The transistor 155 functions as a write selection transistor for selecting whether the signal DD is input to the capacitor 154.

The transistor 156 functions as a display reset selection transistor for selecting whether voltage applied to the liquid crystal element 152b is reset.

Note that each of the transistors 151a, 151b, 155, and 156 is, for example, a transistor including a semiconductor layer containing a semiconductor that belongs to Group 14 in the periodic table (e.g., silicon) or a transistor including an oxide semiconductor layer. Channels are formed in the semiconductor layer and the oxide semiconductor layer of the transistors.

Next, examples of methods for driving the display circuits illustrated in FIGS. 7A and 7B will be described.

First, the example of the method for driving the display circuit illustrated in FIG. 7A will be described with reference to FIG. 7C. FIG. 7C is a timing chart for describing the example of the method for driving the display circuit illustrated in FIG. 7A, and illustrates the states of the signal DD and the signal DSEL.

In the example of the method for driving the display circuit illustrated in FIG. 7A, the transistor 151a is turned on when the pulse of a signal DSEL is input.

When the transistor 151a is turned on, the signal DD is input to the display circuit, so that the voltage value of the first display electrode of the liquid crystal element 152a and the voltage value of the first capacitor electrode of the capacitor 153a are equivalent to the voltage value of the signal DD.

At this time, the liquid crystal element 152a is set in a written state (a state wt) and the light transmittance of the liquid crystal element 152a is based on the signal DD, so that the display circuit is set in a display state based on data of the signal DD (data D11 to data DQ (Q is a natural number greater than or equal to 2).

Then, the transistor 151a is turned off, and the liquid crystal element 152a is set to be in a hold state (a state hld) and holds voltage applied between the first display electrode and the second display electrode so that the amount of fluctuation in the voltage from an initial value does not exceed a reference value until when the next pulse of the signal DSEL is input. In addition, when the liquid crystal element 152a is in the hold state, the light unit in the input/output device in the above embodiment is lit.

Figure 7D:
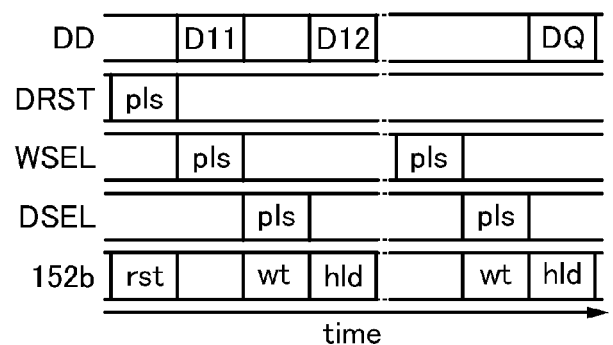

Next, the example of the method for driving the display circuit illustrated in FIG. 7B is described with reference to FIG. 7D. FIG. 7D is a timing chart for describing the example of the method for driving the display circuit illustrated in FIG. 7B.

In the example of the method for driving the display circuit illustrated in FIG. 7B, the transistor 156 is turned on by input of the pulse of a signal DRST, so that the voltage of the first display electrode of the liquid crystal element 152b and the voltage of the first capacitor electrode of the capacitor 153b are reset to reference voltage.

The transistor 155 is turned on by the input of the pulse of a signal WSEL, and the signal DD is input to the display circuit, so that the voltage value of the first capacitor electrode of the capacitor 154 is equivalent to the voltage value of the signal DD.

After that, the transistor 151b is turned on by the input of the pulse of the signal DSEL, so that the voltage value of the first display electrode of the liquid crystal element 152b and the voltage value of the first capacitor electrode of the capacitor 153b are equivalent to the voltage value of the first capacitor electrode of the capacitor 154.

At this time, the liquid crystal element 152b is set in a written state and the light transmittance of the liquid crystal element 152b is based on the signal DD, so that the display circuit is set in a display state based on data of the signal DD (data D11 to data DQ).

Then, the transistor 151b is turned off, and the liquid crystal element 152b is set in a hold state and holds voltage applied between the first display electrode and the second display electrode so that the amount of fluctuation in the voltage from an initial value does not exceed a reference value until when the next pulse of the signal DSEL is input. In addition, when the liquid crystal element 152b is in the hold state, the light unit in the input/output device in the above embodiment is lit.

As described with reference to FIGS. 7A and 7B, in the example of the display circuit of this embodiment, the display selection transistor and the liquid crystal element are provided. With such a structure, the display circuit can be set in a display state based on the signal DD.

Further, as described with reference to FIG. 7B, in the example of the display circuit of this embodiment, the write selection transistor and the capacitor are provided in addition to the display selection transistor and the liquid crystal element. With such a structure, while the liquid crystal element is set in a display state based on data of the signal DD, data of the next signal DD can be written to the capacitor. Thus, the operation speed of the display circuit can be improved.

Embodiment 6

In this embodiment, transistors that can be used as transistors included in the input/output device described in the above embodiment are described.

In the input/output device described in the above embodiment, the transistor is, for example, a transistor including a semiconductor layer containing a semiconductor that belongs to Group 14 in the periodic table (e.g., silicon) or a transistor including an oxide semiconductor layer. Channels are formed in the semiconductor layer and the oxide semiconductor layer of the transistors. Note that a layer in which the channel is formed is called a channel formation layer.

Note that the semiconductor layer may be a single crystal semiconductor layer, a polycrystalline semiconductor layer, a microcrystalline semiconductor layer, or an amorphous semiconductor layer.

In the input/output device described in the above embodiment, as the transistor including an oxide semiconductor layer, for example, a transistor including an oxide semiconductor layer that is highly purified to be intrinsic (i-type) or substantially intrinsic can be used. Purification is a general idea including the following cases: the case where hydrogen or water in an oxide semiconductor layer is removed as much as possible and the case where oxygen is supplied to an oxide semiconductor layer and defects due to oxygen deficiency of the oxide semiconductor layer are reduced.

Structural examples of the transistor including an oxide semiconductor layer will be described with reference to FIGS. 8A to 8D. FIGS. 8A to 8D are schematic cross-sectional views each illustrating a structural example of the transistor of this embodiment.

Figure 8A:
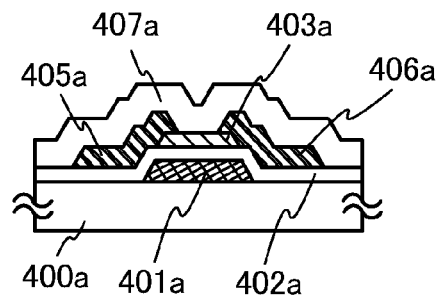
FIGS. 8A to 8E are schematic cross-sectional views for describing examples of a transistor of Embodiment 6.

The transistor illustrated in FIG. 8A is a kind of bottom-gate transistor called an inverted-staggered transistor.

The transistor illustrated in FIG. 8A includes a conductive layer 401a, an insulating layer 402a, an oxide semiconductor layer 403a, a conductive layer 405a, and a conductive layer 406a.

The conductive layer 401a is formed over a substrate 400a.

The insulating layer 402a is formed over the conductive layer 401a.

The oxide semiconductor layer 403a overlaps with the conductive layer 401a with the insulating layer 402a interposed therebetween.

The conductive layer 405a and the conductive layer 406a are each provided over part of the oxide semiconductor layer 403a.

Further, in the transistor illustrated in FIG. 8A, part of a top surface of the oxide semiconductor layer 403a (part of the oxide semiconductor layer 403a over which neither the conductive layer 405a nor the conductive layer 406a is provided) is in contact with an insulating layer 407a.

In addition, the insulating layer 407a is in contact with the insulating layer 402a with the conductive layer 405a, the conductive layer 406a, and the oxide semiconductor layer 403a interposed therebetween.

Figure 8B:
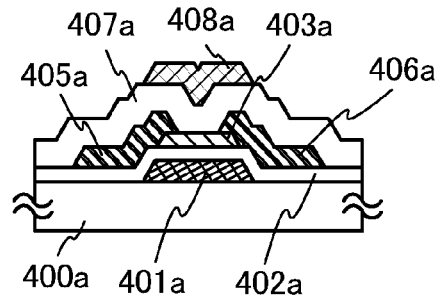

A transistor in FIG. 8B includes a conductive layer 408a in addition to the components in FIG. 8A.

The conductive layer 408a overlaps with the oxide semiconductor layer 403a with the insulating layer 407a interposed therebetween.

Figure 8C:
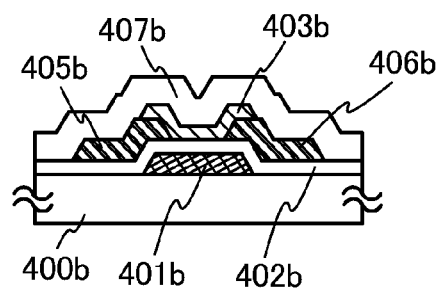

A transistor illustrated in FIG. 8C is a kind of bottom-gate transistor.

The transistor illustrated in FIG. 8C includes a conductive layer 401b, an insulating layer 402b, an oxide semiconductor layer 403b, a conductive layer 405b, and a conductive layer 406b.

The conductive layer 401b is formed over a substrate 400b.

The insulating layer 402b is formed over the conductive layer 401b.

The conductive layer 405b and the conductive layer 406b are formed over part of the insulating layer 402b.

The oxide semiconductor layer 403b overlaps with the conductive layer 401b with the insulating layer 402b interposed therebetween.

Further, in FIG. 8C, an upper surface and side surfaces of the oxide semiconductor layer 403b in the transistor are in contact with an oxide insulating layer 407b.

Further, the insulating layer 407b is in contact with the insulating layer 402b with the conductive layer 405b, the conductive layer 406b, and the oxide semiconductor layer 403b interposed therebetween.

Note that in FIGS. 8A to 8C, a protective insulating layer may be provided over the insulating layer.

Figure 8D:
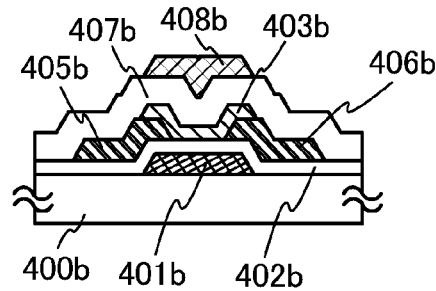

A transistor in FIG. 8D includes a conductive layer 408b in addition to the components in FIG. 8C.

The conductive layer 408b overlaps with the oxide semiconductor layer 403b with the insulating layer 407b interposed therebetween.

Figure 8E:
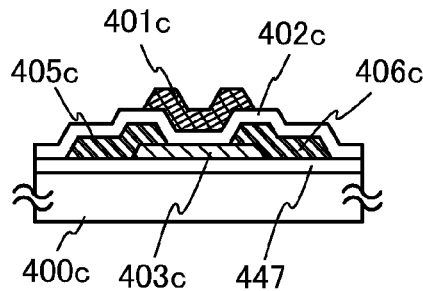

A transistor illustrated in FIG. 8E is a kind of top-gate transistor.

The transistor illustrated in FIG. 8E includes a conductive layer 401c, an insulating layer 402c, an oxide semiconductor layer 403c, a conductive layer 405c, and a conductive layer 406c.

The oxide semiconductor layer 403c is formed over a substrate 400c with an insulating layer 447 interposed therebetween.

The conductive layer 405c and the conductive layer 406c are formed over the oxide semiconductor layer 403c.

The insulating layer 402c is formed over the oxide semiconductor layer 403c, the conductive layer 405c, and the conductive layer 406c.

The conductive layer 401c overlaps with the oxide semiconductor layer 403c with the insulating layer 402c interposed therebetween.

Further, components illustrated in FIGS. 8A to 8E will be described.

As each of the substrates 400a to 400c, a light-transmitting substrate such as a glass substrate or a plastic substrate can be used, for example.

The conductive layers 401a to 401c each function as a gate of the transistor. Note that a layer functioning as a gate of a transistor is also referred to as a gate electrode or a gate wiring.

Each of the conductive layers 401a to 401c can be, for example, a layer of a metal material such as molybdenum, titanium, chromium, tantalum, tungsten, aluminum, copper, neodymium, or scandium or an alloy material containing the metal material as a main component. Each of the conductive layers 401a to 401c may be a stack of layers of a material which can be used for the conductive layers 401a to 401c.

The insulating layers 402a to 402c each function as a gate insulating layer of the transistor. Note that a layer functioning as a gate insulating layer of a transistor is also referred to as a gate insulating layer.

As each of the insulating layers 402a to 402c, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. Each of the insulating layers 402a and 402b can be a stack of layers of a material which can be used for the insulating layers 402a and 402b.

In addition, as the insulating layers 402a to 402c, an insulating layer of a material containing, for example, an element that belongs to Group 13 in the periodic table and oxygen can be used. When the oxide semiconductor layers 403a to 403c contain an element that belongs to Group 13, use of insulating layers containing an element that belongs to Group 13 as insulating layers in contact with the oxide semiconductor layers 403a to 403c makes the state of the interfaces between the insulating layers and the oxide semiconductor layers favorable.

Examples of the material including an element that belongs to Group 13 include gallium oxide, aluminum oxide, aluminum gallium oxide, and gallium aluminum oxide. Note that aluminum gallium oxide refers to a substance in which the amount of aluminum is larger than that of gallium in atomic percent, and gallium aluminum oxide refers to a substance in which the amount of gallium is larger than or equal to that of aluminum in atomic percent.

For example, use of an insulating layer containing gallium oxide as each of the insulating layers 402a to 402c can reduce the accumulation of hydrogen or hydrogen ions at the interfaces between the insulating layer 402a and the oxide semiconductor layer 403a, the insulating layer 402b and the oxide semiconductor layer 403b, and the insulating layer 402c and the oxide semiconductor layer 403c.

In addition, for example, using an insulating layer containing aluminum oxide as each of the insulating layers 402a to 402c can reduce the accumulation of hydrogen or hydrogen ions at the interfaces between the insulating layer 402a and the oxide semiconductor layer 403a, the insulating layer 402b and the oxide semiconductor layer 403b, and the insulating layer 402c and the oxide semiconductor layer 403c. An insulating layer containing aluminum oxide is less likely to transmit water; thus, use of an insulating layer containing aluminum oxide can reduce entry of water to the oxide semiconductor layer through the insulating layer.

As the insulating layers 402a to 402c, a material represented by $Al_2O_x$ (x=3+α where α is larger than 0 and smaller than 1), $Ga_2O_x$ (x=3+α where α is larger than 0 and smaller than 1), or $Ga_xAl_{2-x}O_{3+\alpha}$ (x is larger than 0 and smaller than 2 and α is larger than 0 and smaller than 1) can be used, for example. Each of the insulating layers 402a to 402c can be a stack of layers of a material which can be used for the insulating layers 402a to 402c. For example, each of the insulating layers 402a to 402c can be a stack of layers containing gallium oxide represented by $Ga_2O_x$. Alternatively, each of the insulating layers 402a to 402c can be a stack of an insulating layer containing gallium oxide represented by $Ga_2O_x$ and an insulating layer containing aluminum oxide represented by $Al_2O_x$.

The insulating layer 447 serves as a base layer preventing the diffusion of an impurity element coming from the substrate 400c.

The insulating layer 447 can be, for example, a layer of a material which can be used for the insulating layers 402a to 402c. Alternatively, the insulating layer 447 can be a stack of layers of a material which can be used for the insulating layers 402a to 402c.

The oxide semiconductor layers 403a to 403c each function as a layer in which a channel of the transistor is formed. Note that the layer in which a channel of the transistor is formed is also referred to as a channel formation layer. Examples of an oxide semiconductor that can be used for the oxide semiconductor layers 403a to 403c include a quaternary metal oxide, a ternary metal oxide, and a binary metal oxide. The oxide semiconductor includes at least one element selected from In, Ga, Sn, Zn, Al, Mg, Hf, or lanthanoid. As the quaternary metal oxide, an In—Sn—Ga—Zn—O-based metal oxide or the like can be used, for example. As the ternary metal oxide, an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, a Sn—Al—Zn—O-based metal oxide, an In—Hf—Zn—O-based metal oxide, an In—La—Zn—O-based metal oxide, an In—Ce—Zn—O-based metal oxide, an In—Pr—Zn—O-based metal oxide, an In—Nd—Zn—O-based metal oxide, an In—Pm—Zn—O-based metal oxide, an In—Sm—Zn—O-based metal oxide, an In—Eu—Zn—O-based metal oxide, an In—Gd—Zn—O-based metal oxide, an In—Tb—Zn—O-based metal oxide, an In—Dy—Zn—O-based metal oxide, an In—Ho—Zn—O-based metal oxide, an In—Er—Zn—O-based metal oxide, an In—Tm—Zn—O-based metal oxide, an In—Yb—Zn—O-based metal oxide, an In—Lu—Zn—O-based metal oxide, or the like can be used, for example. As the binary metal oxide, an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, an In—Sn—O-based metal oxide, an In—Ga—O-based metal oxide, or the like can be used, for example. An In—O-based metal oxide, a Sn—O-based metal oxide, a Zn—O-based metal oxide, or the like can be used as the oxide semiconductor, for example. The metal oxide that can be used as the oxide semiconductor may contain silicon oxide.

In the case where an In—Zn—O-based metal oxide is used, for example, an oxide target having the following composition ratios can be used for deposition of an In—Zn—O-based metal oxide semiconductor layer: In:Zn=50:1 to 1:2 (In$_2$O$_3$:ZnO=25:1 to 1:4 in a molar ratio), preferably In:Zn=20:1 to 1:1 (In$_2$O$_3$:ZnO=10:1 to 1:2 in a molar ratio), more preferably In:Zn=15:1 to 1.5:1 (In$_2$O$_3$:ZnO=15:2 to 3:4 in a molar ratio). For example, when the atomic ratio of the target used for the deposition of the In—Zn—O-based oxide semiconductor is expressed by In:Zn:O=S:G:R, R>1.5S+G. The increase in In content makes the mobility of the transistor higher.

As the oxide semiconductor, a material represented by InMO$_3$(ZnO)$_m$ (m is larger than 0) can be used. Here, M in InMO$_3$(ZnO)$_m$ represents one or more metal elements selected from Ga, Al, Mn, or Co.

The conductive layers 405$a$ to 405$c$ and the conductive layers 406$a$ to 406$c$ each function as a source or a drain of the transistor. Note that a layer functioning as a source of a transistor is also referred to as a source electrode or a source wiring, and a layer functioning as a drain of a transistor is also referred to as a drain electrode or a drain wiring.

Each of the conductive layers 405$a$ to 405$c$ and the conductive layers 406$a$ to 406$c$ can be, for example, a layer of a metal material such as aluminum, chromium, copper, tantalum, titanium, molybdenum, or tungsten; or an alloy material containing the metal material as a main component. Alternatively, each of the conductive layers 405$a$ to 405$c$ and each of the conductive layers 406$a$ to 406$c$ can be a stack of layers of a material which can be used for the conductive layers 405$a$ to 405$c$ and the conductive layers 406$a$ to 406$c$.

Alternatively, each of the conductive layers 405$a$ to 405$c$ and the conductive layers 406$a$ to 406$c$ can be a layer containing a conductive metal oxide. As the conductive metal oxide, indium oxide, tin oxide, zinc oxide, an alloy of indium oxide and tin oxide, or an alloy of indium oxide and zinc oxide can be used, for example. Note that the conductive metal oxide which can be used for each of the conductive layers 405$a$ to 405$c$ and the conductive layers 406$a$ to 406$c$ may contain silicon oxide.

Like the insulating layers 402$a$ to 402$c$, as the insulating layers 407$a$ and 407$b$, an insulating layer of a material containing, for example, an element that belongs to Group 13 in the periodic table and oxygen can be used. Alternatively, for the insulating layers 407$a$ and 407$b$, a material represented by Al$_2$O$_x$, Ga$_2$O$_x$, or Ga$_x$Al$_{2-x}$O$_{3+\alpha}$ can be used.

For example, each of the insulating layers 402$a$ to 402$c$ and the insulating layers 407$a$ and 407$b$ can be an insulating layer containing gallium oxide represented by Ga$_2$O$_x$. Alternatively, the insulating layers 402$a$ to 402$c$ and one of the insulating layers 407$a$ and 407$b$ may be insulating layers containing gallium oxide represented by Ga$_2$O$_x$, and the insulating layers 402$a$ to 402$c$ and the other of the insulating layers 407$a$ and 407$b$ may be insulating layers containing aluminum oxide represented by Al$_2$O$_x$.

The conductive layers 408$a$ and 408$b$ each function as a gate of the transistor. Note that when the transistor includes the conductive layer 408$a$ or the conductive layer 408$b$, one of the conductive layer 401$a$ and the conductive layer 408$a$, or one of the conductive layer 401$b$ and the conductive layer 408$b$ is called a back gate, a back gate electrode, or a back gate line. By providing a plurality of layers serving as gates with a channel formation layer interposed therebetween, the threshold voltage of the transistor can be controlled.

Each of the conductive layers 408$a$ and 408$b$ can be, for example, a layer of a metal material such as aluminum, chromium, copper, tantalum, titanium, molybdenum, or tungsten; or an alloy material containing the metal material as a main component. Alternatively, each of the conductive layers 408$a$ and 408$b$ can be a stack of layers of a material which can be used for the conductive layers 408$a$ and 408$b$.

Alternatively, each of the conductive layers 408$a$ and 408$b$ can be a layer containing a conductive metal oxide. As the conductive metal oxide, indium oxide, tin oxide, zinc oxide, an alloy of indium oxide and tin oxide, or an alloy of indium oxide and zinc oxide can be used, for example. Note that the conductive metal oxide which can be used for the conductive layers 408$a$ and 408$b$ may contain silicon oxide.

Note that the transistor of this embodiment may have an insulating layer over a part of the oxide semiconductor layer serving as a channel formation layer and include a conductive layer serving as a source or a drain and overlapping with the oxide semiconductor layer with the insulating layer therebetween. Consequently, the insulating layer serves as a layer protecting the channel formation layer (also referred to as a channel protective layer) of the transistor. Examples of the insulating layer serving as a channel protective layer include a layer of a material that can be used for the insulating layers 402$a$ to 402$c$ and a stack of layers of a material that can be used for the insulating layers 402$a$ to 402$c$.

Note that the entire oxide semiconductor layer does not necessarily overlap with the conductive layer serving as a gate electrode in the transistor of this embodiment, as illustrated in FIGS. 8A to 8E. When the entire oxide semiconductor layer does not necessarily overlap with the conductive layer serving as a gate electrode in the transistor of this embodiment, light entering the oxide semiconductor layer can be reduced.

An example of a method for forming the transistor illustrated in FIG. 8A, which is an example of a method for forming the transistor of this embodiment, will be described with reference to FIGS. 9A to 9E. FIGS. 9A to 9E are schematic cross-sectional views illustrating the example of the method for forming the transistor in FIG. 8A.

Figure 9A:
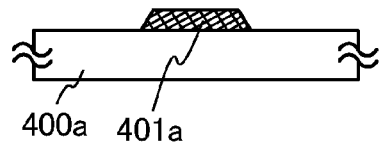
FIGS. 9A to 9E are schematic cross-sectional views for describing an example of a method for forming the transistor in FIG. 8A.

As illustrated in FIG. 9A, the substrate 400$a$ is first prepared and a first conductive film is formed over the substrate 400$a$. Part of the first conductive film is etched so that the conductive layer 401$a$ is formed.

For example, the first conductive film is a layer of a material, which can be used for the conductive layer 401$a$, formed by sputtering. Alternatively, the first conductive film is a stack of layers of materials that can be used for the conductive layer 401$a$.

Note that when a high-purity gas from which an impurity such as hydrogen, water, a hydroxyl group, or hydride is removed is used as a sputtering gas, for example, the impurity concentration in the film can be lowered.

Note that preheating treatment may be performed in a preheating chamber of a sputtering apparatus before the film is formed by sputtering. By the preheating treatment, an impurity such as hydrogen or moisture can be eliminated.

Before the film is formed by sputtering, for example, treatment by which voltage is applied to a substrate side, not to a target side, in an argon, nitrogen, helium, or oxygen atmosphere with the use of an RF power and plasma is generated so that a surface of the substrate on which the film is formed is modified (such treatment is also referred to as reverse sputtering) may be performed. By reverse sputtering, powdery substances (also referred to as particles or dust) that attach onto the surface on which the film is formed can be removed.

In the case where the film is formed by sputtering, moisture remaining in a deposition chamber for the film can be removed by an entrapment vacuum pump or the like. A cryopump, an ion pump, a titanium sublimation pump, or the like can be used as the entrapment vacuum pump. Alternatively, moisture remaining in the deposition chamber can be removed by a turbo molecular pump provided with a cold trap.

As a method for forming the conductive layer 401a, the example of a method for forming the transistor of this embodiment employs, for example, the following steps in order to form a layer by etching part of a film: a resist mask is formed over part of the film by a photolithography process and the film is etched using the resist mask, thereby forming the layer. Note that in this case, the resist mask is removed after the layer is formed.

The resist mask may be formed by an inkjet method. A photomask is not needed in an inkjet method; thus, manufacturing cost can be reduced. In addition, the resist mask may be formed using an exposure mask having a plurality of regions with different transmittances (such an exposure mask is also referred to as a multi-tone mask). With the multi-tone mask, a resist mask having a plurality of regions with different thicknesses can be formed, so that the number of resist masks used for the formation of the transistor can be reduced.

Figure 9B:
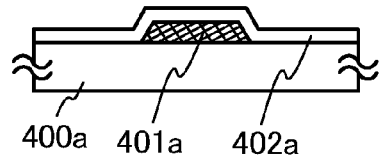

Next, as illustrated in FIG. 9B, a first insulating film serving as the insulating layer 402a is formed over the conductive layer 401a.

For example, the first insulating film is a layer of a material, which can be used for the insulating layer 402a, formed by sputtering, plasma-enhanced CVD, or the like. The first insulating film is alternatively a stack of layers of materials that can be used for the insulating layer 402a. Further, when the layer of a material that can be used for the insulating layer 402a is formed by high-density plasma-enhanced CVD (e.g., high-density plasma-enhanced CVD using microwaves (e.g., microwaves with a frequency of 2.45 GHz)), the insulating layer 402a can be dense and can have higher breakdown voltage.

Figure 9C:
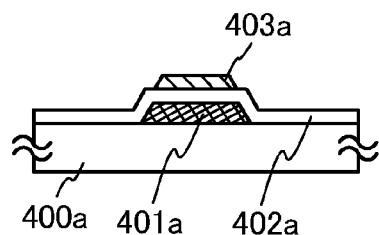

Then, as illustrated in FIG. 9C, an oxide semiconductor film is formed over the insulating layer 402a and then is partly etched to form the oxide semiconductor layer 403a.

For example, the oxide semiconductor film is a layer of an oxide semiconductor material, which can be used for the oxide semiconductor layer 403a, formed by sputtering. Note that the oxide semiconductor film may be formed in a rare gas atmosphere, an oxygen atmosphere, or a mixed atmosphere of a rare gas and oxygen.

The oxide semiconductor film can be formed using an oxide target having a composition ratio of $In_2O_3:Ga_2O_3:ZnO=1:1:1$ (in a molar ratio) as a sputtering target. Alternatively, the oxide semiconductor film may be formed using an oxide target having a composition ratio of $In_2O_3:Ga_2O_3:ZnO=1:1:2$ (in a molar ratio), for example.

When the oxide semiconductor film is formed by sputtering, the substrate 400a may be kept under reduced pressure and heated at 100 to 600° C., preferably 200 to 400° C. Heating the substrate 400a can lower the impurity concentration in the oxide semiconductor film and reduce damage to the oxide semiconductor film caused by the sputtering.

Figure 9D:
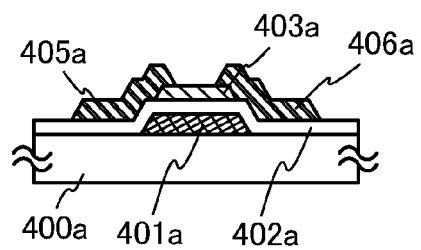

Then, as illustrated in FIG. 9D, a second conductive film is formed over the insulating layer 402a and the oxide semiconductor layer 403a and then is partly etched to form the conductive layers 405a and 406a.

For example, the second conductive film is a layer of a material, which can be used for the conductive layers 405a and 406a, formed by sputtering or the like. Alternatively, the second conductive film is a stack of films of materials that can be used for the conductive layers 405a and 406a.

Figure 9E:
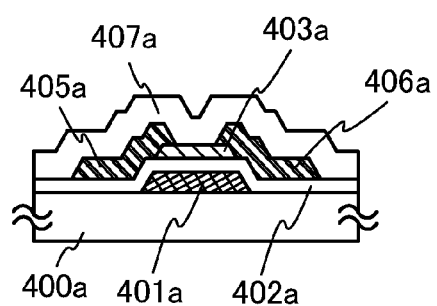

Then, as illustrated in FIG. 9E, the insulating layer 407a is formed so as to be in contact with the oxide semiconductor layer 403a.

For example, the insulating layer 407a is a film, which can be used for the insulating layer 407a, formed in a rare gas (typically, argon) atmosphere, an oxygen atmosphere, or a mixed atmosphere of a rare gas and oxygen by sputtering. Forming the insulating layer 407a by sputtering can suppress the decrease in the resistance of part of the oxide semiconductor layer 403a that functions as a back channel of the transistor. The temperature of the substrate at the time of the formation of the insulating layer 407a is preferably higher than or equal to room temperature and lower than or equal to 300° C.

Before the formation of the insulating layer 407a, plasma treatment using a gas such as $N_2O$, $N_2$, or Ar may be performed so that water or the like adsorbed onto an exposed surface of the oxide semiconductor layer 403a is removed. In the case where the plasma treatment is performed, the insulating layer 407a is preferably formed after the plasma treatment without exposure to air.

In addition, in the example of the method for forming the transistor illustrated in FIG. 8A, heat treatment is performed at higher than or equal to 400° C. and lower than or equal to 750° C., or higher than or equal to 400° C. and lower than the strain point of the substrate, for example. For example, the heat treatment is performed after the oxide semiconductor film is formed, after part of the oxide semiconductor film is etched, after the second conductive film is formed, after part of the second conductive film is etched, or after the insulating layer 407a is formed.

Note that a heat treatment apparatus for the heat treatment can be an electric furnace or an apparatus for heating an object by heat conduction or heat radiation from a heater such as a resistance heater. For example, an RTA (rapid thermal annealing) apparatus such as a GRTA (gas rapid thermal annealing) apparatus, or an LRTA (lamp rapid thermal annealing) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus with which heat treatment is performed using a high-temperature gas. As the high-temperature gas, for example, a rare gas or an inert gas (e.g., nitrogen) which does not react with an object by heat treatment can be used.

After the heat treatment, a high-purity oxygen gas, a high-purity $N_2O$ gas, or ultra-dry air (with a dew point of −40° C. or lower, preferably −60° C. or lower) may be introduced into the furnace that has been used in the above heat treatment while the heating temperature is maintained or decreased. In this case, it is preferable that water, hydrogen, and the like be not contained in the oxygen gas or the $N_2O$ gas. The purity of the oxygen gas or the $N_2O$ gas which is introduced into the heat treatment apparatus is preferably 6N or higher, more preferably 7N or higher. That is, the impurity concentration in the oxygen gas or the $N_2O$ gas is 1 ppm or lower, preferably 0.1 ppm or lower. By the action of the oxygen gas or the $N_2O$ gas, oxygen is supplied to the oxide semiconductor layer 403a, so that defects caused by oxygen deficiency in the oxide semiconductor layer 403a can be reduced.

Further, in addition to the heat treatment, after the insulating layer 407a is formed, heat treatment (preferably at 200 to 400° C., for example, 250 to 350° C.) may be performed in an inert gas atmosphere or an oxygen gas atmosphere.

Further, oxygen doping treatment using oxygen plasma may be performed after the formation of the insulating layer 402a, after the formation of the oxide semiconductor film, after the formation of the conductive layer serving as a source electrode or a drain electrode, after the formation of the insulating layer, or after the heat treatment. For example, oxygen doping treatment using a high-density plasma of 2.45 GHz may be performed. Alternatively, oxygen doping treatment may be performed by an ion implantation method or ion doping. By the oxygen doping treatment, variations in electrical characteristics of the transistors can be reduced. For example, the oxygen doping treatment is performed to cause the insulating layer 402a or the insulating layer 407a, or both to contain oxygen with a higher proportion than that in the stoichiometric composition. Consequently, excessive oxygen in the insulating layer is likely to be supplied to the oxide semiconductor layer 403a. This can reduce oxygen deficiency defects in the oxide semiconductor layer 403a or at the interface between one or each of the insulating layer 402a and the insulating layer 407a and the oxide semiconductor layer 403a, thereby reducing the carrier concentration of the oxide semiconductor layer 403a.

For example, when an insulating layer containing gallium oxide is formed as one or each of the insulating layer 402a and the insulating layer 407a, the composition of the gallium oxide can be set to be $Ga_2O_x$ by supplying the insulating layer with oxygen.

Alternatively, when an insulating layer containing aluminum oxide is formed as one or each of the insulating layer 402a and the insulating layer 407a, the composition of the aluminum oxide can be set to be $Al_2O_x$ by supplying the insulating layer with oxygen.

Alternatively, when an insulating layer containing gallium aluminum oxide or aluminum gallium oxide is formed as one or each of the insulating layer 402a and the insulating layer 407a, the composition of the gallium aluminum oxide or the aluminum gallium oxide can be set to be $Ga_xAl_{z-x}O_{3+\alpha}$ by supplying the insulating layer with oxygen.

Through the steps, an impurity such as hydrogen, moisture, a hydroxyl group, or hydride (also referred to as a hydrogen compound) is removed from the oxide semiconductor layer 403a and oxygen is supplied to the oxide semiconductor layer 403a. Thus, the oxide semiconductor layer can be highly purified.

Note that although the example of the method for forming the transistor illustrated in FIG. 8A is described, this embodiment is not limited to this example. For the description of the components in FIGS. 8B to 8E, for example, see as appropriate the description of the example of the method for forming the transistor illustrated in FIG. 8A if the components in FIGS. 8B to 8E have the same designations as the components in FIG. 8A and have a function at least part of which is the same as that of the components in FIG. 8A.

As described with reference to FIGS. 8A to 8E and FIGS. 9A to 9E, the example of the transistor in this embodiment includes a conductive layer functioning as a gate electrode; an insulating layer functioning as a gate insulating layer; an oxide semiconductor layer which includes a channel and overlaps with conductive layer functioning as a gate with the insulating layer functioning as a gate insulating layer interposed therebetween; a conductive layer which is electrically connected to the oxide semiconductor layer and functions as one of a source and a drain; and a conductive layer which is electrically connected to the oxide semiconductor layer and functions as the other of the source and the drain.

In an example of the transistor of this embodiment, an insulating layer in contact with an oxide semiconductor layer is in contact with an insulating layer serving as a gate insulating layer with the oxide semiconductor layer, a conductive layer serving as one of a source and a drain, and a conductive layer serving as the other of the source and the drain interposed therebetween. Consequently, the oxide semiconductor layer, the conductive layer serving as one of a source and a drain, and the conductive layer serving as the other of the source and the drain are surrounded by the insulating layer in contact with an oxide semiconductor layer and the insulating layer serving as a gate insulating layer, thereby reducing the entry of an impurity into the oxide semiconductor layer, the conductive layer serving as one of a source and a drain, and the conductive layer serving as the other of the source and the drain.

The oxide semiconductor layer in which a channel is formed is an oxide semiconductor layer which is made intrinsic (i-type) or substantially intrinsic (i-type) by the purifying operation. Purifying the oxide semiconductor layer can lower the carrier concentration in the oxide semiconductor layer to less than $1\times10^{14}/cm^3$, preferably less than $1\times10^{12}/cm^3$, more preferably less than $1\times10^{11}/cm^3$, thereby reducing changes in characteristics due to temperature change. Further, with the above structure, off-state current per micrometer of channel width can be 10 aA ($1\times10^{-17}$ A) or less, 1 aA ($1\times10^{-18}$ A) or less, 10 zA ($1\times10^{-20}$ A) or less, 1 zA ($1\times10^{-21}$ A) or less, or 100 yA ($1\times10^{-22}$ A) or less. It is preferable that the off-state current of the transistor be as low as possible. The lower limit of the off-state current of the transistor in this embodiment is estimated to be about $10^{-30}$ A/μm.

When the transistor of this embodiment which includes an oxide semiconductor layer is used, for example, as the transistor in the display circuit of the input/output device of the above embodiments, variations in the display state of the pixel, which is caused by the off-state current of the transistor, can be redyced, thereby making a period for holding the display state which corresponds to onetime writing of pixel data longer. Therefore, the interval between writes of display data can be made longer. For example, the interval between writes of display data can be 10 seconds or longer, preferably 30 seconds or longer, more preferably 1 minute or longer. In addition, in the case where display data is not written, a circuit operating at the time of writing of display data can be stopped. For this reason, as the interval between writes of display data is made longer, the power consumption can be lower.

A calculation example of the off-state current of the example of the transistor including an oxide semiconductor layer in this embodiment, in which leakage current measurement with a circuit for evaluating characteristics is utilized, will be described below.

Figure 10A:
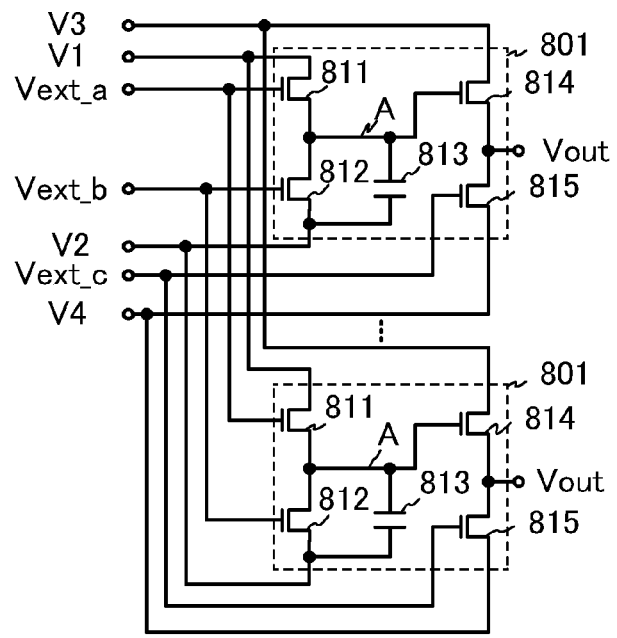
FIGS. 10A to 10C are diagrams for describing a circuit for evaluating characteristics.
Figure 10B:
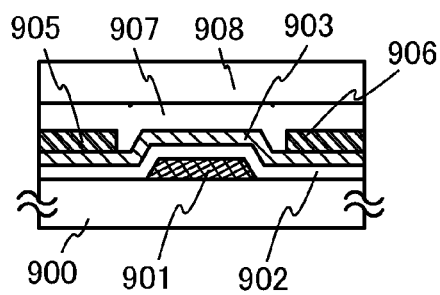
Figure 10C:
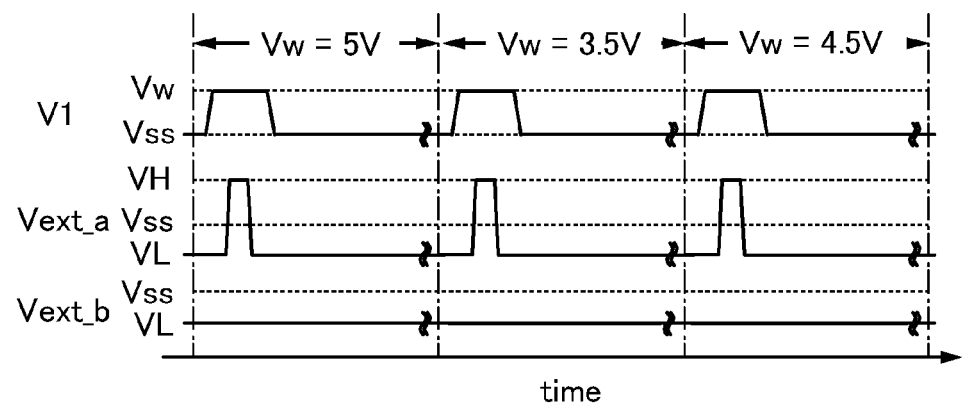

The leakage current measurement with a circuit for evaluating characteristics is described with reference to FIGS. 10A to 10C. FIGS. 10A to 10C illustrate the circuit for evaluating characteristics.

First, the structure of the circuit for evaluating characteristics is described with reference to FIG. 10A. FIG. 10A is a circuit diagram illustrating the structure of the circuit for evaluating characteristics.

The circuit for evaluating characteristics illustrated in FIG. 10A includes a plurality of measurement systems 801. The plurality of measurement systems 801 are connected in parallel. Here, as an example, eight measurement systems 801 are connected in parallel. Plural kinds of measurement can be performed using the plurality of measurement systems 801.

The measurement system 801 includes a transistor 811, a transistor 812, a capacitor 813, a transistor 814, and a transistor 815.

The transistor 811, the transistor 812, the transistor 814, and the transistor 815 are n-type field-effect transistors.

Voltage V1 is input to one of a source and a drain of the transistor 811, and voltage Vext_a is input to a gate of the transistor 811. The transistor 811 is a transistor for injecting electrical charge.

One of a source and a drain of the transistor 812 is connected to the other of the source and the drain of the transistor 811. Voltage V2 is input to the other of the source and the drain of the transistor 812. Voltage Vext_b is input to a gate of the transistor 812. The transistor 812 is a transistor for evaluating leakage current. Note that the leakage current here includes the off-state current of a transistor.

A first capacitor electrode of the capacitor 813 is connected to the other of the source and the drain of the transistor 811. The voltage V2 is input to a second capacitor electrode of the capacitor 813. Note that here, the voltage V2 is 0 V.

Voltage V3 is input to one of a source and a drain of the transistor 814. A gate of the transistor 814 is connected to the other of the source and the drain of the transistor 811. Note that a portion where the gate of the transistor 814, the other of the source and the drain of the transistor 811, the one of the source and the drain of the transistor 812, and the first capacitor electrode of the capacitor 813 are connected to each other is referred to as a node A. Note that here, the voltage V3 is 5 V.

One of a source and a drain of the transistor 815 is connected to the other of the source and the drain of the transistor 814. Voltage V4 is input to the other of the source and the drain of the transistor 815. Voltage Vext_c is input to a gate of the transistor 815. Note that here, the voltage Vext_c is 0.5 V.

The measurement system 801 outputs the voltage of a portion where the other of the source and the drain of the transistor 814 is connected to the one of the source and the drain of the transistor 815, as output voltage Vout.

Here, a transistor having a channel length L of 10 μm and a channel width W of 10 μm and including an oxide semiconductor layer is used as an example of the transistor 811.

A transistor having a channel length L of 3 μm and a channel width W of 100 μm and including an oxide semiconductor layer is used as an example of each of the transistors 814 and 815.

The structure of the transistor 812 is illustrated in FIG. 10B. FIG. 10B is a cross-sectional view illustrating the structure of the transistor.

As shown in FIG. 10B, the transistor 812 includes a conductive layer 901 serving as a gate and being over a substrate 900, an insulating layer 902 serving as a gate insulating layer, an oxide semiconductor layer 903 being over the conductive layer 901 with the insulating layer 902 interposed therebetween and serving as a channel formation layer, a conductive layer 905 being in contact with the oxide semiconductor layer 903 and serving as one of a source and a drain, and a conductive layer 906 being in contact with the oxide semiconductor layer 903 and serving as the other of the source and the drain. The transistor 812 further includes an insulating layer 907 and a planarization layer 908 stacked over the oxide semiconductor layer 903, the conductive layer 905, and the conductive layer 906. In the transistor 812, the conductive layer 905 and the conductive layer 906 do not overlap with the conductive layer 901, and off-set regions with a width of 1 μm is provided. Provision of the offset region can reduce parasitic capacitance. Further, as the transistor 812, samples (SMP) of six transistors having different channel lengths L and different channel widths W are used (see Table 1).

TABLE 1

|      | L[μm] | W[μm]           |
|------|-------|-----------------|
| SMP1 | 1.5   | $1 \times 10^5$ |
| SMP2 | 3     | $1 \times 10^5$ |
| SMP3 | 10    | $1 \times 10^5$ |
| SMP4 | 1.5   | $1 \times 10^6$ |
| SMP5 | 3     | $1 \times 10^6$ |
| SMP6 | 10    | $1 \times 10^6$ |

By separately providing a transistor for injecting electrical charge and a transistor for evaluating leakage current as illustrated in FIG. 10A, the transistor for evaluating leakage current can be always kept off at the time of electrical charge injection.

In addition, by separately providing a transistor for injecting electrical charge and a transistor for evaluating leakage current, each of the transistors can have appropriate size. Further, by making the channel width W of the transistor for evaluating leakage current larger than that of the transistor for injecting electrical charge, the leakage current component of the circuit for evaluating characteristics other than the leakage current of the transistor for evaluating leakage current can be made relatively low. Consequently, the leakage current of the transistor for evaluating leakage current can be measured with high accuracy. Further, the transistor for evaluating leakage current does not need to be turned on at the time of electrical charge injection; thus, there is no influence of fluctuation in the voltage of the node A caused by part of the electrical charge in the channel formation region of the transistor for evaluating leakage current flowing to the node A.

Next, a method for measuring the leakage current of the circuit for evaluating characteristics illustrated in FIG. 10A will be described with referent to FIG. 10C. FIG. 10C is a timing chart for describing the method for measuring the leakage current with the use of the circuit for evaluating characteristics illustrated in FIG. 10A.

In the method for measuring the leakage current with the use of the circuit for evaluating characteristics illustrated in FIG. 10A, a period is divided into a writing period and a holding period. The operation in each period will be described below.

In the writing period, voltage VL (−3 V) that turns off the transistor 812 is input as the voltage Vext_b. Further, write voltage Vw is input as the voltage V1, and then, voltage VH (5 V) that keeps the transistor 811 on for a certain period is input as the voltage Vext_a. Thus, electrical charge is accumulated in the node A, and the voltage of the node A is equivalent to the write voltage Vw. Then, the voltage VL that turns off the transistor 811 is input as the voltage Vext_a. Then, voltage VSS (0 V) is input as the voltage V1.

In the holding period, the amount of change in the voltage of the node A due to the change in the amount of electrical charge held in the node A is measured. From the amount of change in voltage, the value of current flowing between the source electrode and the drain electrode of the transistor 812 can be calculated. As described above, electrical charge can be accumulated in the node A, and the amount of change in the voltage of the node A can be measured.

At this time, accumulation of electrical charge in the node A and measurement of the amount of change in the voltage of the node A (also referred to as accumulation and measurement operation) are repeated. First, first accumulation and measurement operation is repeated 15 times. In the first accumulation and measurement operation, a voltage of 5 V is input as the write voltage Vw in a writing period and is held for 1 h in a holding period. Next, second accumulation and measurement operation is repeated twice. In the second accumulation and measurement operation, a voltage of 3.5 V is input as the write voltage Vw in a writing period and is held for 50 h in a holding period. Then, third accumulation and measurement operation is performed once. In the third accumulation and measurement operation, a voltage of 4.5 V is input as the write voltage Vw in a writing period and is held for 10 h in a holding period. By repeating the accumulation and measurement operation, the fact that measured current values are in the steady state is confirmed. In other words, it is possible to remove transient current (current decreasing over time after the start of the measurement) from $I_A$ (current flowing through the node A). Consequently, leakage current can be measured with higher accuracy.

In general, the voltage $V_A$ of the node A is expressed by Formula 1 as a function of the output voltage Vout.

$$V_A = F(Vout) \quad \text{[Formula 1]}$$

In addition, the electrical charge $Q_A$ of the node A is expressed by Formula 2 using the voltage $V_A$ of the node A, capacitance $C_A$ connected to the node A, and a constant (const). Here, the capacitance $C_A$ connected to the node A is the sum of the capacitance of the capacitor 813 and the capacitance components other than the capacitance of the capacitor 813.

$$Q_A = C_A V_A + \text{const} \quad \text{[Formula 2]}$$

The current $I_A$ of the node A is a time-derivative term of electrical charge flowing to the node A (or electrical charge flowing from the node A), and is thus expressed by Formula 3.

$$I_A \equiv \frac{\Delta Q_A}{\Delta t} = \frac{C_A \cdot \Delta F(Vout)}{\Delta t} \quad \text{[Formula 3]}$$

Note that here, as an example, $\Delta t$ is about 54000 s. The current $I_A$ of the node A, which is leakage current, can be obtained from the capacitance $C_A$ connected to the node A and the output voltage Vout in this manner; thus, the leakage current of the circuit for evaluating characteristics can be obtained.

Next, measurement results of the output voltage obtained by the measurement method using the circuit for evaluating characteristics, and the leakage current of the circuit for evaluating characteristics that is calculated from the measurement results are described with reference to FIGS. 11A and 11B.

Figure 11A:
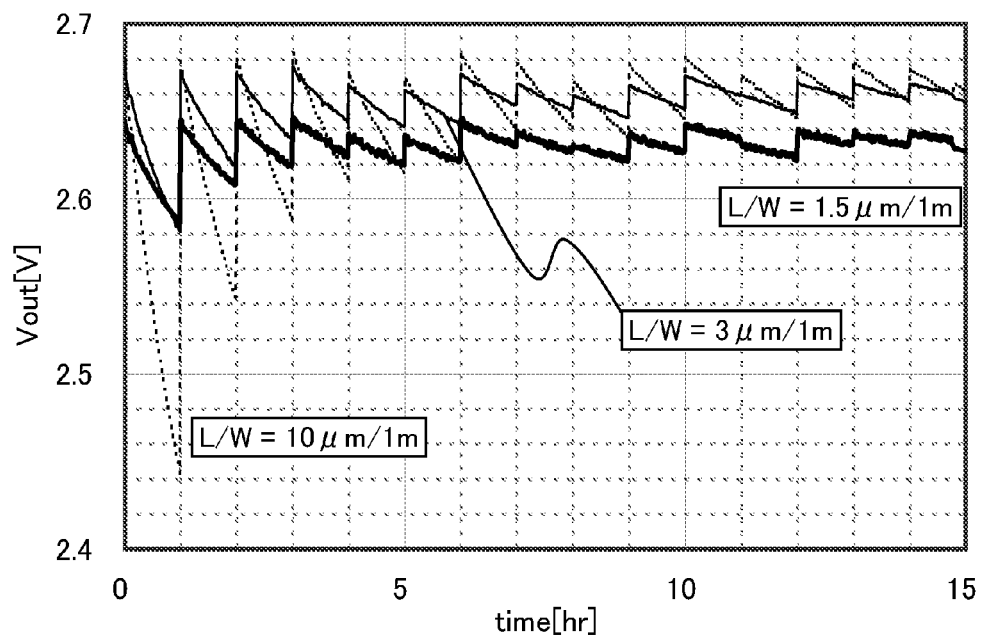
FIG. 11A is a graph showing a relationship between elapsed time (time) in measurement of Samples 4, 5, and 6 (SMP4, SMP5, and SMP6) and output voltage (Vout)
Figure 11B:
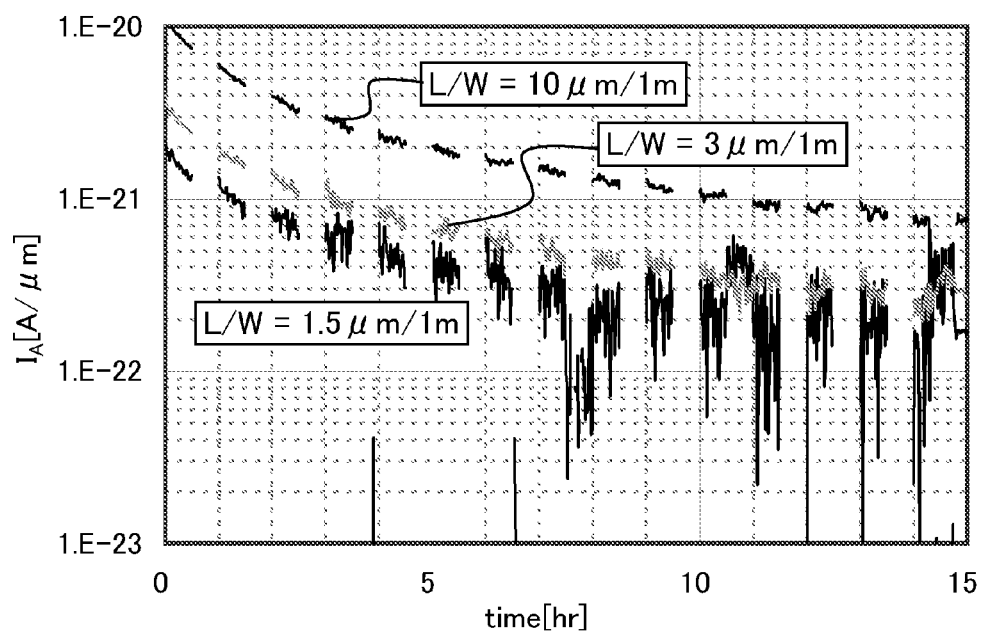
FIG. 11B is a graph showing a relationship between the elapsed time (time) in measurement of Samples 4, 5, and 6 and leakage current calculated from the measurement.

For example, FIG. 11A illustrates the relationship between the elapsed time time of the measurement (the first accumulation and measurement operation) and the output voltage Vout in the transistors of SMP4, SMP5, and SMP6. FIG. 11B illustrates the relationship between the elapsed time of the measurement and the current $I_A$ calculated by the measurement. FIG. 11A shows that the output voltage Vout fluctuates after the start of the measurement and it takes 10 h or longer for the transistors to go into the steady state.

Figure 12:
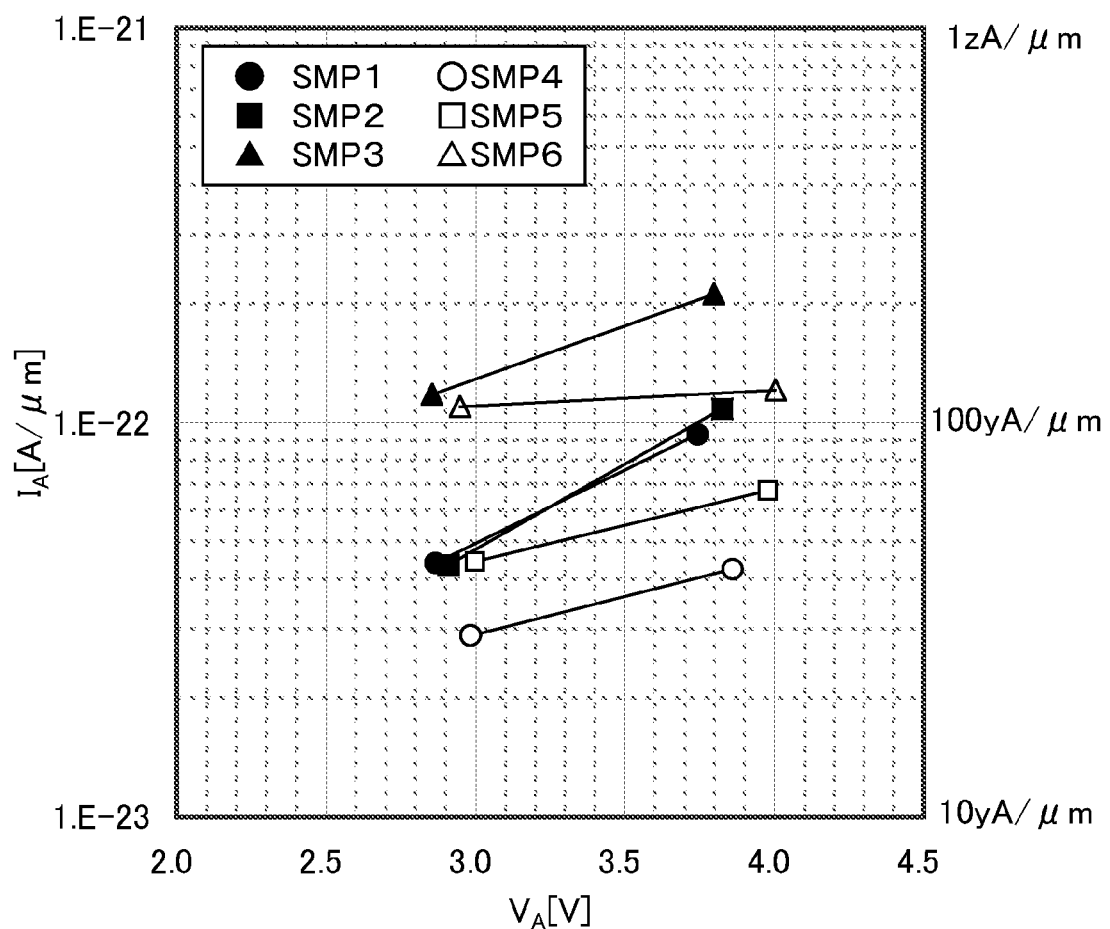
FIG. 12 is a graph showing a relationship between voltage of the node A and leakage current estimated from measurement.

FIG. 12 illustrates the relationship between the voltage of the node A and the leakage current in the SMP1 to SMP6 estimated from values obtained in the measurement. In FIG. 12, for example, in the case of SMP4, leakage current is 28 yA/μm when the voltage of the node A is 3.0 V. Since the leakage current includes the off-state current of the transistor 812, the off-state current of the transistor 812 can be estimated to be 28 yA/μm or lower.

Figure 13:
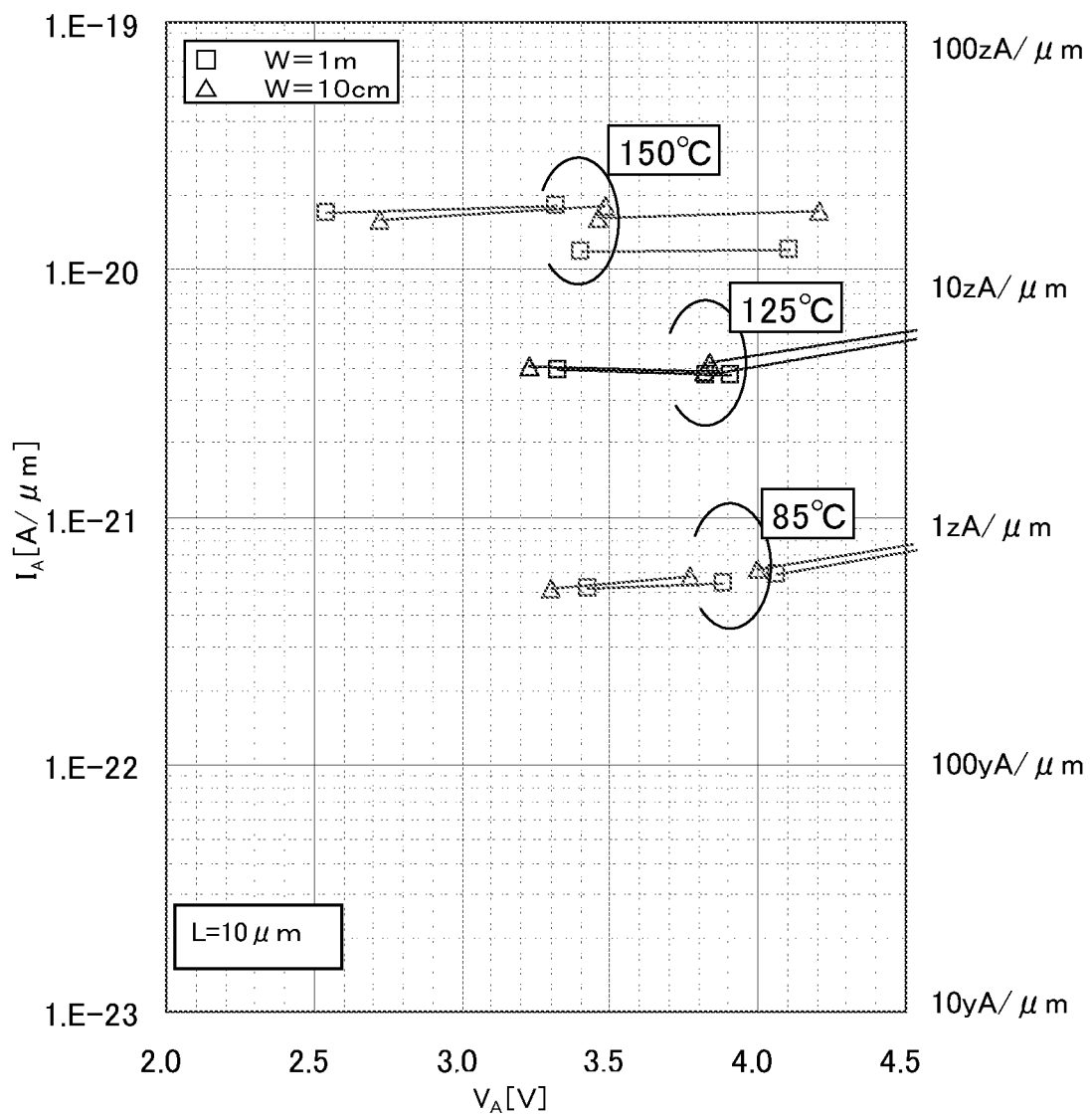
FIG. 13 is a graph showing a relationship between voltage of the node A and leakage current estimated from measurement.
Figure 14:
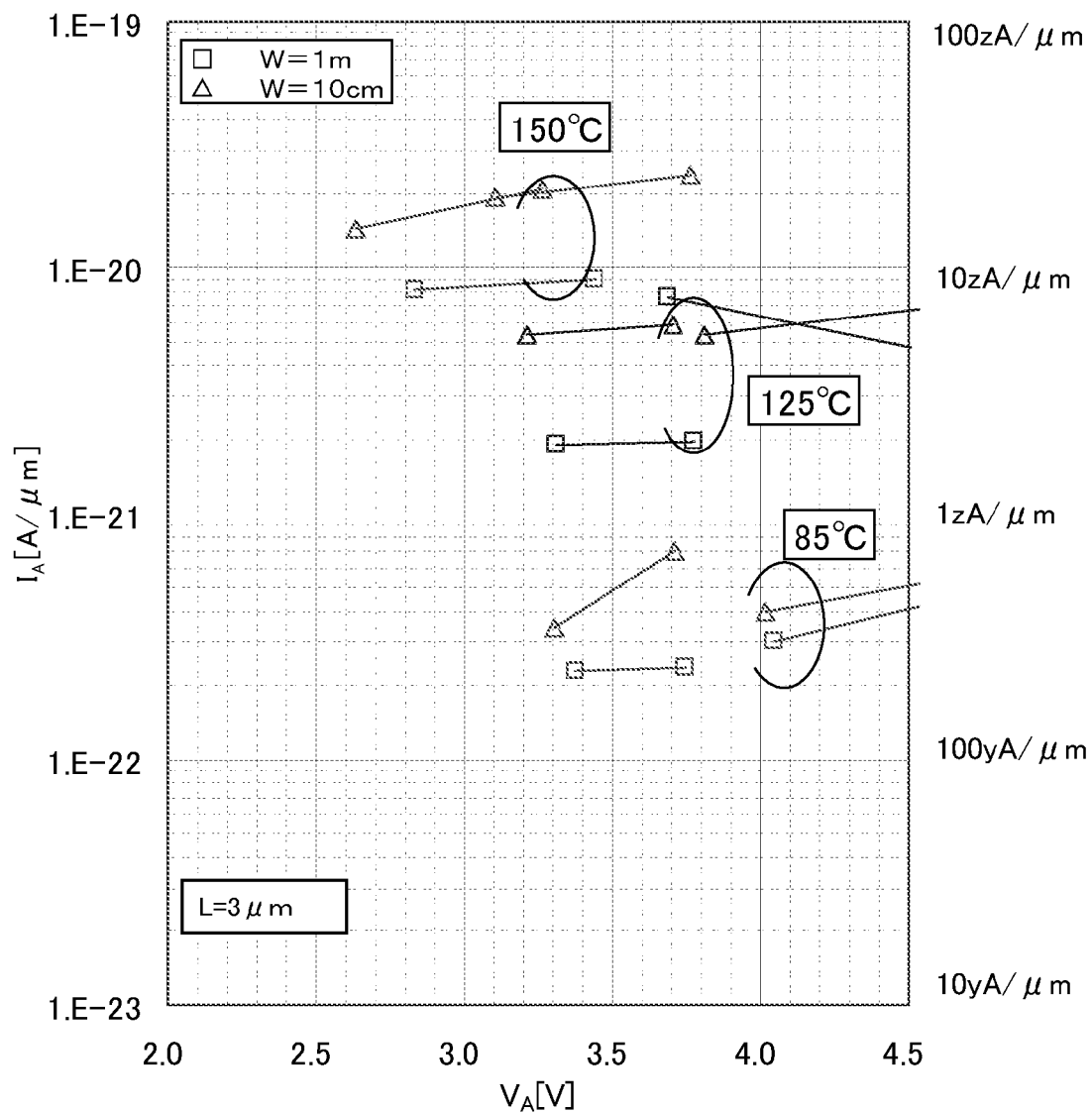
FIG. 14 is a graph showing a relationship between voltage of the node A and leakage current estimated from measurement.
Figure 15:
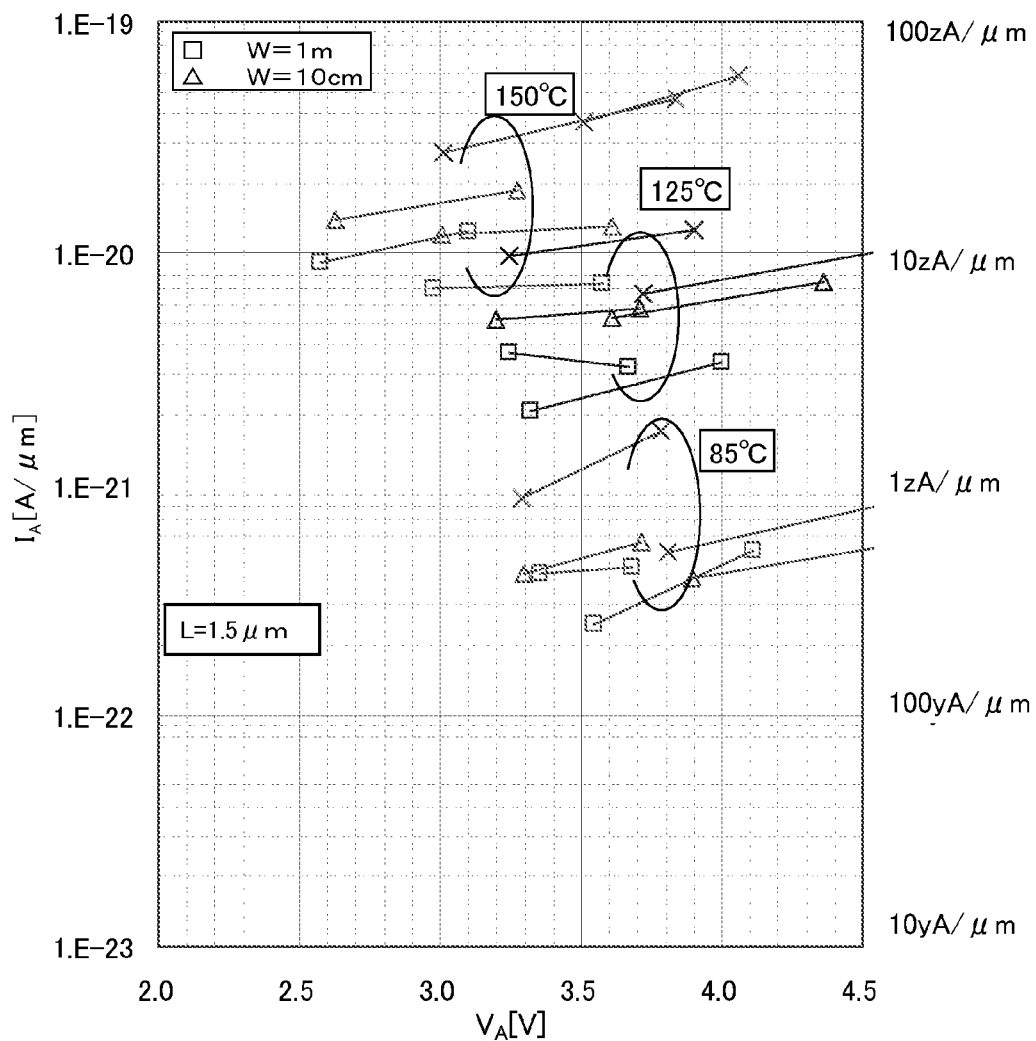
FIG. 15 is a graph showing a relationship between voltage of the node A and leakage current estimated from measurement.

FIG. 13, FIG. 14, and FIG. 15 illustrate the relationship between the voltage of the node A and the leakage current in the SMP1 to SMP6 estimated from the measurement at 85° C., 125° C., and 150° C. As illustrated in FIG. 13, FIG. 14, and FIG. 15, even at 150° C., the leakage current is 100 zA/μm or lower.

As described above, the leakage current of the circuit for evaluating characteristics using a transistor including a highly-purified oxide semiconductor layer serving as a channel formation layer is sufficiently low, which means that the off-state current of the transistor is sufficiently low. In addition, it turns out that the off-state current of the transistor is sufficiently low even when the temperature rises.

The estimation examples of the optical deterioration characteristics of an example of the transistor of this embodiment which includes an oxide semiconductor layer will be described below.

Figure 16A:
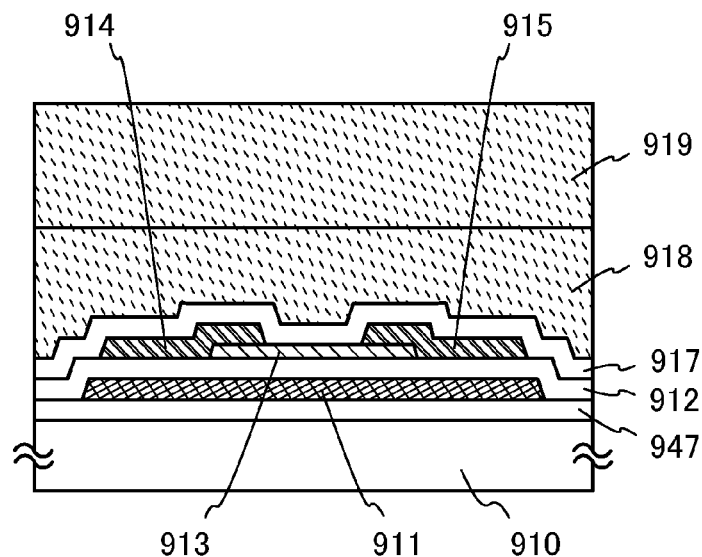
FIGS. 16A and 16B are diagrams for describing examples of a transistor for evaluation.
Figure 16B:
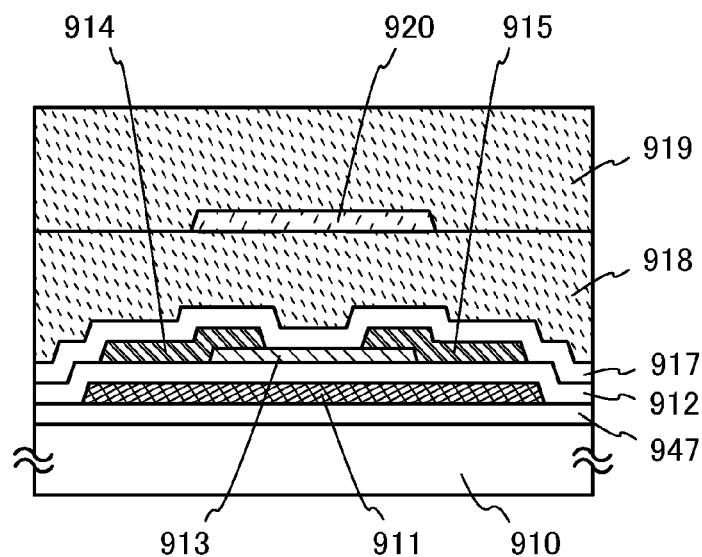

First, the structure of a transistor for the evaluation will be described with reference to FIGS. 16A and 16B. FIGS. 16A and 16B are cross-sectional views illustrating the structure of a transistor for evaluating the optical deterioration characteristics.

A transistor in FIG. 16A includes an insulating layer 947 over a substrate 910, a conductive layer 911 being over the insulating layer 947 and serving as a gate, an insulating layer 912 serving as a gate insulating layer, an oxide semiconductor layer 913 overlapping with the conductive layer 911 with the insulating layer 912 therebetween and serving as a channel formation layer, a conductive layer 914 and a conductive layer 915 serving as a source and a drain, respectively, and being in contact with the oxide semiconductor layer 913. Further, the transistor in FIG. 16A includes a stack of an insulating layer 918 and an insulating layer 919 over the oxide semiconductor layer 913, the conductive layer 914, and the conductive layer 915.

A transistor in FIG. 16B includes, in addition to the components in FIG. 16A, a conductive layer 920 overlapping with the oxide semiconductor layer 913 with the insulating layer 917 and the insulating layer 918 therebetween and serving as a gate (a back gate electrode).

The channel lengths of the transistor in FIG. 16A and the transistor in FIG. 16B are 3 μm. The channel widths of the transistor in FIG. 16A and the transistor in FIG. 16B are 20 μm.

Next, a method for manufacturing the transistor in FIG. 16A and the transistor in FIG. 16B will be described.

First, the substrate 910 is prepared.

Next, a stack of a 200-nm-thick silicon nitride film and a 400-nm-thick silicon oxynitride film is formed over the substrate 910 by CVD, thereby forming the insulating layer 947.

Then, a stack of a 30-nm-thick tantalum nitride film and a 100-nm-thick tungsten film is formed over the insulating layer 947 by sputtering, and the stack is selectively etched to form the conductive layer 911.

After that, a 30-nm-thick silicon oxynitride film is formed over the conductive layer 911 by high-density plasma CVD, thereby forming the insulating layer 912.

Next, a 30-nm-thick oxide semiconductor film is formed over the insulating layer 912 by sputtering using an In—Ga—Zn—O based oxide semiconductor target, and the oxide semiconductor film is selectively etched to form the oxide semiconductor layer 913.

Then, heat treatment is performed in a nitrogen atmosphere at 450° C. for 60 minutes (a first heat treatment).

After that, a stack of a 100-nm-thick titanium film, a 200-nm-thick aluminum film, and a 100-nm-thick titanium film is formed over the oxide semiconductor layer 913 by sputtering, and the stack is selectively etched to form the conductive layer 914 and the conductive layer 915.

Then, heat treatment is performed in a nitrogen atmosphere at 300° C. for 60 minutes (a second heat treatment).

Next, a silicon oxide film is formed over the oxide semiconductor layer 913, the conductive layer 914, and the conductive layer 915 by sputtering to form the insulating layer 917.

Then, a 1.5-μm-thick polyimide resin film is formed over the insulating layer 917 to form the insulating layer 918.

Then, heat treatment is performed in a nitrogen atmosphere at 250° C. for 60 minutes (a third heat treatment).

After that, in order to fabricate the transistor in FIG. 16A, a 2.0-μm-thick polyimide resin film is formed over the insulating layer 918 to form the insulating layer 919.

In contrast, in order to fabricate the transistor in FIG. 16B, a stack of a 100-nm-thick titanium film, a 200-nm-thick aluminum film, and a 100-nm-thick titanium film is first formed over the insulating layer 918 by sputtering, and the stack is selectively etched to form the conductive layer 920. Further, a 2.0-μm-thick polyimide resin film is formed over the insulating layer 918 and the conductive layer 920 to form the insulating layer 919. This is the method for manufacturing the transistor in FIG. 16A and the transistor in FIG. 16B.

Next, the results of negative bias temperature stress test with light irradiation for the transistor in FIG. 16A and the transistor in FIG. 16B will be described.

Note that the negative bias temperature stress test with light irradiation is a kind of acceleration test. In particular, the amount of a change in the threshold voltage Vth of a transistor obtained from the negative bias temperature stress test with light irradiation is an important measure of the reliability. In the negative bias temperature stress test with light irradiation, it can be said that the smaller the amount of change in Vth, the higher the reliability of the transistor. It is preferable that the amount of change in Vth between before and after the negative bias temperature stress test with light irradiation be 1 V or less, preferably 0.5 V or less.

Specifically, the negative bias temperature stress test with light irradiation is performed in such a manner that the temperature of a substrate over which a transistor is formed (substrate temperature) is set at fixed temperature, a source electrode and a drain electrode of the transistor are set at the same potential, and a gate electrode is supplied with a potential which is lower than those of the source electrode and the drain electrode for a certain period while the transistor is irradiated with light.

The intensity of stress due to degradation of a transistor in a negative bias temperature stress test with light irradiation can be determined by the light irradiation conditions, the substrate temperature, the intensity of electric field applied to a gate insulating layer, and a time of applying the electric field. The intensity of the electric field applied to the gate insulating layer is determined by a value obtained by dividing a potential difference between the gate and each of the source electrode and the drain electrode by the thickness of the gate insulating layer.

A test in which a potential higher than that of a source electrode and a drain electrode is applied to a gate electrode under light irradiation is called a positive bias temperature stress test with light irradiation. The characteristics of a transistor are likely to change more notably through a negative bias temperature stress test with light irradiation than through the positive bias temperature stress test with light irradiation.

Before the negative bias temperature stress test with light irradiation is carried out, the initial characteristics of the transistor in FIG. 16A and the transistor in FIG. 16B were firstly measured. In this embodiment, measured were change in the characteristics of current flowing between the conductive layer 914 and the conductive layer 915 (hereinafter referred to as drain current or Id) (Vg-Id characteristics) under the following conditions: the temperature of the substrate 910 is room temperature (25° C.); voltage applied between the conductive layer 914 and the conductive layer 915 (hereinafter referred to as drain voltage or Vd) is 3 V; and voltage applied between the conductive layer 911 and the conductive layer 914 (hereinafter referred to as gate voltage or Vg) is changed between −5 V and +5 V.

Further, in the negative bias temperature stress test with light irradiation, the temperature of the substrate 910 over which the transistor is formed (substrate temperature) is maintained at 25° C.; the voltage applied to the conductive layer 914 and the voltage applied to the conductive layer 915 are set equal, the intensity of electric-field applied to the insulating layer 912 is 2 MV/cm; negative voltage is applied to the conductive layer 911; and irradiation of light from the insulating layer 919 side is kept for one hour. Note that voltage applied to the conductive layer 911 is −6 V. In addition, voltage applied to the conductive layer 914 and voltage applied to the conductive layer 915 is 0 V. The condition of the light irradiation was as follows: a xenon light source "MAX-302" manufactured by Asahi Spectra Co., Ltd is used, the peak wavelength is 400 nm (half width: 10 nm), and irradiance is 326 μW/cm$^2$. Further, the voltage application was ended but while keeping the light irradiation, the Vg-Id characteristics were measured under the conditions that are the same as those of the measurement of the initial characteristics, so that the Vg-Id characteristics that the transistor exhibits after the negative bias temperature stress test with light irradiation were evaluated.

Figure 17:
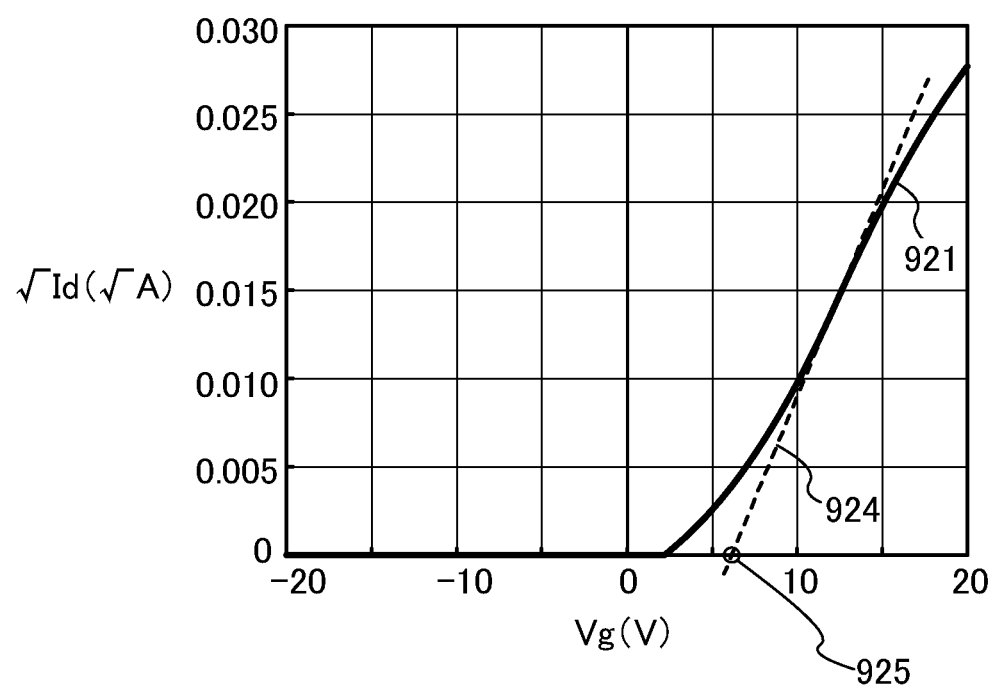
FIG. 17 is a graph for describing the definition of Vth.

Now, the threshold voltage Vth in the negative bias temperature stress test with light irradiation will be defined with reference to FIG. 17. In FIG. 17, the horizontal axis represents the gate voltage on a linear scale and the vertical axis represents the square root of the drain current (hereinafter also referred to as √Id) on a linear scale. A curve 921 indicates the square root of value of $I_d$ in the Vg-Id characteristics (the curve is hereinafter also referred to as a √Id curve).

First, the √Id curve (the curve 921) is obtained from the Vg-Id curve. Then, a tangent 924 to a point on the √Id curve at which a differential value of the √Id curve is the maximum is obtained. Next, the tangent 924 is extended, and the gate voltage Vg at a drain current Id of 0 A on the tangent 924, that is, a value at a horizontal-axis-intercept, i.e., gate-voltage-axis-intercept 925 of the tangent 924 is defined as Vth.

Figure 18A:
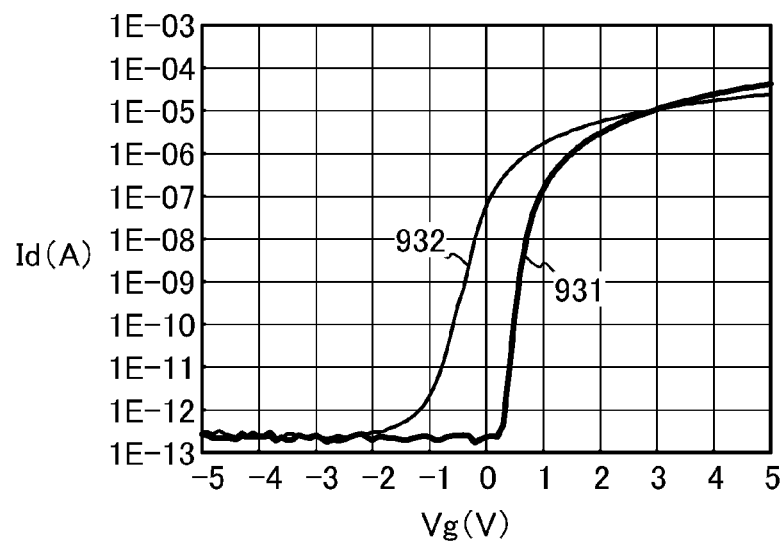
FIGS. 18A to 18C are graphs showing the results of a negative-bias temperature stress test with light irradiation.
Figure 18B:
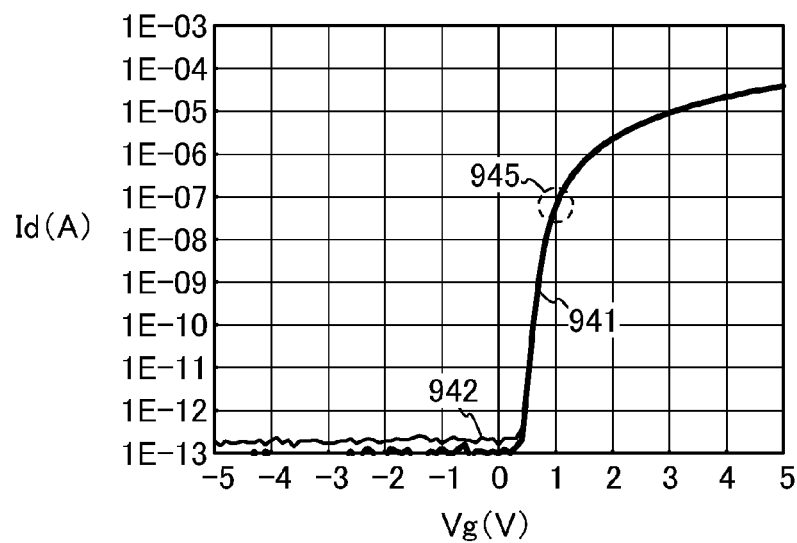
Figure 18C:
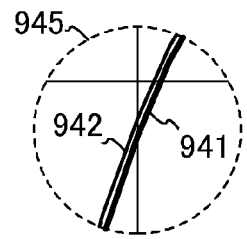

Vg-Id characteristics that the transistor in FIG. 16A and the transistor in FIG. 16B exhibit before and after the negative bias temperature stress test with light irradiation are shown in FIGS. 18A to 18C.

FIG. 18A illustrates the Vg-Id characteristics of the transistor in FIG. 16A. As shown in FIG. 18A, Vth of a characteristic curve 931 (which indicates the Vg-Id characteristics that the transistor in FIG. 16A exhibits before the negative bias temperature stress test with light irradiation) is 1.01 V, and Vth of a characteristic curve 932 (which indicates the Vg-Id characteristics that the transistor in FIG. 16A exhibits after the negative bias temperature stress test with light irradiation) is 0.44 V.

FIG. 18B illustrates the Vg-Id characteristics of the transistor in FIG. 16B. FIG. 18C is an enlarged graph of a portion 945 in FIG. 18B. As shown in FIG. 18B, Vth of a characteristic curve 941 (which indicates the Vg-Id characteristics that the transistor in FIG. 16B exhibits before the negative bias temperature stress test with light irradiation) is 1.16 V, and Vth of a characteristic curve 942 (which indicates the Vg-Id characteristics that the transistor in FIG. 16B exhibits after the negative bias temperature stress test with light irradiation) is 1.10 V.

In FIG. 18A, the characteristic curve 932 is shifted by 0.57 V in the negative direction from the characteristic curve 931. In FIG. 18B, the characteristic curve 942 is shifted by 0.06 V in the negative direction from the characteristic curve 941. This shows that the amount of change in the Vth of each of the transistor in FIG. 16A and the transistor in FIG. 16B is 1 V or less and the transistor in FIG. 16A and the transistor in FIG. 16B have a high reliability. In addition, the amount of change in the Vth of the transistor in FIG. 16B which includes the conductive layer 920 is 0.1 V or less, which means that the transistor in FIG. 16B has a higher reliability than the transistor in FIG. 16A.

In the input/output device of the above embodiments, data is input by the entrance of light. Therefore, use of the transistor including the oxide semiconductor layer as the transistor in the input/output device of the above embodiments can improve the reliability of the input/output device.

Embodiment 7

In this embodiment, structural examples of the input/output device of the above embodiment are described.

The input/output device of this embodiment includes a first substrate (an active matrix substrate) provided with a semiconductor element such as a transistor, a second substrate, and a liquid crystal layer provided between the first substrate and the second substrate.

Figure 19A:
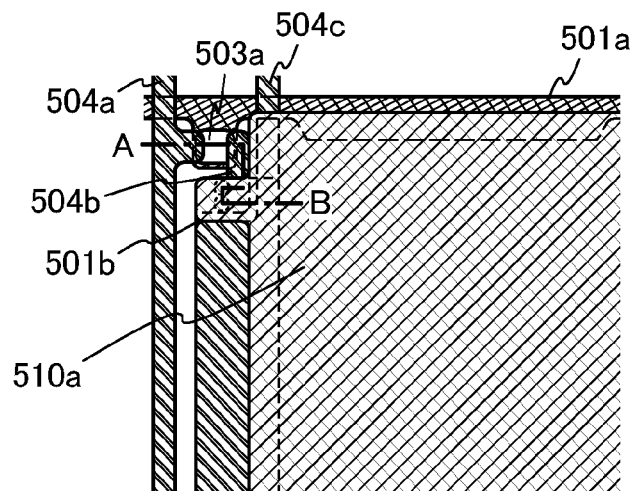
FIGS. 19A and 19B are diagrams illustrating a structural example of an active-matrix substrate in the input/output device of Embodiment 7.
Figure 19B:
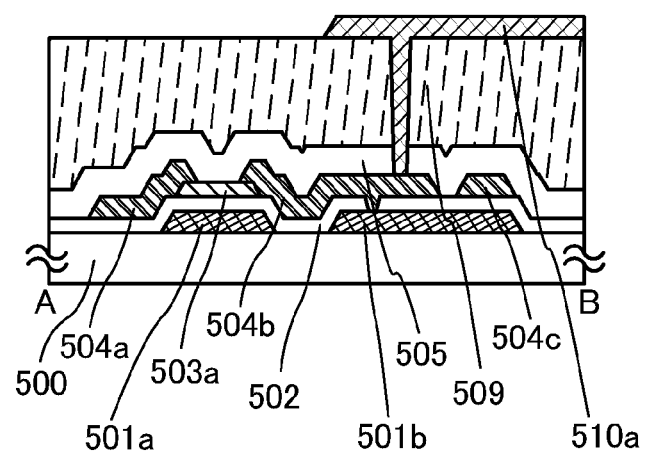
Figure 20A:
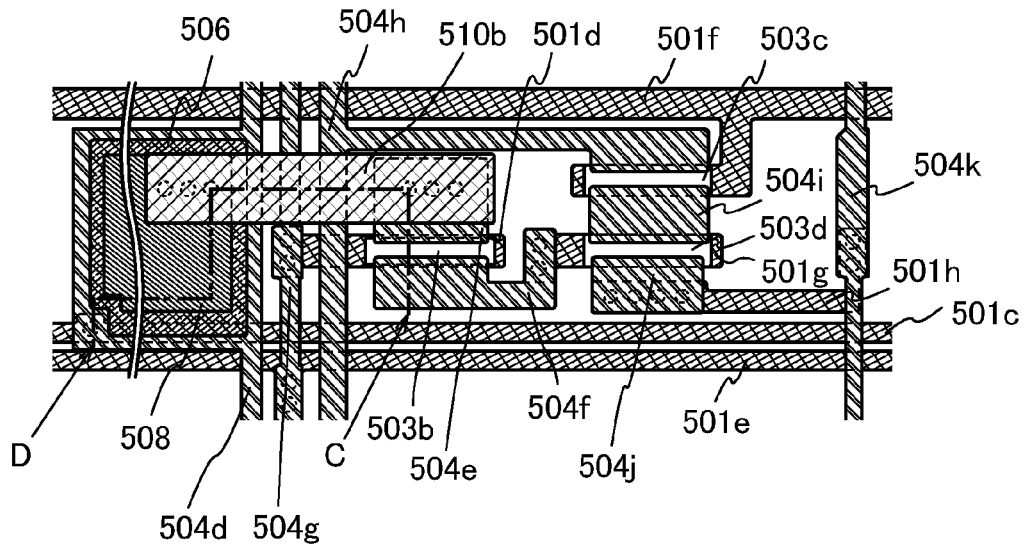
FIGS. 20A and 20B are diagrams illustrating a structural example of an active-matrix substrate of the input/output device of Embodiment 7.
Figure 20B:
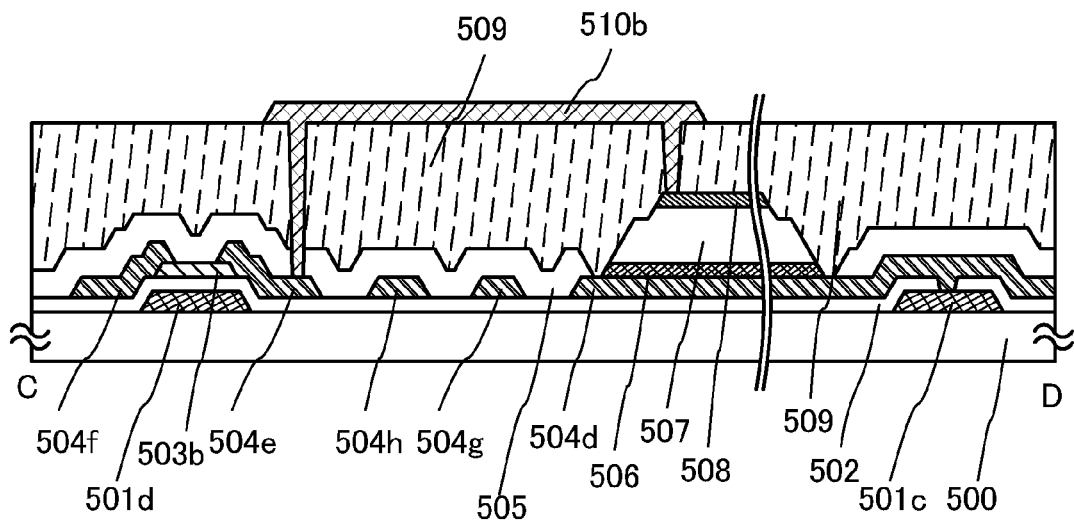

First, structural examples of the active matrix substrate in the input/output device of this embodiment will be described with reference to FIGS. 19A and 19B and FIGS. 20A and 20B. FIGS. 19A and 19B and FIGS. 20A and 20B illustrate structural examples of the active matrix substrate in the input/output device of this embodiment. FIG. 19A is a schematic plan view, and FIG. 19B is a schematic cross-sectional view taken along line A-B in FIG. 19A. FIG. 20A is a schematic plan view, and FIG. 20B is a schematic cross-sectional view taken along line C-D in FIG. 20A. Note that in FIGS. 20A and 20B, a photodetector circuit having the structure shown in FIG. 6A and the photodetection control transistor (the transistor 134 in FIG. 6B) is used as an example of a photodetector circuit. In FIGS. 19A and 19B and FIGS. 20A and 20B, the transistor with the structure described with reference to FIG. 8A is used as an example of a transistor.

The active matrix substrate illustrated in FIGS. 19A and 19B and FIGS. 20A and 20B includes a substrate 500, conductive layers 501a to 501h, an insulating layer 502, semiconductor layers 503a to 503d, conductive layers 504a to 504k, an insulating layer 505, a semiconductor layer 506, a semiconductor layer 507, a semiconductor layer 508, an insulating layer 509, and conductive layers 510a and 510b.

Each of the conductive layers 501a to 501h is formed over a surface of the substrate 500.

The conductive layer 501a functions as a gate of a display selection transistor in a display circuit.

The conductive layer 501b functions as a first capacitor electrode of a storage capacitor in the display circuit. Note that a layer that functions as a first capacitor electrode of a capacitor (a storage capacitor) is also referred to as a first capacitor electrode.

The conductive layer 501c functions as a wiring through which the voltage $V_b$ is input. Note that a layer that functions as a wiring is also referred to as a wiring.

The conductive layer 501d functions as a gate of a photodetection control transistor in the photodetector circuit.

The conductive layer 501e functions as a signal line through which a photodetection control signal is input. Note that a layer that functions as a signal line is also referred to as a signal line.

The conductive layer 501f functions as a gate of an output control transistor in the photodetector circuit.

The conductive layer 501g functions as a gate of an amplifier transistor in the photodetector circuit.

The insulating layer 502 is provided over a surface of the substrate 500 with the conductive layers 501a to 501h interposed therebetween.

The insulating layer 502 functions as a gate insulating layer of the display selection transistor in the display circuit, a dielectric layer of the storage capacitor in the display circuit, a gate insulating layer of the photodetection control transistor in the photodetector circuit, a gate insulating layer of the amplifier transistor in the photodetector circuit, and a gate insulating layer of the output selection transistor in the photodetector circuit.

The semiconductor layer 503a overlaps with the conductive layer 501a with the insulating layer 502 interposed therebetween. The semiconductor layer 503a functions as a channel formation layer of the display selection transistor in the display circuit.

The semiconductor layer 503b overlaps with the conductive layer 501d with the insulating layer 502 interposed therebetween. The semiconductor layer 503b functions as a channel formation layer of the photodetection control transistor in the photodetector circuit.

The semiconductor layer 503c overlaps with the conductive layer 501f with the insulating layer 502 interposed therebetween. The semiconductor layer 503c functions as a channel formation layer of the output selection transistor in the photodetector circuit.

The semiconductor layer 503d overlaps with the conductive layer 501g with the insulating layer 502 interposed therebetween. The semiconductor layer 503d functions as a channel formation layer of the amplifier transistor in the photodetector circuit.

The conductive layer 504a is electrically connected to the semiconductor layer 503a. The conductive layer 504a functions as one of a source and a drain of the display selection transistor in the display circuit.

The conductive layer 504b is electrically connected to the conductive layer 501b and the semiconductor layer 503a. The conductive layer 504b functions as the other of the source and the drain of the display selection transistor in the display circuit.

The conductive layer 504c overlaps with the conductive layer 501b with the insulating layer 502 interposed therebetween. The conductive layer 504c functions as a second capacitor electrode of the storage capacitor in the display circuit.

The conductive layer 504d is electrically connected to the conductive layer 501c through an opening that penetrates the insulating layer 502. The conductive layer 504d functions as one of a first current terminal and a second current terminal of a photoelectric transducer in the photodetector circuit.

The conductive layer 504e is electrically connected to the semiconductor layer 503b. The conductive layer 504e functions as one of a source and a drain of the photodetection control transistor in the photodetector circuit.

The conductive layer 504f is electrically connected to the semiconductor layer 503b and is electrically connected to the conductive layer 501g through an opening that penetrates the insulating layer 502. The conductive layer 504f functions as the other of the source and the drain of the photodetection control transistor in the photodetector circuit.

The conductive layer 504g is electrically connected to the conductive layer 501d and the conductive layer 501e through an opening that penetrates the insulating layer 502. The conductive layer 504g functions as a signal line through which a photodetection control signal is input.

The conductive layer 504h is electrically connected to the semiconductor layer 503c. The conductive layer 504h functions as one of a source and a drain of the output selection transistor in the photodetector circuit.

The conductive layer 504i is electrically connected to the semiconductor layer 503c and the semiconductor layer 503d. The conductive layer 504i functions as the other of the source and the drain of the output selection transistor in the photodetector circuit and one of a source and a drain of the amplifier transistor in the photodetector circuit.

The conductive layer 504j is electrically connected to the semiconductor layer 503d and is electrically connected to the conductive layer 501h through an opening that penetrates the insulating layer 502. The conductive layer 501j functions as the other of the source and the drain of the amplifier transistor in the photodetector circuit.

The conductive layer 504k is electrically connected to the conductive layer 501h through an opening that penetrates the insulating layer 502. The conductive layer 504k functions as a wiring through which the voltage $V_a$ or the voltage $V_b$ is input.

The insulating layer 505 is in contact with the semiconductor layers 503a to 503d with the conductive layers 504a to 504k interposed therebetween.

The semiconductor layer 506 is electrically connected to the conductive layer 504d through an opening that penetrates the insulating layer 505.

The semiconductor layer 507 is in contact with the semiconductor layer 506.

The semiconductor layer 508 is in contact with the semiconductor layer 507.

The insulating layer 509 overlaps with the insulating layer 505, the semiconductor layer 506, the semiconductor layer 507, and the semiconductor layer 508. The insulating layer 509 functions as a planarization insulating layer in the display circuit and the photodetector circuit. Note that the insulating layer 509 is not necessarily provided.

The conductive layer 510a is electrically connected to the conductive layer 504b through an opening that penetrates the insulating layers 505 and 509.

Providing the conductive layer 510a over the conductive layer 501a can prevent light leakage. The conductive layer 510a functions as a pixel electrode of a display element in the display circuit. Note that a layer that functions as a pixel electrode is also referred to as a pixel electrode.

The conductive layer 510b is electrically connected to the conductive layer 504e through an opening that penetrates the insulating layers 505 and 509 and is electrically connected to the semiconductor layer 508 through an opening that penetrates the insulating layers 505 and 509.

Figure 21A:
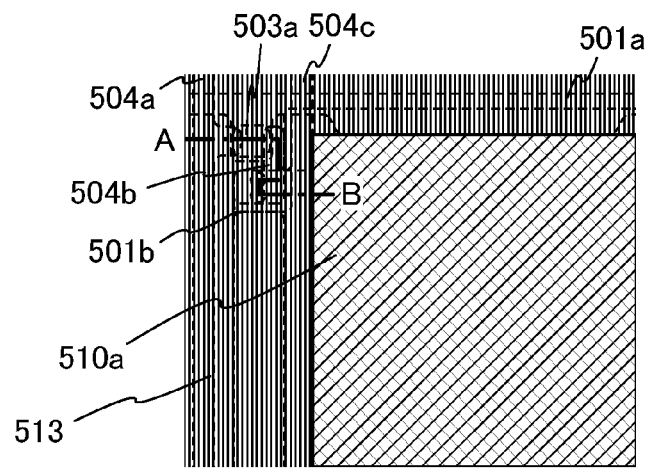
FIGS. 21A and 21B are diagrams illustrating a structural example of the input/output device of Embodiment 7.
Figure 21B:
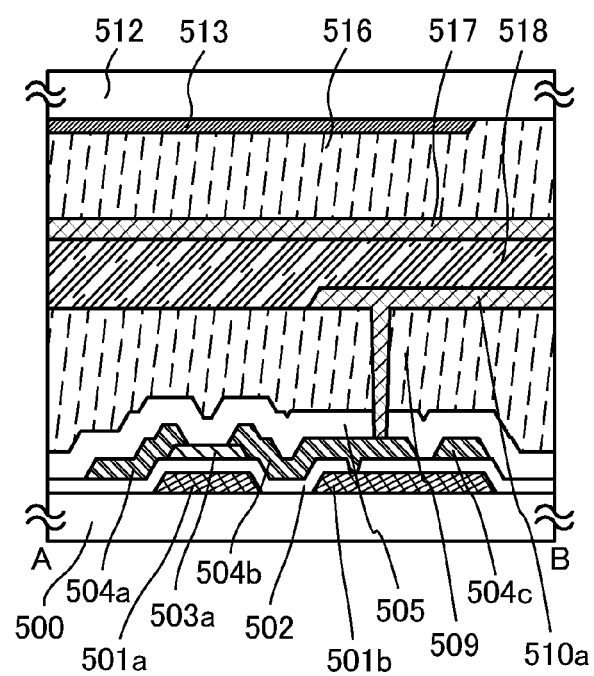
Figure 22A:
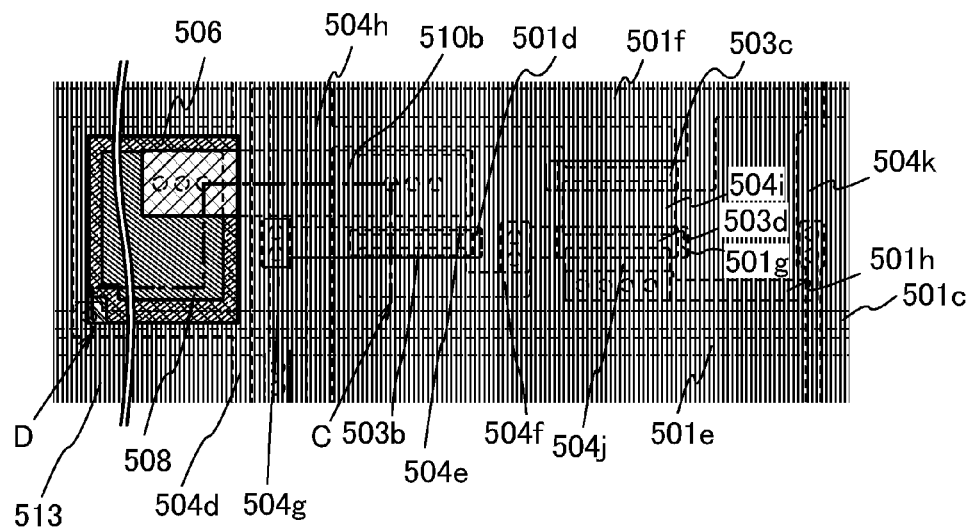
FIGS. 22A and 22B are diagrams illustrating a structural example of the input/output device of Embodiment 7.
Figure 22B:
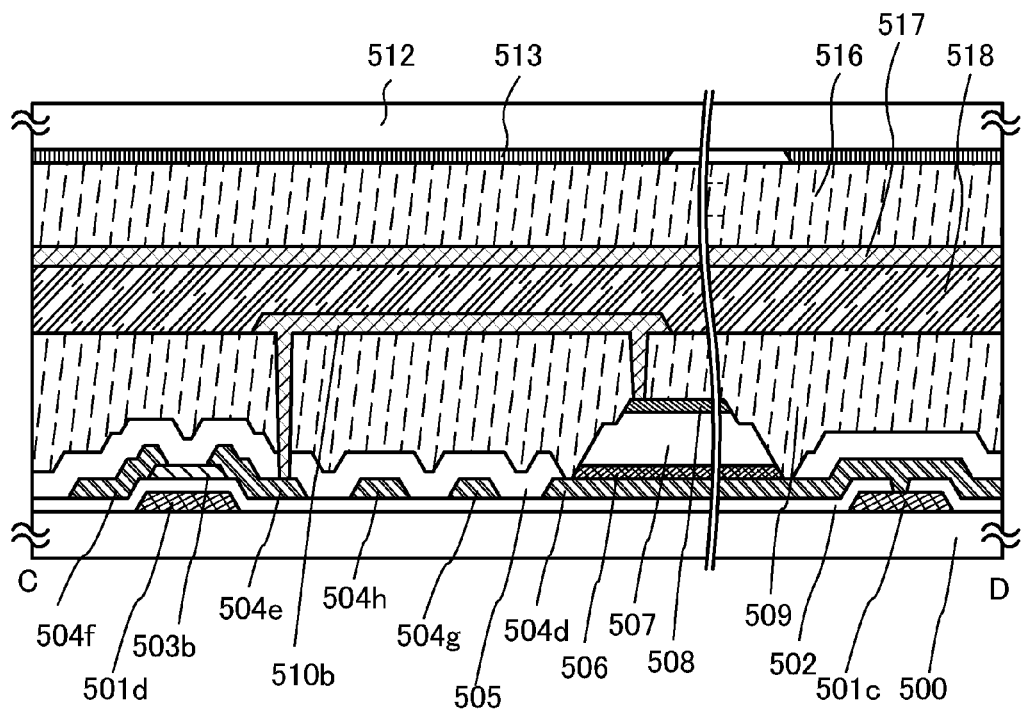

Next, a structural example of the input/output device of this embodiment will be described with reference to FIGS. 21A and 21B and FIGS. 22A and 22B. FIGS. 21A and 21B and FIGS. 22A and 22B show a structural example of an input/output device using the active matrix substrate in FIGS. 19A and 19B and FIGS. 20A and 20B. FIG. 21A is a schematic plane view, FIG. 21B is a schematic cross-sectional view taken along line A-B in FIG. 21A, FIG. 22A is a schematic plane view, and FIG. 22B is a schematic cross-sectional view taken along line C-D in FIG. 22A. Note that as an example, a photoelectric converter is a photodiode, and a display element is a liquid crystal element.

The input/output device in FIGS. 21A and 21B and FIGS. 22A and 22B includes, in addition to the active matrix substrate in FIGS. 19A and 19B and FIGS. 20A and 20B, a substrate 512, a light-blocking layer 513, an insulating layer 516, a conductive layer 517, and a liquid crystal layer 518. Note that in FIG. 21A and FIG. 22A, the conductive layer 517 is omitted for convenience sake.

The light-blocking layer 513 is provided over a part of a surface of the substrate 512. For example, the light-blocking layer 513 is provided over a surface of the substrate 512 except for a portion overlapping with the photoelectric converter.

The insulating layer 516 is provided over a surface of the substrate 512 with the light-blocking layer 513 interposed therebetween.

The conductive layer 517 is provided on a surface of the substrate 512. The conductive layer 517 functions as a common electrode in the display circuit. Note that in the photodetector circuit, the conductive layer 517 is not necessarily provided.

The liquid crystal layer 518 is provided between the conductive layer 510a and the conductive layer 517 and overlaps with the semiconductor layer 508 with the insulating layer 509 interposed therebetween.

Note that the conductive layer 510a, the liquid crystal layer 518, and the conductive layer 517 function as a display element in the display circuit.

Further, the components of the input/output device illustrated in FIGS. 21A and 21B and FIGS. 22A and 22B will be described.

Each of the substrates 500 and 512 can be a substrate that can be used as the substrate 400a in FIG. 8A.

Each of the conductive layers 501a to 501h can be a layer of a material that can be used for the conductive layer 401a in FIG. 8A. Alternatively, each of the conductive layers 501a to 501h may be a stack of layers of materials that can be used for the conductive layer 401a.

The insulating layer 502 can be a layer of a material that can be used for the insulating layer 402a in FIG. 8A. Alternatively, the insulating layer 502 may be a stack of layers of materials that can be used for the insulating layer 402a.

Each of the semiconductor layers 503a to 503d can be a layer of a material that can be used for the oxide semiconductor layer 403a in FIG. 8A. Note that as each of the semiconductor layers 503a to 503d can be a semiconductor layer using a semiconductor that belongs to Group 14 in the periodic table (e.g., silicon).

Each of the conductive layers 504a to 504k can be a layer of a material that can be used for the conductive layer 405a or the conductive layer 406a in FIG. 8A. Alternatively, each of the conductive layers 504a to 504k may be a stack of layers of materials that can be used for the conductive layer 405a or the conductive layer 406a.

The insulating layer 505 can be a layer of a material that can be used for the insulating layer 407a in FIG. 8A. Alternatively, the insulating layer 505 may be a stack of layers of materials that can be used for the insulating layer 407a.

The semiconductor layer 506 is a semiconductor layer having one conductivity (one or p-type conductivity and n-type conductivity). The semiconductor layer 506 is a semiconductor layer containing silicon, for example.

The semiconductor layer 507 has lower resistance than the semiconductor layer 506. The semiconductor layer 507 is a semiconductor layer containing silicon, for example.

The semiconductor layer 508 is a semiconductor layer whose conductivity is different from the conductivity of the semiconductor layer 506 (the other of the p-type conductivity and the n-type conductivity). The semiconductor layer 508 is a semiconductor layer containing silicon, for example.

Each of the insulating layers 509 and 516 is, for example, a layer of an organic material such as polyimide, acrylic, or benzocyclobutene. Alternatively, the insulating layer 509 may be a layer of a low-dielectric constant material (also referred to as a low-k material).

Each of the conductive layers 510a, 510b, and 517 is, for example, a layer of a light-transmitting conductive material such as indium tin oxide, a metal oxide in which zinc oxide is mixed in indium oxide (such a metal oxide is also referred to as indium zinc oxide (IZO)), a conductive material in which silicon oxide ($SiO_2$) is mixed in indium oxide, organoindium, organotin, indium oxide containing tungsten oxide, indium zinc oxide containing tungsten oxide, indium oxide containing titanium oxide, or indium tin oxide containing titanium oxide.

The conductive layers 510a, 510b, and 517 can be formed using a conductive composition containing a conductive high-molecular compound (also referred to as a conductive polymer). A conductive layer formed using the conductive composition preferably has a sheet resistance of 10000 ohm/square or less and a transmittance of 70% or more at a wavelength of 550 nm. Further, the resistivity of the conductive high-molecular compound contained in the conductive composition is preferably 0.1 Ω·cm or less.

As the conductive high-molecular compound, a so-called π electron conjugated conductive high-molecular compound can be used. For example, polyaniline and/or a derivative thereof, polypyrrole and/or a derivative thereof, polythiophene and/or a derivative thereof, and a copolymer of two or more kinds of those materials can be given as the π electron conjugated conductive high-molecular compound.

As the light-blocking layer 513, a layer of a metal material can be used, for example.

The liquid crystal layer 518 can be, for example, a layer containing a TN liquid crystal, an OCB liquid crystal, an STN liquid crystal, a VA liquid crystal, an ECB liquid crystal, a GH liquid crystal, a polymer dispersed liquid crystal, or a discotic liquid crystal can be used. Note that for the liquid crystal layer 518, a liquid crystal that transmits light when voltage applied to the conductive layer 510c and the conductive layer 517 is 0 V is preferably used.

As described with reference to FIGS. 19A and 19B, FIGS. 20A and 20B, FIGS. 21A and 21B, and FIGS. 22A and 22B, the structural example of the input/output device of this embodiment includes the active matrix substrate provided with the transistor, the pixel electrode, and the photoelectric transducer, a counter substrate, and the liquid crystal layer having a liquid crystal between the active matrix substrate and the counter substrate. With such a structure, the display circuit and the photodetector circuit can be manufactured over one substrate in the same steps; thus, manufacturing cost can be reduced.

In addition, as described with reference to FIGS. 19A and 19B, FIGS. 20A and 20B, FIGS. 21A and 21B, and FIGS. 22A and 22B, the structural example of the input/output device of this embodiment includes the light-blocking layer in a portion except a portion through which light is supposed to pass. This structure can reduce the entrance of light into the transistor disposed in the active matrix substrate, for example, thereby suppressing variations in the electrical characteristics of the transistor caused by light (e.g., threshold voltage).

In addition, in the input/output device of this embodiment, a circuit such as the display selection signal output circuit and the output selection circuit can be provided over the same substrate as the display circuit and the photodetector circuit. At that time, the transistor in a circuit such as the display selection signal output circuit and the output selection circuit can have the same structure as the transistor in the display circuit and the photodetector circuit.

Embodiment 8

In this embodiment, described are examples of an electronic appliance each provided with the input/output device of the above embodiments.

Structural examples of the electronic appliances of this embodiment will be described with reference to FIGS. 23A to 23D. FIGS. 23A to 23D are schematic views each illustrating a structural example of the electronic appliance of this embodiment.

Figure 23A:
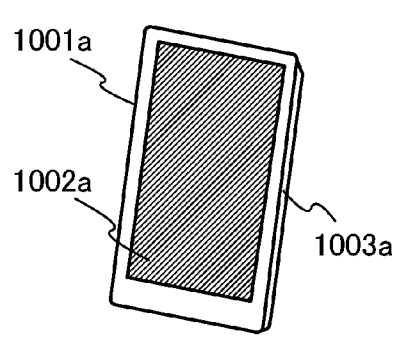
FIGS. 23A to 23D are schematic diagrams illustrating structural examples of an electronic device of Embodiment 8.

An electronic appliance in FIG. 23A is an example of a mobile information terminal. The mobile information terminal in FIG. 23A includes a housing 1001a and an input/output unit 1002a provided in the housing 1001a.

Note that a side surface 1003a of the housing 1001a may be provided with a connection terminal for connecting the mobile information terminal to an external device and one or more buttons used to operate the mobile information terminal in FIG. 23A.

The mobile information terminal in FIG. 23A includes a CPU, a main memory, an interface transmitting/receiving a signal traveling between the external device and each of the CPU and the main memory, and an antenna transmitting/receiving a signal to/from the external device, in the housing 1001a.

The mobile information terminal in FIG. 23A serves, for example, as one or more devices selected from a telephone, an electronic book, and a game machine.

Figure 23C:
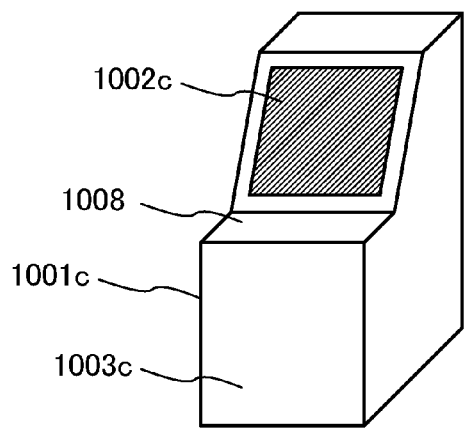
Figure 23B:
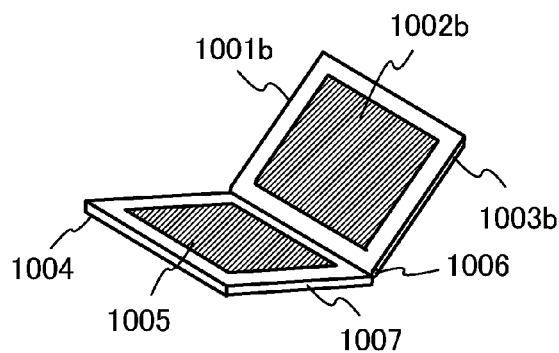

An electronic appliance in FIG. 23B is an example of a folding mobile information terminal. The mobile information terminal in FIG. 23B includes a housing 1001b, an input/output unit 1002b provided in the housing 1001b, a housing 1004, an input/output unit 1005 provided in the housing 1004, and a hinge 1006 for connecting the housing 1001b and the housing 1004.

In the mobile information terminal in FIG. 23B, the housing 1001b can be stacked on the housing 1004 by moving the housing 1001b or the housing 1004 with the hinge 1006.

Note that a side surface 1003b of the housing 1001b or a side surface 1007 of the housing 1004 may be provided with a connection terminal for connecting the mobile information terminal to an external device and one or more buttons used to operate the mobile information terminal in FIG. 23B.

The input/output unit 1002b and the input/output unit 1005 may display different images or continuous images. Note that the input/output unit 1005 is not necessarily provided; a keyboard which is an input device may be provided instead of the input/output unit 1005.

The mobile information terminal in FIG. 23B includes a CPU, a main memory, and an interface transmitting/receiving a signal traveling between the external device and each of the CPU and the main memory, in the housing 1001b or the housing 1004. In addition, the mobile information terminal in FIG. 23B may include an antenna transmitting/receiving a signal to/from the external device.

The mobile information terminal in FIG. 23B serves, for example, as one or more devices selected from a telephone, an electronic book, and a game machine.

The electronic appliance in FIG. 23C is an example of a stationary information terminal. The stationary information terminal in FIG. 23C includes a housing 1001c and an input/output unit 1002c provided in the housing 1001c.

Note that the input/output unit 1002c can be provided in a top board 1008 of the housing 1001c.

The stationary information terminal in FIG. 23C includes a CPU, a main memory, and an interface transmitting/receiving a signal traveling between the external device and each of the CPU and the main memory, in the housing 1001c. In addition, the stationary information terminal in FIG. 23C may include an antenna transmitting/receiving a signal to/from the external device.

Further, a side surface 1003c of the housing 1001c in the stationary information terminal in FIG. 23C may be provided with one or more parts selected from a ticket ejection portion that ejects a ticket or the like, a coin slot, and a bill slot.

The stationary information terminal in FIG. 23C serves, for examples, as an automated teller machine, a information communication terminal for ticketing or the like (also referred to as a multi-media station), or a game machine.

Figure 23D:
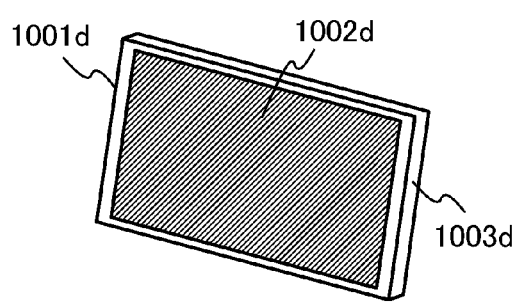

FIG. 23D shows an example of a stationary information terminal. The stationary information terminal in FIG. 23D includes a housing 1001d and an input/output unit 1002d provided in the housing 1001d. Note that a support for supporting the housing 1001d may also be provided.

The stationary information terminal in FIG. 23D serves, for example, as a digital photo frame, a monitor, or a television device.

The input/output device of the above embodiments is used, for example, as an input/output unit of an electronic appliance. The input/output device of the above embodiments is used, for example, as each of the input/output units 1002a to 1002d in FIGS. 23A to 23D. In addition, the input/output device of the above embodiments may be used as the input/output unit 1005 in FIG. 23B.

As described with reference to FIGS. 23A to 23D, examples of an electronic appliance of this embodiment each include an input/output unit for which the input/output device of the above embodiments is used. Consequently, it is possible to operate the electronic appliance or input data to the electronic appliance with a finger or a pen.

Further, an example of an electronic appliance of this embodiment can achieve long intervals between write operations because a period of time to write display data once is long. Consequently, eye strain can be reduced even after a long watch on images displayed on a pixel area.

In addition, the housings of examples of electronic appliances of this embodiment may be each provided with one or more of components selected from an input/output unit, a photoelectric transducer generating power source voltage in accordance with the intensity of incident light, and an operating unit for operating the input/output device. Providing a photoelectric transducer, for example, eliminates necessity of an external power source, allowing the above electronic appliance to be used for a long period of time even in a place without an external power source.

This application is based on Japanese Patent Application serial no. 2010-151941 filed with Japan Patent Office on Jul. 2, 2010, the entire contents of which are hereby incorporated by reference.

What is claimed is:
1. A method for driving an input/output device comprising:
a display circuit; and
a photodetector circuit,
the method for driving comprising the steps of:
supplying a display signal to the display circuit during a first display mode;
not supplying the display signal to the display circuit during a second display mode;
supplying a display data signal to the display circuit during the first display mode;
supplying N (N is a natural number of 2 or more) reset signals to the photodetector circuit during a first photodetection mode;
supplying M (M is a natural number smaller than N) reset signals to the photodetector circuit during a second photodetection mode;
supplying N select signals to the photodetector circuit during the first photodetection mode;
supplying M select signals to the photodetector circuit during the second photodetection mode;
performing a reset operation in accordance with the reset signals by the photodetector circuit;
performing a photocurrent detecting operation to generate data according to an intensity of light entering the photodetector circuit after the reset operation by the photodetector circuit; and
performing a selecting operation to output the data as a data signal in accordance with the select signals by the photodetector circuit.

2. The method for driving the input/output device according to claim 1, further comprising the step of:
not supplying the display data signal to the display circuit during the second display mode.

3. The method for driving the input/output device according to claim 2,
wherein the input/output device comprises a first transistor, and
wherein the first transistor comprises an oxide semiconductor.

4. The method for driving the input/output device according to claim 3,
wherein the photodetector circuit comprises a photoelectric transducer and a second transistor.

5. The method for driving the input/output device according to claim 4,
wherein the second transistor comprises an oxide semiconductor.

6. The method for driving the input/output device according to claim 3,
wherein the photodetector circuit comprises pixels arranged in matrix,
the method for driving comprises the steps of:
performing the reset operation in each of pixels sequentially;
performing the photocurrent detecting operation in each of the pixels sequentially; and
performing the selecting operation in each of the pixels sequentially,
wherein each of the pixels comprises a photoelectric transducer and a second transistor.

7. The method for driving the input/output device according to claim 6,
wherein the second transistor comprises an oxide semiconductor.

8. The method for driving the input/output device according to claim 3,
wherein the photodetector circuit comprises pixels arranged in matrix, the method for driving comprises the steps of:
- performing the reset operation in each of pixels simultaneously;
- performing the photocurrent detecting operation in each of the pixels simultaneously; and
- performing the selecting operation in each of the pixels sequentially, wherein each of the pixels comprises a photoelectric transducer and a second transistor.

9. The method for driving the input/output device according to claim 8,
wherein the second transistor comprises an oxide semiconductor.

10. A method for driving an input/output device comprising:
- a display circuit;
- a photodetector circuit;
- a display driver circuit; and
- a photodetector driver circuit, the method for driving comprising the steps of:
- supplying a display signal from the display driver circuit to the display circuit during a first display mode;
- not supplying the display signal from the display driver circuit to the display circuit during a second display mode;
- supplying a display data signal to the display circuit during the first display mode;
- supplying N (N is a natural number of 2 or more) reset signals from the photodetector driver circuit to the photodetector circuit during a first photodetection mode;
- supplying M (M is a natural number smaller than N) reset signals from the photodetector driver circuit to the photodetector circuit during a second photodetection mode;
- supplying N select signals from the photodetector driver circuit to the photodetector circuit during the first photodetection mode;
- supplying M select signals from the photodetector driver circuit to the photodetector circuit during the second photodetection mode;
- performing a reset operation in accordance with the reset signals by the photodetector circuit;
- performing a photocurrent detecting operation to generate data according to an intensity of light entering the photodetector circuit after the reset operation by the photodetector circuit; and
- performing a selecting operation to output the data as a data signal in accordance with the select signals by the photodetector circuit.

11. The method for driving the input/output device according to claim 10, further comprising the step of:
not supplying the display data signal to the display circuit during the second display mode.

12. The method for driving the input/output device according to claim 11,
wherein the photodetector circuit comprises a photoelectric transducer and a second transistor.

13. The method for driving the input/output device according to claim 12,
wherein the second transistor comprises an oxide semiconductor.

14. The method for driving the input/output device according to claim 11,
wherein the photodetector circuit comprises pixels arranged in matrix,
the method for driving comprises the steps of:
- performing the reset operation in each of pixels sequentially;
- performing the photocurrent detecting operation in each of the pixels sequentially; and
- performing the selecting operation in each of the pixels sequentially, wherein each of the pixels comprises a photoelectric transducer and a second transistor.

15. The method for driving the input/output device according to claim 14,
wherein the second transistor comprises an oxide semiconductor.

16. The method for driving the input/output device according to claim 11,
wherein the photodetector circuit comprises pixels arranged in matrix,
the method for driving comprises the steps of:
- performing the reset operation in each of pixels simultaneously;
- performing the photocurrent detecting operation in each of the pixels simultaneously; and
- performing the selecting operation in each of the pixels sequentially, wherein each of the pixels comprises a photoelectric transducer and a second transistor.

17. The method for driving the input/output device according to claim 16,
wherein the second transistor comprises an oxide semiconductor.

18. An input/output device comprising:
- a display selection signal output circuit configured to perform supply of a display selection signal during a first display mode and configured to stop supply of the display selection signal during a second display mode;
- a display data signal output circuit configured to receive an image signal and configured to generate a display data signal on a basis of the image signal;
- a photodetection reset signal output circuit configured to generate N (N is a natural number of 2 or more) photodetection reset signals during a first photodetection mode and configured to generate M (M is a natural number smaller than N) photodetection reset signals during a second photodetection mode;
- an output selection signal output circuit configured to generate N output selection signals during the first photodetection mode and configured to generate M output selection signals during the second photodetection mode; and
- a photodetector circuit configured to receive the photodetection reset signal and the output selection signal, configured to perform reset in accordance with the photodetection reset signal, configured to generate data according to an intensity of light entering the photodetector circuit subsequently, and configured to generate the data as a data signal in accordance with the output selection signal.

19. The input/output device according to claim 18, wherein the output selection signal output circuit and the photodetection reset signal output circuit each comprise:
- a shift register configured to generate L (L is a natural number of 2 or more) first pulse signals; and
- L logic circuits, wherein one of the L logic circuits is configured to receive a first pulse signal and a second pulse signal and configured to generate the output selection signal,
wherein the first pulse signal is one of the L first pulse signals, wherein the second pulse signal is one of Z (Z is a natural number of 2 or more and L or less) pulse control signals, and wherein the output selection signal is determined in accordance with the first pulse signal and the second pulse signal.

20. A method for driving an input/output device comprising:
- a display selection signal output circuit;
- a pixel data signal output circuit;
- a photodetection selection signal output circuit;
- a photodetector circuit; and
- a reading circuit, the method for driving comprising the steps of:
- performing supply of a photodetection reset signal to the photodetector circuit;
- performing reset of the photodetector circuit in accordance with the photodetection reset signal every unit period;
- generating data in the photodetector circuit according to an intensity of light entering the photodetector circuit subsequently after the reset of the photodetector circuit;
- generating N (N is a natural number of 2 or more) photodetection selection signals from the photodetection selection signal output circuit during a first photodetection mode;
- outputting the data as a first data signal from the photodetector circuit in accordance with one of the N photodetection selection signals;
- reading the first data signal from the photodetector circuit sequentially by the reading circuit;
- generating M (M is a natural number smaller than N) photodetection selection signals from the photodetection selection signal output circuit during a second photodetection mode;
- outputting the data as a second data signal from the photodetector circuit in accordance with one of the M photodetection selection signals;
- reading the second data signal from the photodetector circuit sequentially by the reading circuit;
- generating a display selection signal from the display selection signal output circuit during a first display mode and the first photodetection mode;
- generating the display selection signal from the display selection signal output circuit during the first display mode and the second photodetection mode;
- stopping generation of the display selection signal from the display selection signal output circuit during a second display mode and the first photodetection mode;
- stopping generation of the display selection signal from the display selection signal output circuit during the second display mode and the second photodetection mode;
- switching the input/output device from the second photodetection mode to the first photodetection mode in accordance with a value of data generated by the photodetector circuit in successive periods of the second photodetection mode; and
- switching the input/output device from the second display mode to the first display mode in accordance with the value of the data generated by the photodetector circuit in successive periods of the first photodetection mode.

* * * * *